(12) United States Patent
Weiss

(10) Patent No.: US 11,370,262 B2
(45) Date of Patent: Jun. 28, 2022

(54) MOTOR VEHICLE

(71) Applicant: WEISS NOMINEES PTY LTD, Scarborough (AU)

(72) Inventor: Jan Weiss, Scarborough (AU)

(73) Assignee: WEISS NOMINEES PTY LTD, Scarborough (AU)

( * ) Notice: Subject to any disclaimer, the term of this patent is extended or adjusted under 35 U.S.C. 154(b) by 0 days.

(21) Appl. No.: 16/651,558

(22) PCT Filed: Sep. 28, 2018

(86) PCT No.: PCT/AU2018/051067
§ 371 (c)(1),
(2) Date: Mar. 27, 2020

(87) PCT Pub. No.: WO2019/060966
PCT Pub. Date: Apr. 4, 2019

(65) Prior Publication Data
US 2020/0262266 A1 Aug. 20, 2020

(30) Foreign Application Priority Data
Sep. 28, 2017 (AU) ................................ 2017903946

(51) Int. Cl.
*B60G 21/00* (2006.01)
*B62D 9/02* (2006.01)
(Continued)

(52) U.S. Cl.
CPC .............. *B60G 21/007* (2013.01); *B62D 9/02* (2013.01); *B62K 5/05* (2013.01); *B62K 5/10* (2013.01);
(Continued)

(58) Field of Classification Search
CPC .............. B60G 21/007; B60G 2200/46; B60G 2204/129; B60G 2204/30; B60G 2300/122; B62D 9/02; B62K 5/05; B62K 5/10

See application file for complete search history.

(56) References Cited

U.S. PATENT DOCUMENTS 7,487,985 B1    2/2009  Mighell
7,850,180 B2   12/2010  Wilcox
(Continued)

FOREIGN PATENT DOCUMENTS

GB      2279047 A  * 12/1994  ............... B62D 9/02
WO  WO-2012160323 A2 * 11/2012  ............. B60G 21/02
(Continued)

OTHER PUBLICATIONS

Description Translation for GB 2279047 from Espacenet (Year: 1994).*
(Continued)

*Primary Examiner* — Jonathan Ng
*Assistant Examiner* — Daniel M. Keck
(74) *Attorney, Agent, or Firm* — Heslin Rothenberg Farley & Mesiti PC; Jacquelyn A. Graff, Esq.

(57) ABSTRACT

A tiltable motor vehicle having 3 or more wheels and at least one bridge having opposite first and second ends where first and second wheel hub assemblies are disposed. First and second wheels are mounted on the first and second wheel hub assemblies. First and second suspension guides are also associated with the first and second wheel hub assemblies, each being attached to a respective end of the at least one bridge such that the suspension guide is rotatable about at least a tilt axis relative to the at least one bridge. Each wheel hub assembly being movable along or across the respective suspension guide such that the wheels are movable relative (Continued)

to the at least one bridge during suspension action. Movement of the wheels and the wheel hub assemblies associated with suspension rebound and compression action and rotation of the bridges relative to the body associated with tilting action are both substantially independent of movement of the steering element.

21 Claims, 29 Drawing Sheets

(51) Int. Cl.
  *B62K 5/05* (2013.01)
  *B62K 5/10* (2013.01)
  *B60G 99/00* (2010.01)
  *B60G 13/00* (2006.01)
  *B60G 3/01* (2006.01)
  *B60G 3/26* (2006.01)
(52) U.S. Cl.
  CPC .. *B60G 2200/46* (2013.01); *B60G 2200/4622* (2013.01); *B60G 2204/129* (2013.01); *B60G 2204/30* (2013.01); *B60G 2300/122* (2013.01); *B60G 2300/50* (2013.01)

(56) References Cited

U.S. PATENT DOCUMENTS

| | | |
|---|---|---|
| 9,452,806 B2 | 9/2016 | Hirayama et al. |
| 2008/0238005 A1 | 10/2008 | James |
| 2011/0006498 A1 | 1/2011 | Mercier |
| 2018/0215433 A1 | 8/2018 | Raffaelli |
| 2021/0031713 A1* | 2/2021 | Kotrla .................. B60G 21/055 |

FOREIGN PATENT DOCUMENTS

| | | |
|---|---|---|
| WO | 2014201463 | 12/2014 |
| WO | 2017017636 | 2/2017 |
| WO | 2017021906 | 2/2017 |

OTHER PUBLICATIONS

International Search Report and Written Opinion of the International Searching Authority for PCT/AU2018/051067, dated Dec. 10, 2018, 12 pages.

* cited by examiner

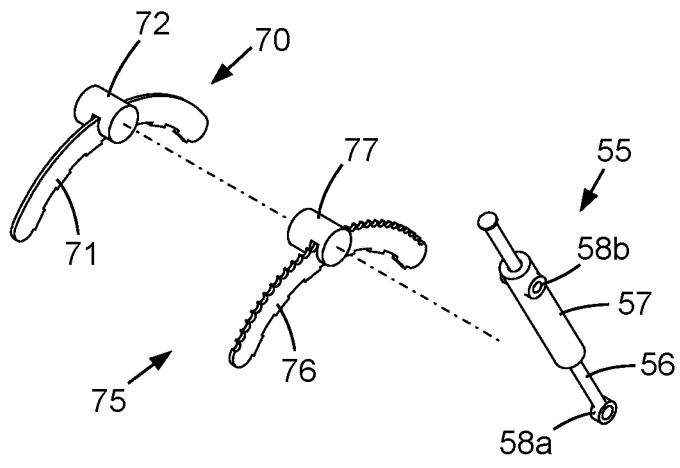
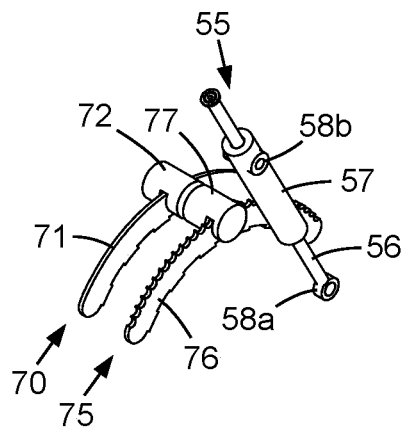
FIG. 10　　　　　　　　FIG. 11
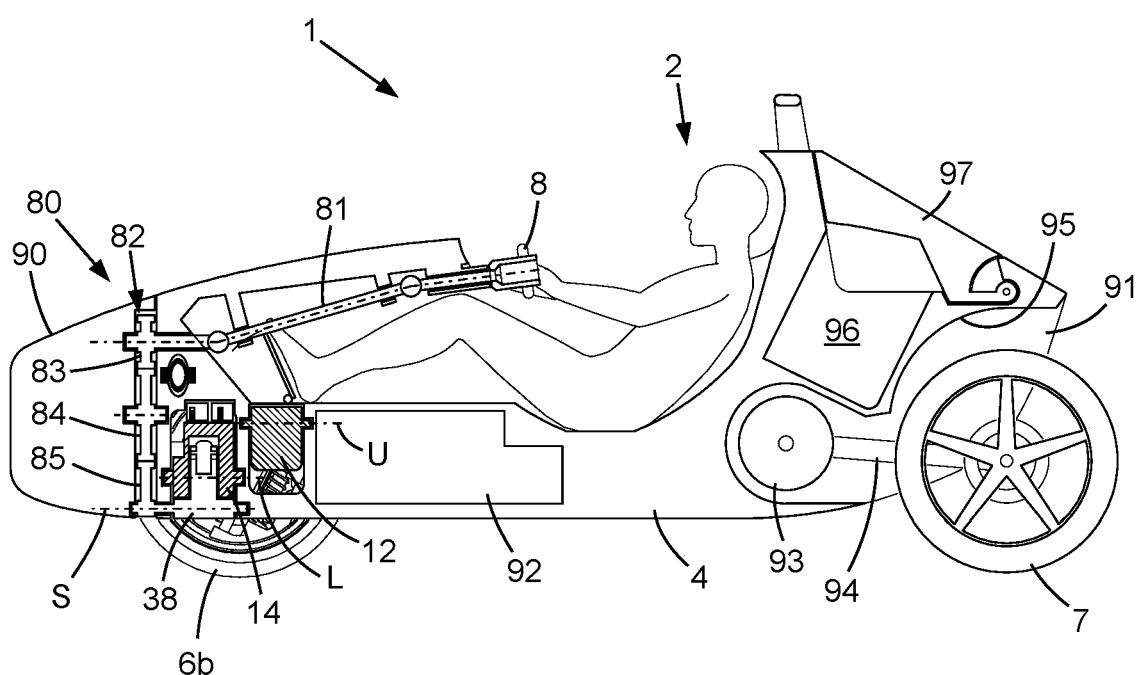
FIG. 12

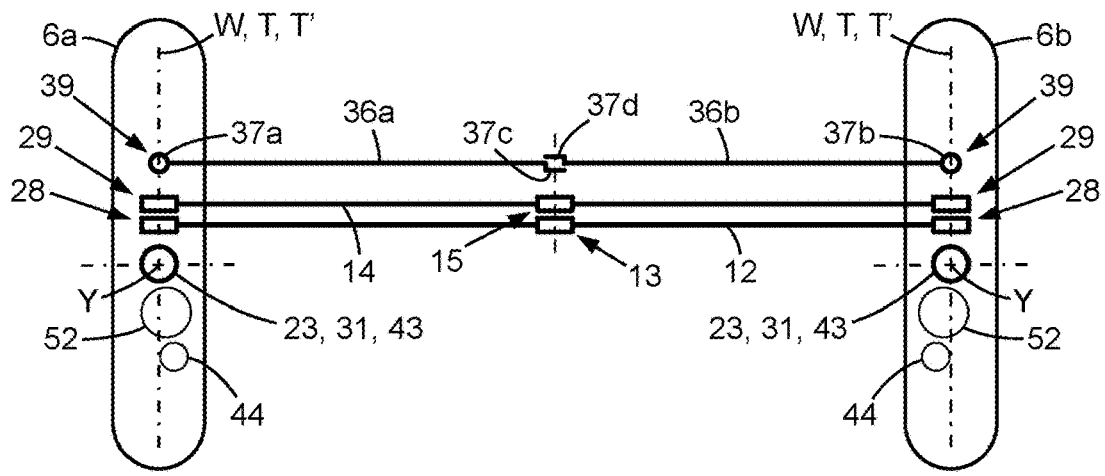
FIG. 23
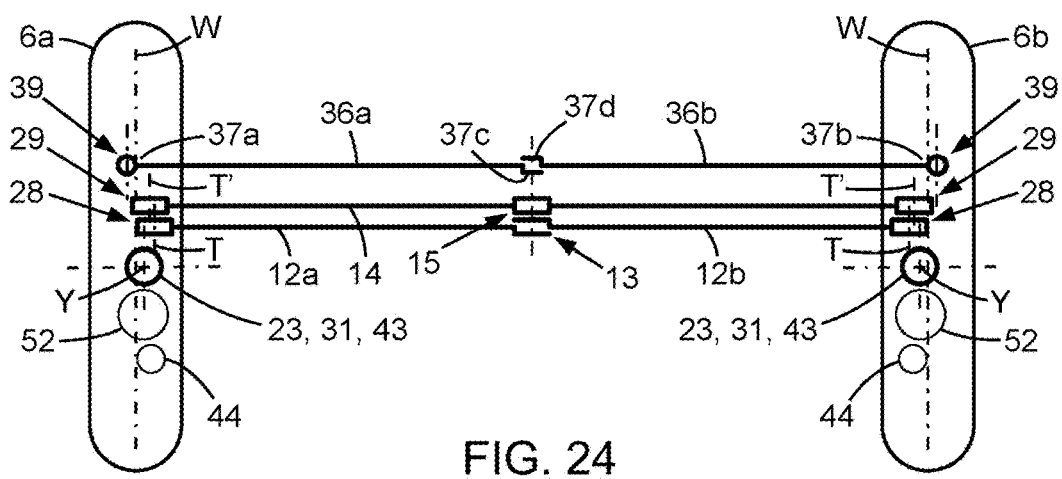
FIG. 24
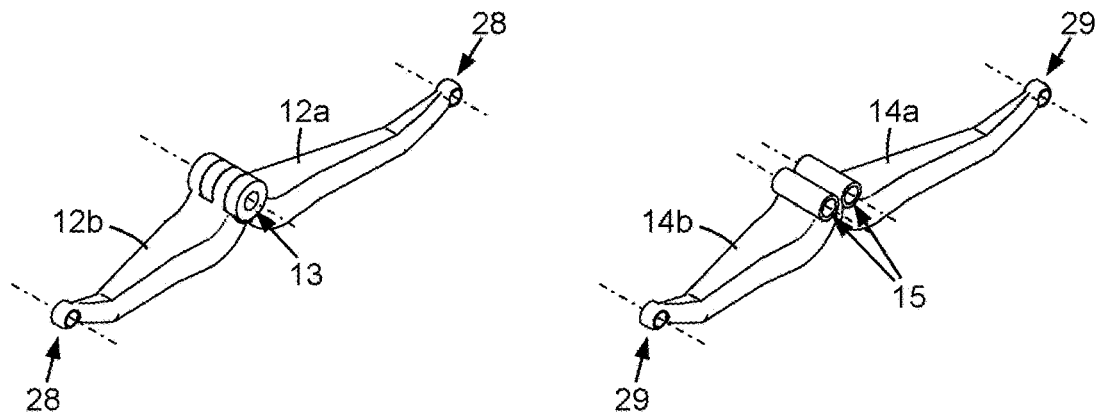
FIG. 25aFIG. 26

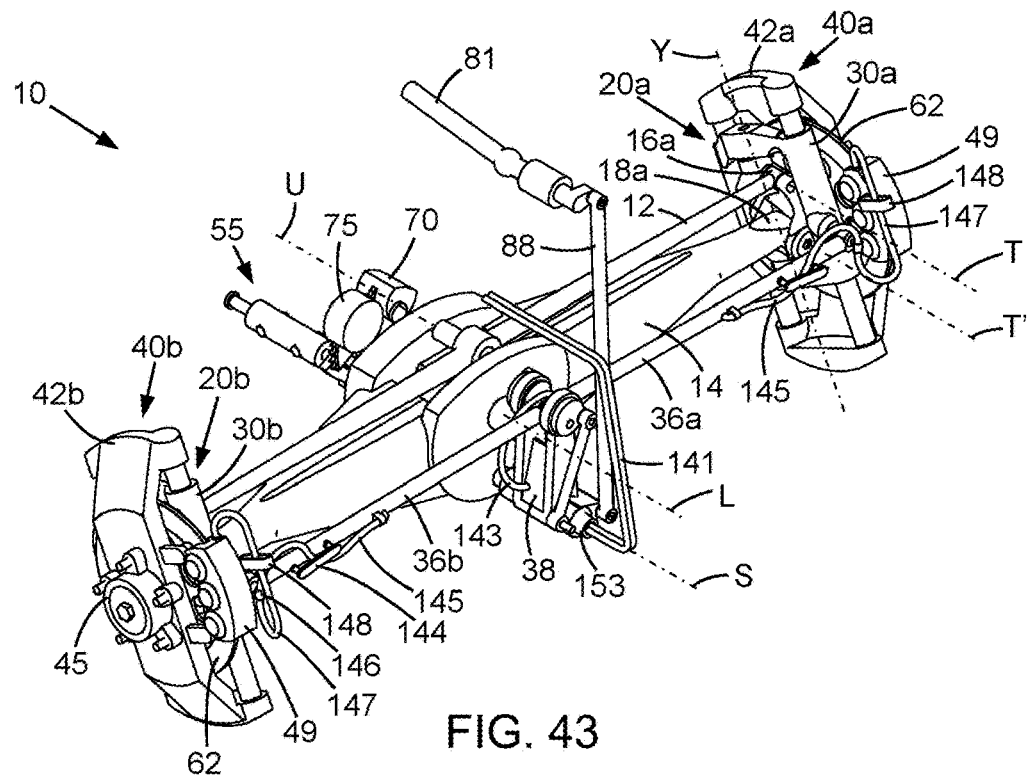
FIG. 43
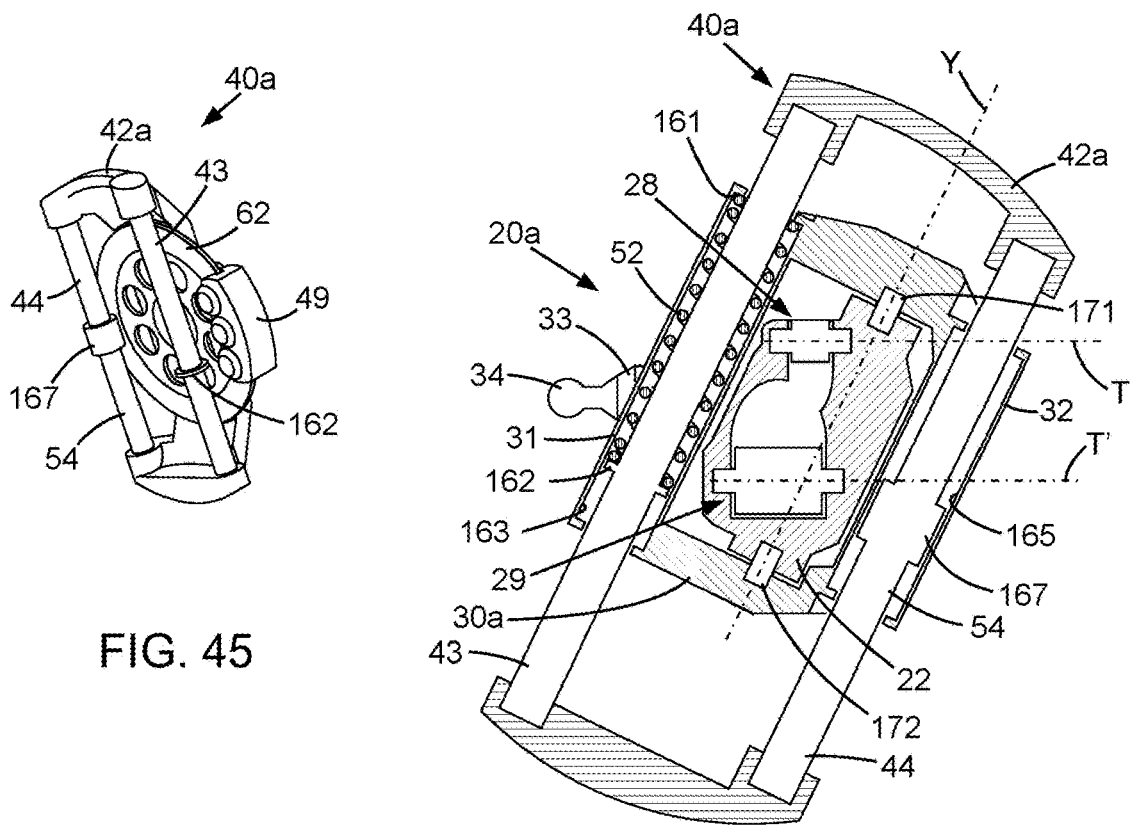
FIG. 45
FIG. 44

MOTOR VEHICLE

FIELD OF TECHNOLOGY

The present invention relates to a motor vehicle.

BACKGROUND

Two of the most common motor vehicles for conventional private use in transporting people include two-wheeled motorcycles and four-wheeled passenger cars. While many motorcycle drivers consider the driving experience on a motorcycle more pleasurable than that of a car, there have been some attempts at integrating the favourable aspects of both a four-wheeled car and a two-wheeled motorcycle into a hybrid vehicle.

For example, a conventional motorcycle is capable of leaning into the corners to counteract the centrifugal forces, which is commonly considered a natural, enjoyable movement not afforded by conventional car designs. Instead, the centrifugal forces imparted to a driver in a car when cornering make the driver slide sideways in his seat. On the other hand, drivers may also appreciate the comfortable seating position of a car over that of a motorcycle, where a rider typically straddles the vehicle and is exposed to the wind.

Some designs of hybrid vehicles attempt to integrate the tilting ability of a two-wheeled motorcycle while maintaining two front wheels and/or two back wheels to potentially afford a more comfortable seating position. For example, such a hybrid vehicle may be in the form of a three-wheeled motorcycle also known as a "trike", which has two front wheels and one back wheel, or vice versa.

There are, however, difficulties associated with adopting the full tilting ability of a two-wheeled motorcycle into two front wheels or two back wheels of such a hybrid vehicle. In general terms, this is because a two-wheeled motorcycle can relatively easily equip the single front wheel to perform all three functions of tilting, suspension and steering. However, when applying a tilting ability to two front wheels or two back wheels, there is extra complexity, not only because two wheels are involved but also because the suspension and steering mechanisms are often different from that of a motorcycle with one front wheel. In contrast, the two front wheels of a conventional car do not encounter this problem because the wheels are typically only equipped for steering and suspension, not tilting.

U.S. Pat. No. 7,487,985 discloses a three-wheeled tilting vehicle that tilts when driven around a corner or bend. However, the suspension design disclosed in U.S. Pat. No. 7,487,985 is adversely affected by road undulations or bumps resulting in unintended steering ("bump steer").

U.S. Pat. No. 7,850,180 also discloses a three-wheeled tilting vehicle that tilts when driven around a corner or bend. The suspension design disclosed in U.S. Pat. No. 7,850,180 differs from that disclosed in U.S. Pat. No. 7,487,985, but has the disadvantage of allowing only limited tilting. Furthermore, undesired steering due to tilting motions is generated and cannot be avoided.

United States patent application publication numbers 2008/0238005 and 2018/0215433 both disclose three-wheeled tilting vehicles having two steered front wheels. The first powers the tilt angle and uses wires to compensate for difficult steering geometry. Both have undesirably low stiffness in their steering arrangements, are extremely limited in wheel compression and/or rebound travel and limited in maximum tilt angle due to interference between the various members and the wheel rim.

U.S. Pat. No. 9,452,806 discloses a three-wheeled tilting vehicle having a two-axis steering joint between the steering tie rod and the upright.

The present invention may provide improvements and/or alternatives to the tilting, suspension and/or steering mechanism.

SUMMARY

According to a first aspect of the invention, there is provided a motor vehicle including:
  a body; and
  a steering and suspension assembly coupled to the body, the steering and suspension assembly comprising:
    a left suspension upright and a right suspension upright, each suspension upright including a respective upper joint and a respective lower joint;
    a bridge having opposite left and right ends that are rotatably connected to the respective left and right suspension uprights, the bridge being pivotally connected to a body of the vehicle by a bridge body mount between the left and right ends;
    at least one connecting link extending primarily in a lateral direction and providing a connecting link left end connected to the left suspension upright and a connecting link right end connected to the right suspension upright, the or each connecting link being rotatably connected to the body at a or a respective connecting link body mount;
    the respective upper joints of the left and right suspension uprights rotatably connecting the left and right suspension uprights to the respective (i.e. left or right) end of one of the bridge or the at least one connecting link;
    the respective lower joints of the left and right suspension uprights rotatably connecting the left and right suspension uprights to the respective (i.e. left or right) ends of the other one of the bridge and the at least one connecting link;
    left and right wheel hub assemblies associated with the respective left and right suspension uprights;
    left and right wheels mounted on the left and right wheel hub assemblies, respectively, each respective left or right wheel hub assembly being movable relative to the respective left or right suspension upright such that the wheels are linearly movable relative to the bridge during suspension rebound and compression action; and
    at least one steering element connected to each or a respective suspension upright at a respective steering upright joint to cause the suspension upright to pivot about a steering axis upon movement of the steering element to steer the motor vehicle;
    wherein the motor vehicle is arranged such that movement of the wheels and the wheel hub assemblies associated with the suspension rebound and compression action and rotation of the bridges relative to the body associated with tilting action are both substantially independent of movement of the steering element.

Embodiments of the present invention have significant practical advantages.

Embodiments of the present invention enable relatively large tilt angles, two-wheeler-like steering of for example a three or four wheeled vehicle, avoid bump steer with suspension compression and rebound motions and also avoid undesired steering due to tilting motions.

The steering upright joint may be a spherical joint. The right and left suspension uprights may be right and left front suspension uprights.

The upper and lower joints on each suspension upright may be substantially within a first plane perpendicular to an axis of rotation of a respective wheel, the first plane including a respective steering axis. The upper and lower joints of a respective suspension upright may be spaced apart by at least 40 mm 250 mm. Preferably the upper and lower joints are spaced apart by at least 50 mm or at least 70 mm. Preferably the upper and lower joints are spaced apart by no more than 200 mm or by no more than 150 mm or by no more than 90 mm.

The upper and lower joints and the steering upright joint may be offset perpendicular to the first plane by less than 100 mm, or less than 70 mm, or preferably less than 50 mm and more preferably less than 30 mm. The steering upright joint may provide at least two axes of rotation, a tilt orientation axis and a steering orientation axis. The tilt orientation axis may be offset less than 10 mm from the offset of the upper and lower joints from the first plane, but preferably has the same offset from the first plane as the upper and lower joints. The steering orientation axis may be parallel to the steering axis.

A biasing member may include a spring providing a biasing force between the upright and the hub assembly along a spring axis. The spring axis may be offset perpendicular to the first plane by less than 100 mm, or less than 70 mm, or preferably less than 50 mm and more preferably less than 30 mm to help ensure friction due to side-load forces is relatively low. If the spring axis is angled relative to the first plane, a centre of a hub assembly spring mount and a centre of an upright spring mount point are both within 100 mm of the first plane, or preferably within 70 mm and more preferably within 50 mm of the first plane.

Throughout the specification the term "steering axis" is used for an axis about which a respective wheel rotates during steering action.

In one specific embodiment the steering and suspension assembly is arranged such that a respective steering axis passes through a respective wheel, such as through the wheel within the proximity of, and parallel to, a centrally disposed radial axis of a respective wheel. Further, the steering and suspension assembly may be arranged such that the respective steering axis passes through a respective wheel at an offset from, and parallel to, the centrally disposed radial axis of the respective wheel, the offset being within a plane that is perpendicular to an axis of rotation of the wheel, the steering axis being typically in use behind the axis of rotation of the wheel. The offset may be within the range of 10-100 mm, 15-70 mm or 30-45 mm, such as approximately 35 mm.

The at least one steering element may be a single steering element connected between the left and right steering upright joints. Alternatively, the at least one steering element may comprise a left steering element and a right steering element, the left steering element being connected to the left steering upright joint and the right steering element being connected to the right steering upright joint.

Each upper joint and each lower joint on the first and second suspension uprights may be a multi-axis joint or spherical joint. In this example, the steering axis then passes through the upper and lower joints on the uprights.

Alternatively, each left or right suspension upright may include:
  a respective connecting member pivotally connected between the respective (i.e. left or right) end of the bridge and the at least one or the respective connecting link; and
  a respective steering member pivotally connected to the connecting member about the steering axis,
  wherein each wheel hub assembly is linearly movable relative to the respective steering member.

This arrangement may ensure that, during suspension compression and rebound action the wheels move upwards and/or downwards with respect to the body of the motor vehicle. The left upper and left lower joints of the left connecting member and right upper and right lower joints of the right connecting member may each be a pivotal joint having a left upper, left lower, right upper or right lower tilt axis respectively.

In one specific embodiment the left and right uprights each include a respective sleeve and the left and right wheel hub assemblies each include a respective rod extending through the respective sleeve. In this case the hub assembly may be referred to as a "space frame hub"—that is, the loads from the wheel are transmitted to the pivotal connection or stub axle located on the hub assembly in the centre of the wheel. From the centrally located pivotal connection, the hub assembly transfers the wheel loads radially towards (in the direction of) the wheel rim. The rod in the hub assembly is held by or fixed to a remaining portion of the hub assembly at locations radially spaced from the centre of the hub assembly. Roll and pitch directions loads (i.e. in the camber direction or in the braking direction) are transmitted from the rod of the hub assembly to the sleeve of the upright. Further, in this embodiment the upper and lower joints of the uprights (connecting the left and right suspension uprights to the respective end of one of the bridge or the at least one connecting link) may be within a plane perpendicular the axis of rotation of the wheel and through which the steering axis extends. This enables motor-bike like steering and titling. As in in this embodiment each guide rod is part of a respective wheel hub assembly and a corresponding sleeve (guided by the guide rod) is part of a respective upright, it is possible to position the bridges relatively close together, which enables relatively large tilt angles while also enabling relatively large suspension travel.

In an alternative embodiment, the left and right wheel hub assemblies may each include a respective sleeve and the left and right uprights may each include a respective rod extending through the respective sleeve.

The motor vehicle may further comprise a biasing member associated with each wheel and arranged to bias the respective wheel hub assembly towards a predetermined position relative to the respective suspension upright. Each biasing member may comprise a spring positioned to impose a biasing force along a spring axis parallel to an axis of the respective rod. The upper joint, lower joint and the steering joint of the suspension uprights and the respective spring axis and the respective sleeve and rod of the respective wheel hub assembly may all be located within a lateral offset distance from a centreline of the respective wheel; the distance between the left and right ends of the bridge being a lateral bridge length; the lateral offset distance being less than ten percent or preferably less than five percent or more preferably less than 2 percent of the lateral bridge length. Alternatively, the lateral offset distance may be less than 100 mm, preferably less than 50 mm, more preferably less than 30 mm, yet more preferably less than 20 mm and most preferably less than 10 mm.

Alternatively, the upper joint, lower joint and the steering joint of the suspension uprights may all be located within a lateral offset distance from a centreline of the respective wheel; the distance between the left and right ends of the bridge being a lateral bridge length; the lateral offset distance being less than ten percent or preferably less than five percent or more preferably less than 2 percent of the lateral bridge length. Alternatively, the lateral offset distance may be less than 100 mm, preferably less than 50 mm, more preferably less than 30 mm, yet more preferably less than 20 mm and most preferably less than 10 mm.

When the vehicle is at a zero-tilt angle: the left upper joint of the left suspension upright may be at substantially the same height as the right upper joint of the right suspension upright; and the left lower joint of the left suspension upright may be at substantially the same height as the right lower joint of the right suspension upright. For example, the left and right upper and lower joints of the suspension uprights may form the vertices of a virtual parallelogram, such that the body and suspension uprights remain parallel as the body rotates relative to the bridges during tilting action. Preferably, the left upper joint may be at substantially the same distance from a centre-line of the body as the left lower joint; and the right upper joint may be at substantially the same distance from a centre-line of the body as the right lower joint.

The at least one connecting link may be a single connecting link (i.e. a second bridge) including the connecting link left end and the connecting link right end and is connected to the body at the connecting link body mount, a centre of the bridge body mount being at least vertically spaced from a centre of the connecting link body mount by a vertical body mount spacing distance, the upper and lower joints of each suspension upright being vertically spaced by the vertical body mount spacing distance. For example, the bridge and the connecting link may both form substantially rigid bridges between the left and right suspension uprights.

Alternatively, the at least one connecting link may comprise a top connecting link and a lower connecting link, each including a respective left and right end, the top connecting link left and right ends being connected to a top joint of the left and right uprights, respectively. At least one of the top and lower connecting links may be connected to the body at a respective connecting link body mount. The top connecting link may be positioned higher than (or above) the bridge and the lower connecting link may be position lower than (or below) the bridge. The top connecting link and the lower connecting link may each be loaded in tension, placing a compression load onto the bridge.

Alternatively, the at least one connecting link may comprise a left connecting link and a right connecting link: the left connecting link may include the connecting link left end and a body mount end; the right connecting link may include the connecting link right end and a body mount end; and the body mount ends of the respective left and right connecting links may be connected to the respective connecting link body mounts.

The left and right connecting links may be connected to the respective body mounts by pivots, each having a respective pivot axis.

The left and right connecting link body mount pivot axes may be coincident. Alternatively, the left and right connecting link body mounts may be laterally separated.

At least one tilt damper may be provided, connected directly or indirectly between the bridge and the body or between the at least one connecting link and the body.

The at least one tilt damper may be arranged to reduce the effect of suspension compression and rebound motions experienced by either the left wheel or the right wheel due to road undulations from translating to the other of the left or right wheel when the vehicle is tilted by damping movement of the bridge with respect to the body. Alternatively or additionally, the at least one tilt damper may be arranged to reduce body roll speeds and/or body roll amplitudes by damping motions of the body relative to the bridge during tilting motions.

A respective brake rotor may be provided, associated with each of the left and right wheels. The respective brake rotor may be a brake ring rigidly mounted to a rim of the respective wheel. Alternatively, the respective brake rotor may be a brake disc connected to a hub part. The wheel may be bolted or otherwise fixed to the hub part.

A braking system may be provided, including at least one respective calliper arranged to apply a frictional force to the respective brake rotor, wherein the at least one calliper is connected to the respective upright.

A tilt brake may be provided between the bridge (or one of the at least one connecting links) and the body to selectively permit or restrict tilt motions of the body relative to the bridge (or connecting link).

The tilt brake may be in a locked mode to prevent tilt motions of the body when the vehicle is stationary. Additionally or alternately, the tilt brake may be controllable to restrict tilt motions of the body relative to the bridge when a rate of tilt or a predicted rate of tilt exceeds a predetermined rate.

A tilt motor may be provided between the bridge (or one of the at least one connecting links) and the body to enable a tilt attitude of the body to be adjusted relative to the bridge (or connecting link). For example, tilt motions of the body may be driven relative to the bridge.

The tilt motor may be controllable to return the body to a tilt angle of substantially zero.

Alternatively or additionally, the tilt motor may be controllable to drive the body to or towards a calculated target tilt angle. The tilt angle may be actively controlled to or towards a target tilt angle, for example, as calculated for safety or driving style, such as to lean into corners faster or earlier than a passive characteristic of the vehicle may provide.

Alternatively, or additionally, the tilt motor may be controllable to drive a tilt angle of the body in response to an input from a driver. For example, the tilt angle may be adjusted as requested by the driver. Alternatively, the rate of lean into or out of a corner may be adjusted as requested by the driver.

The tilt motor may be a motor-generator, controllable to drive and/or damp tilt motions of the body relative to the bridge.

A steering damper may be provided. For example, the steering damper may be connected directly or indirectly between the body and the at least one steering element.

The rear suspension assembly may comprise first and second bridges and first and second uprights, each bridge extending transversally relative to a longitudinal axis of the motor vehicle and being pivotably mounted such that the first and second bridges can pivot about an axis that is substantially parallel to the longitudinal axis of the motor vehicle, adjacent ends of the first and second bridges being pivotably coupled to a respective one of the first and second uprights, the rear suspension assembly further comprising a pair of wheel hubs and suspension elements, respective wheel hubs carrying respective wheels and being coupled to respective uprights and guided such that, biased by respective suspension elements, the wheel hubs can move along a radial axis of the respective wheel, wherein the rear suspension assembly is arranged such that the wheels of the rear suspension are tiltable in a manner similar or analogous to that of the wheels of the front suspension assembly.

Both the front suspension assembly and the rear suspension assembly may be arranged such that the wheels of the front suspension assembly and also the wheels of the rear suspension assembly are tiltable by an angle within the range of 10°-20°, 10°-30°, 10°-40°, 10°-50° or by an angle greater that 50°.

The rear suspension assembly may be arranged such that each rear wheel is tiltable about a substantially horizontal radial axis through that wheel.

The motor vehicle may comprise at least one electric motor and wherein the at least one electric motor is located within or at the, or a respective, wheel hub.

Each respective wheel hub may be coupled to the respective suspension upright by a rod and sleeve arrangement including at least one rod and at least one sleeve, the or each respective rod being connected to the wheel hub and the or each respective sleeve being connected to suspension upright.

According to a second aspect of the invention, there is provided a motor vehicle comprising:
 a body; and
 a steering and suspension assembly coupled to the body, the steering and suspension assembly comprising:
  at least one bridge having opposite first and second ends;
  first and second wheel hub assemblies disposed at the opposite first and second ends of the at least one bridge, respectively;
  first and second wheels mounted on the first and second wheel hub assemblies, respectively;
  first and second suspension guides associated with the first and second wheel hub assemblies, respectively, each suspension guide being attached to a respective end of the at least one bridge such that the suspension guide is rotatable about at least a tilt axis relative to the at least one bridge, and each respective wheel hub assembly being movable along or across the respective suspension guide such that the wheels are movable relative to the at least one bridge during suspension compression and rebound action; and
  a steering element rotatably connected to each or a respective suspension guide to cause the suspension guide to rotate about a respective steering axis relative to the at least one bridge upon movement of the steering element to steer the motor vehicle;
 wherein the motor vehicle is arranged such that movement of the wheels and the wheel hub assemblies associated with the suspension compression and rebound action is independent of movement of the steering element (such that there is substantially zero bump steer).

In one specific embodiment the steering and suspension assembly is arranged such that a respective steering axis passes through a respective wheel, such as through the wheel within the proximity of, and parallel to, a centrally disposed radial axis of a respective wheel. Further, the steering and suspension assembly may be arranged such that the respective steering axis passes through a respective wheel at an offset from, and parallel to, the centrally disposed radial axis of the respective wheel, the offset being within a plane that is perpendicular to an axis of rotation of the wheel, typically in use behind the axis of rotation of the wheel. The offset may be within the range of 10-100 mm, 15-70 mm or 30-45 mm, such as approximately 35 mm.

Each suspension guide may comprise a connector and a steering member. The connector of the suspension guide may be attached to the respective end of the at least one bridge such that the suspension guide is pivotable relative to the respective end of the at least one bridge about a respective tilt axis that may be substantially parallel to a longitudinal axis of the motor vehicle. Alternatively, the or each respective tilt axis may be within 20 degrees or preferably within 10 degrees and more preferably within 5 degrees of a longitudinal axis of the vehicle. The steering member may be pivotably coupled to the connector such that the steering member is pivotable about the steering axis.

Alternatively, each suspension guide may comprise a single piece or integrally formed upright, an attachment of the suspension guide to the respective end of the at least one bridge being a multi-axis joint (such as a ball joint), wherein the motor vehicle is arranged such that both a respective tilt axis and a respective steering axis pass through the multi-axis joint.

Each wheel hub assembly may be linearly movable along or across the respective suspension guide (or across the steering member portion of the suspension guide, where provided) such that during suspension compression and rebound action the wheels move upwards and/or downwards with respect to a body of the motor vehicle.

Each suspension guide may comprise a sleeve and each wheel hub assembly may comprise a rod extending through a respective sleeve. Alternatively, each wheel hub assembly comprises a sleeve, and each suspension guide comprises a rod extending through a respective sleeve.

The motor vehicle may further comprise a biasing member associated with each wheel and arranged to bias the respective wheel hub assembly towards a predetermined position relative to the respective suspension guide after suspension action.

Each biasing member may comprise, or may be provided in the form of, a spring positioned to impose a biasing force along an axis parallel to an axis of the respective rod.

Each end of the at least one bridge may be pivotally connected to one of the suspension guides to enable tilting of the wheels relative to a body of the motor vehicle.

In one specific embodiment of the present invention, the motor vehicle comprises at least two bridges, each bridge having first and second opposite ends, each first end being attached to the suspension guide associated with the first wheel, and each second end being attached to the suspension guide associated with the second wheel. In one embodiment, one of the at least two bridges is located above the or another one of the at least two bridges.

The first and second suspension guides may have upper and lower joints for attaching to the first and second bridges, and the upper and lower joins of a respective suspension guide may be substantially within a plane perpendicular to an axis of rotation a respective wheel, the plane including a respective steering axis. The upper and lower joints of a respective suspension guide may be spaced apart by at least 40 mm and no more than 250 mm. Preferably the upper and lower joints are spaced apart by at least 50 mm or at least 70 mm. Preferably the upper and lower joints are spaced apart by no more than 200 mm or by no more than 150 mm or by no more than 90 mm.

The motor vehicle may further comprise a tilt damper arranged to reduce the effect of suspension experienced by the first wheel from translating to the second wheel when the vehicle is tilted by reducing movement of the at least two bridges with respect to each other.

The motor vehicle may further comprise at least one brake rotor associated with one or both of the first and second wheels. The at least one brake rotor may be a brake ring rigidly mounted to a rim of the respective wheel.

The motor vehicle may further comprise a braking system including at least one calliper arranged to apply a frictional force to the at least one brake ring, wherein the at least one calliper is positioned over an inner circumferential edge of the brake ring.

The first and second wheels may be front wheels of the vehicle. Alternatively or additionally, the first and second wheels may be back wheels of the vehicle.

The steering and suspension assembly may be a front steering and suspension assembly and the motor vehicle may further comprise a rear suspension assembly. The rear suspension assembly may comprise a single wheel. Alternatively, the rear suspension assembly may comprise a pair of wheels.

The rear suspension assembly may comprise first and second bridges and first and second uprights, each bridge extending transversally relative to a longitudinal axis of the motor vehicle and being pivotably mounted such that the first and second bridges can pivot about an axis that is substantially parallel to the longitudinal axis of the motor vehicle, adjacent ends of the first and second bridges being pivotably coupled to a respective one of the first and second uprights, the rear suspension assembly further comprising a pair of wheel hubs and suspension elements, respective wheel hubs carrying respective wheels and being coupled to respective uprights and guided such that, biased by respective suspension elements, the wheel hubs can move along a radial axis of the respective wheel,
  wherein the rear suspension assembly is arranged such that the wheels of the rear suspension are tiltable in a manner similar or analogous to that of the wheels of the front suspension assembly.

Both the front suspension assembly and the rear suspension assembly may be arranged such that the wheels of the front suspension assembly and also the wheels of the rear suspension assembly are tiltable by an angle within the range of 10°-20°, 10°-30°, 10°-40°, 10°-50° or by an angle greater that 50°.

The rear suspension assembly may be arranged such that each rear wheel is tiltable about a substantially horizontal radial axis through that wheel.

The motor vehicle may comprise at least one electric motor and wherein the at least one electric motor is located within or at the, or a respective, wheel hub.

Each respective wheel hub may be coupled to the respective suspension guide by a rod and sleeve arrangement including at least one rod and at least one sleeve, the or each respective rod being connected to the wheel hub and the or each respective sleeve being connected to suspension guide.

BRIEF DESCRIPTION OF DRAWINGS

Features and advantages of the present invention will become apparent from the following description of embodiments thereof, by way of example only, with reference to the accompanying drawings in which:

FIG. 10 is an exploded view of various components including a tilt damper used in the motor vehicle shown in FIG. 1.

FIG. 11 is a perspective view of the components and tilt damper shown in FIG. 10.

FIG. 12 is a longitudinal section through the motor vehicle shown in FIG. 1.

FIG. 23 is a schematic view illustrating relative suspension component locations of a motor vehicle according to an embodiment of the present invention, viewed along a steering axis.

FIG. 24 is a schematic view illustrating relative suspension component locations of a motor vehicle according to an alternative embodiment of the present invention, viewed along a steering axis.

FIG. 25a is a perspective view of a two-arm feature of a motor vehicle according to an embodiment of the present invention.

FIG. 26 is a perspective view of an alternate two-arm feature of a motor vehicle according to an embodiment of the present invention.

FIG. 43 is a perspective view of various components of an alternative front suspension arrangement of the present invention.

FIG. 44 is a sectional view through components of the front suspension shown in FIG. 43.

FIG. 45 is a perspective view of components from the front suspension of FIGS. 43 and 44.

DETAILED DESCRIPTION

Figure 1:
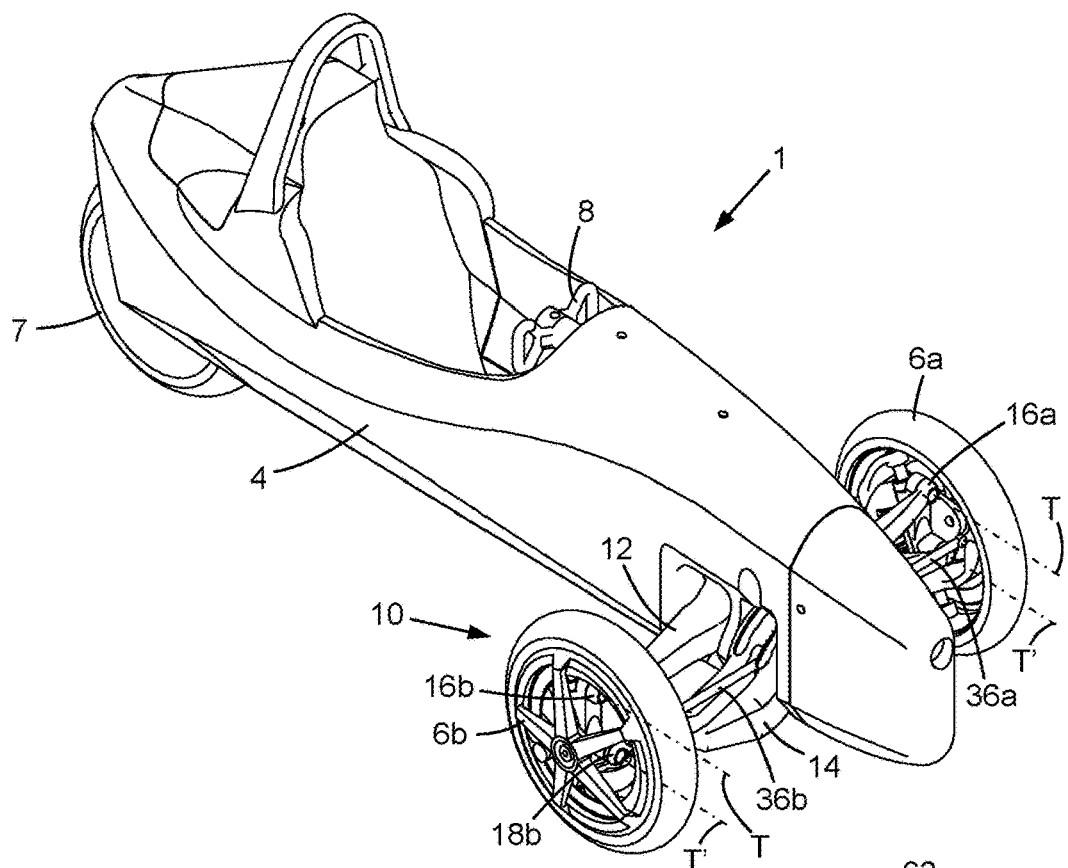
FIG. 1 is a perspective view of a motor vehicle according to an embodiment of the present invention.
Figure 2:
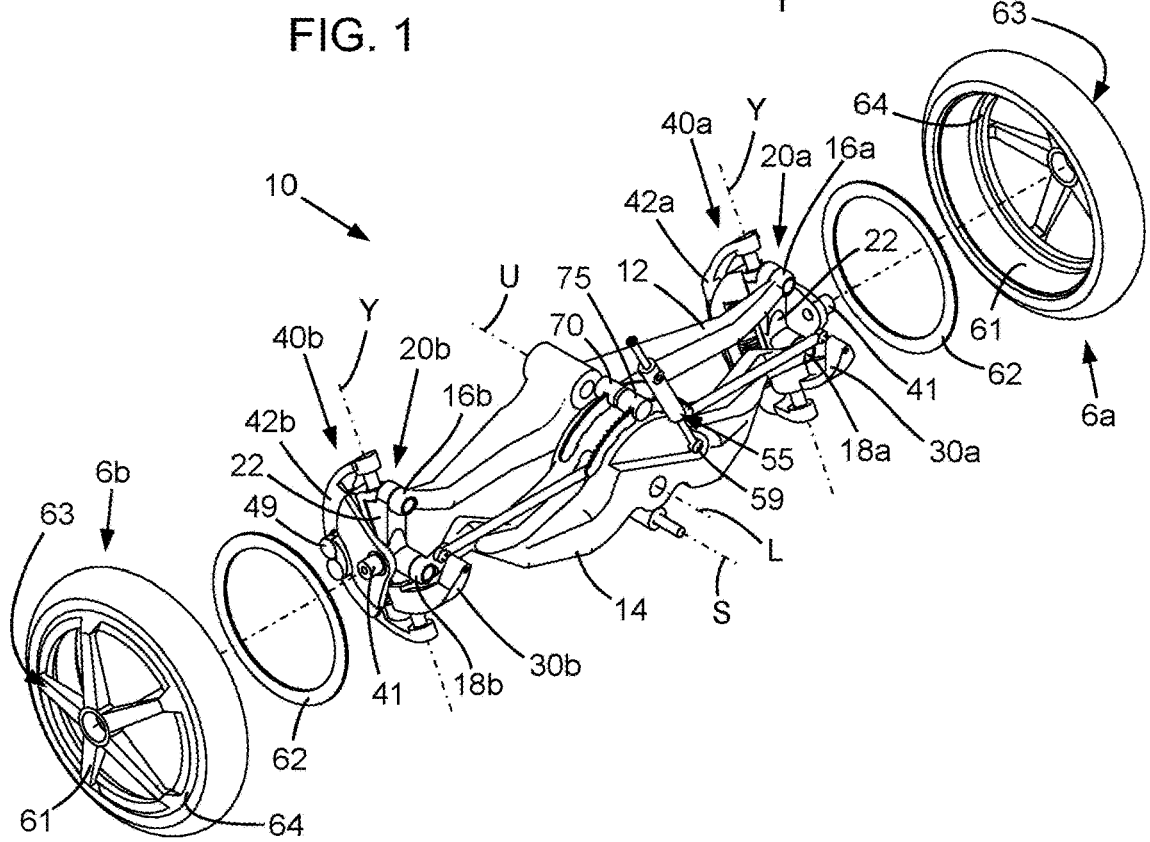
FIG. 2 is a partially exploded view of various components used in the motor vehicle shown in FIG. 1.

With reference to FIGS. 1 and 2, there is shown a motor vehicle 1 according to an embodiment of the invention. The vehicle 1 comprises at least one bridge having opposite ends, each end associated with a wheel. More specifically, in this embodiment, the vehicle 1 comprises two bridges 12 and 14. The upper bridge 12 comprises opposite ends 16a and 16b. Similarly, the lower bridge 14 comprises opposite ends 18a and 18b. The motor vehicle 1 also comprises a first wheel hub assembly 40a and a second wheel hub assembly 40b (which may collectively be referred to as "hub assembly or assemblies 40"). A first wheel 6a of the vehicle 1 is mounted to the first hub assembly 40a. A second wheel 6b is mounted to the second hub assembly 40b. Accordingly, the first and second wheels 6a and 6b (or collectively, "wheel(s) 6") are disposed at the opposite ends of the bridges 12 and 14. The vehicle 1 shown in FIG. 1 comprises two front wheels 6 and one back wheel 7. However, a person skilled in the art will appreciate that the vehicle 1 may be embodied in other forms. A steering wheel 8 is provided to enable control of the steering position of the front wheels 6.

FIG. 2 shows components of the front suspension 10 of the vehicle 1 which further comprises first and second suspension guides or uprights 20a and 20b (or collectively, "suspension upright(s) 20") associated with the respective hub assembly 40a and 40b. It should be understood that the front suspension 10 enables tilting functionality in addition to compression, rebound and steering functionality. While each upright 20 may be a single piece as shown in later FIGS., initially a two-piece upright is shown as the tilting and steering functions may be more clearly understood when more separated in a two-piece upright. FIG. 2 also shows the wheels 6 and brake rotors 62 (shown as ring brakes described below) in exploded-view form, which will be described in more detail below.

Figure 3:
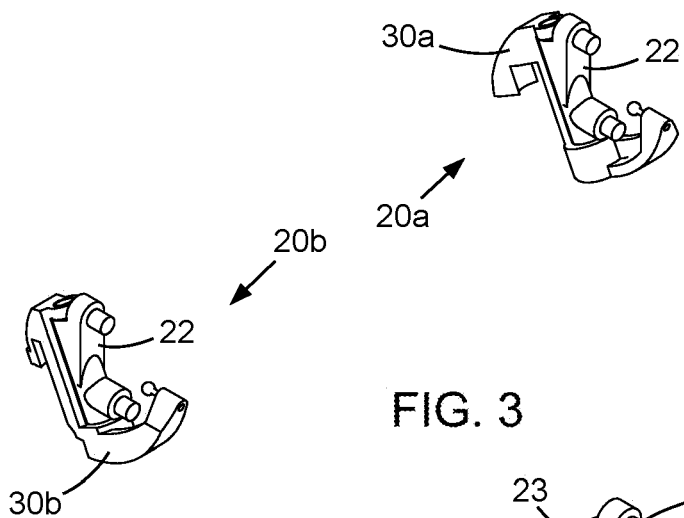
FIG. 3 is a perspective view of the suspension uprights.
Figure 4:
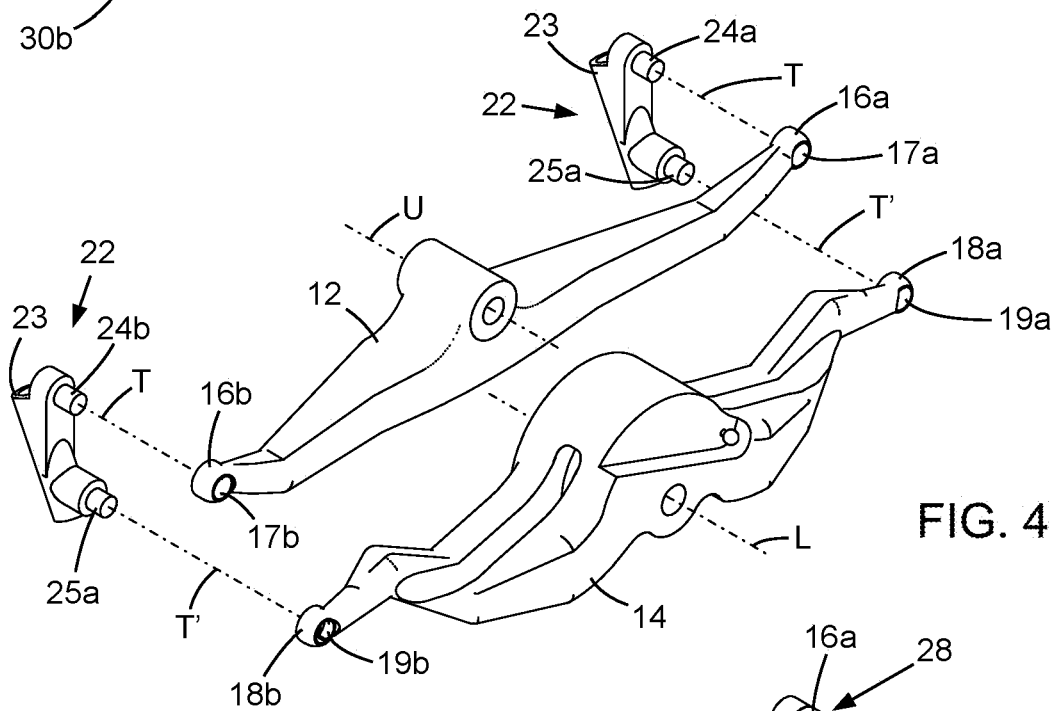
FIG. 4 is an exploded view of connectors and bridges used in the motor vehicle shown in FIG. 1.
Figure 5:
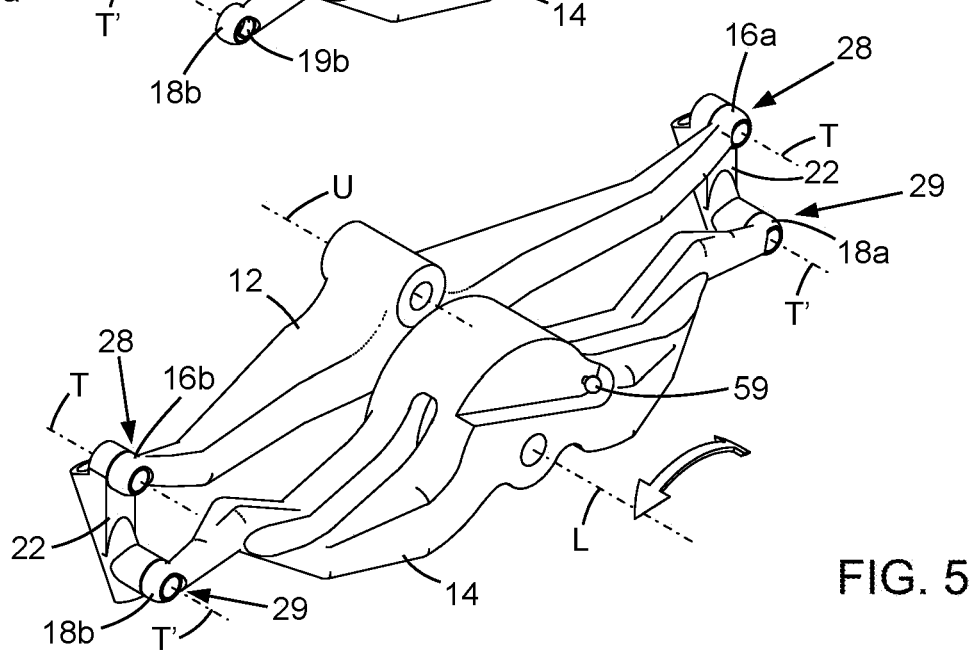
FIG. 5 is a perspective view of the connectors and bridges shown in FIG. 4.

As can be seen in FIGS. 3 to 5, each suspension upright 20 may comprise two primary bodies to separate the tilt and steering functions so a steering axis does not need to pass through joints 28 and 29 (shown in FIG. 5) between the upright and the upper and lower bridges 12 and 14. In this embodiment, each suspension upright 20 includes a connecting member 22 to assist in the provision of a tilt function of the suspension. Each suspension upright 20 also includes a steering member 30a or 30b to help provide a steering function of the suspension.

More specifically, referring again to FIGS. 1 and 2, the first suspension upright 20a is associated with the respective first hub assembly 40a and the second suspension upright 20b is associated with a respective second hub assembly 40b. Each suspension upright 20a and 20b is also attached to a respective end 16a and 18a or 16b and 18b of the upper and lower bridges 12 and 14. Further, each wheel hub assembly 40 is movable along or across the respective suspension upright 20 such that the wheels 6 are movable relative to the upper and lower bridges 12 and 14 during suspension action (i.e. compression and rebound motions). At least one steering element (shown in FIG. 1 as left and right steering rods 36a, 36b) is rotatably connected to each or a respective suspension upright 20 to cause the suspension upright 20 to pivot about a steering axis Y upon movement of the steering element to steer the motor vehicle 1. Accordingly, the motor vehicle is arranged such that movement of the wheels 6 and the wheel hub assemblies 40 associated with the suspension compression and rebound action is independent of movement of the steering element. That is to say, the suspension compression and rebound action is independent of the steering action, such that the geometry (the linkage arrangement) of the steering arrangement does not generate bump steer. The at least one steering element in this embodiment is implemented as at least one steering rod 36, which will be described in more detail below.

Furthermore, with reference to FIG. 4, the connecting member 22 of each suspension upright 20a or 20b is attached to a respective end 16a and 18a or 16b and 18b of both of the bridges 12 and 14 such that each suspension upright 20a or 20b is pivotable about a respective upper tilt joint axis T relative to the upper bridge 12 and pivotable about a respective lower tilt joint axis T' relative to the lower bridge 14. The bridges 12 and 14 and the connecting members 22 of the uprights together forming a quadrilateral such as a parallelogram for example. More specifically, referring to FIGS. 4 and 5, the (first) ends 16a and 18a of the upper and lower bridges 12 and 14, respectively, are attached to the connecting member 22 of the (first) suspension upright. Similarly, the (second) ends 16b and 18b of the upper and lower bridges 12 and 14, respectively, are attached to the connecting member 22 of the (second) suspension upright.

Figure 6:
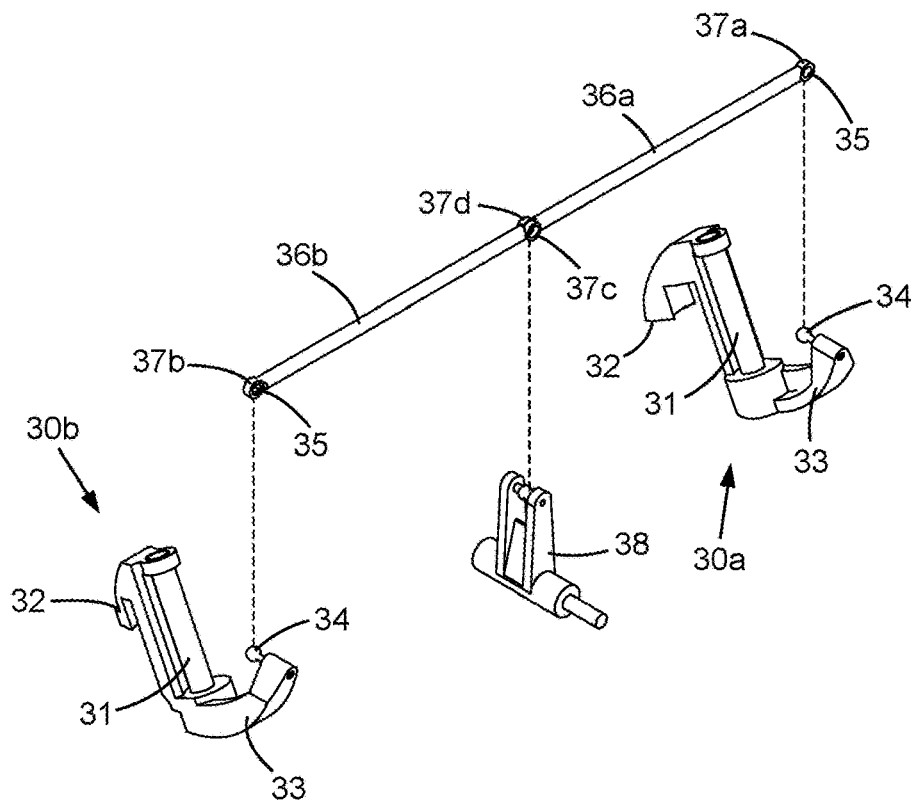
FIG. 6 is an exploded view of steering member portions of the uprights, steering rods and steering rod shifter used in the motor vehicle shown in FIG. 1.
Figure 7:
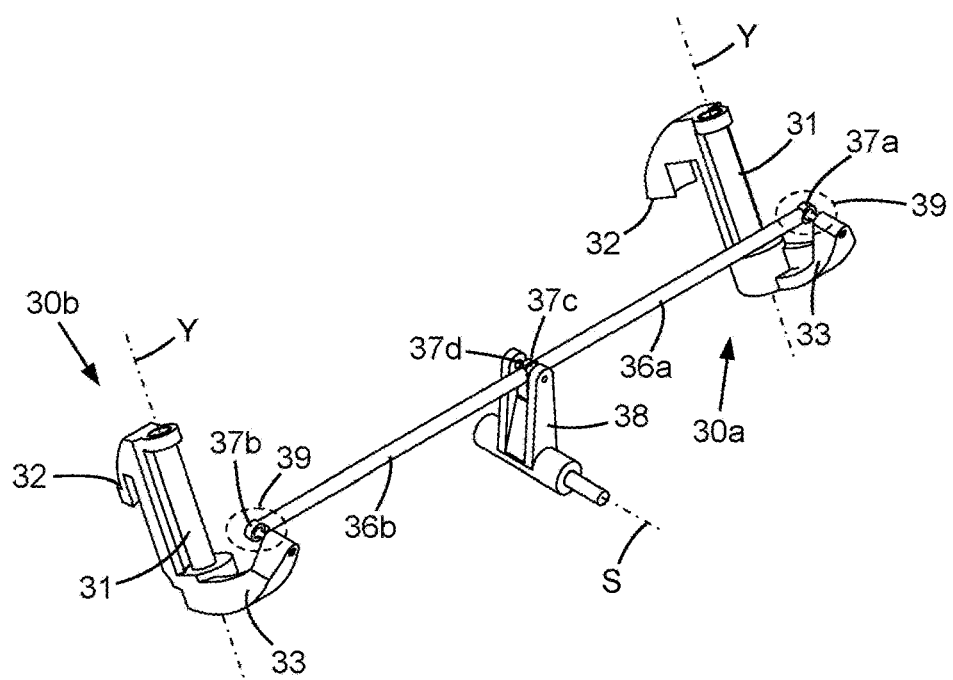
FIG. 7 is a perspective view of the steering member portions of the uprights, the steering rods, and the steering rod shifter shown in FIG. 6.

As can be seen in FIG. 4, each connecting member 22 includes a largely tubular hollow portion (cylindrical bore) 23. Referring now also to FIGS. 6 and 7, the steering members 30a, 30b (or collectively, steering member(s) 30) each include two sleeves 31 and 32. When assembled as shown in section in FIG. 14, the sleeve 31 of the steering member 30 is located inside the tubular portion 23 of the connecting member 22 providing a pivot about the steering axis Y. With particular reference to FIGS. 6 and 7, a steering rod shifter 38 rotates about axis S driving the at least one steering rod 36 left and right and rotating the left and right steering members 30a and 30b about respective steering axes Y. The at least one steering rod 36 is implemented as a first steering rod 36a and a second steering rod 36b each having a respective outer end 37a or 37b (collectively, "outer end(s) 37") rotatably coupled to steering members 30a and 30b, respectively of the respective uprights 20. However, a person skilled in the art will appreciate that the steering rod 36 may be configured in other forms. Each steering member 30 comprises a rigid arm 33 supporting a ball 34. The outer end 37 of each steering rod 36a, 36b comprises a corresponding socket 35. Collectively, the ball 34 and socket 35 may hereinafter be referred to as "the ball joint 39".

As can be seen in FIGS. 13 to 18, each wheel hub assembly 40 is slidably connected to the respective steering member 30. Accordingly, as can be seen in FIG. 2, the steering member 30a, and thus also the wheel hub assembly 40a and the wheel 6a, is pivotable about the steering axis Y (through the first suspension upright 20a) relative to the bridges 12 and 14, allowing for steering of the wheel 6a. Simultaneously, the steering member 30b, and thus also the wheel hub assembly 40b and the wheel 6b, is pivotable about the steering axis Y (through the second suspension upright 20b) relative to the bridges 12 and 14, allowing for steering of the wheel 6b. Referring again to FIG. 1, the steering rods 36a, 36b are actuated by the steering wheel 8 and connected to the steering members 30a, 30b shown in FIG. 2 to control the rotational position of the steering members and therefore the wheel hub assemblies 40a, 40b and the wheels 6a, 6b. The controlled pivoting of the steering member 30 (about the respective steering axis Y of FIG. 2 for example) thereby provides the steering function of the suspension to enable steering of the vehicle 1.

Figure 8:
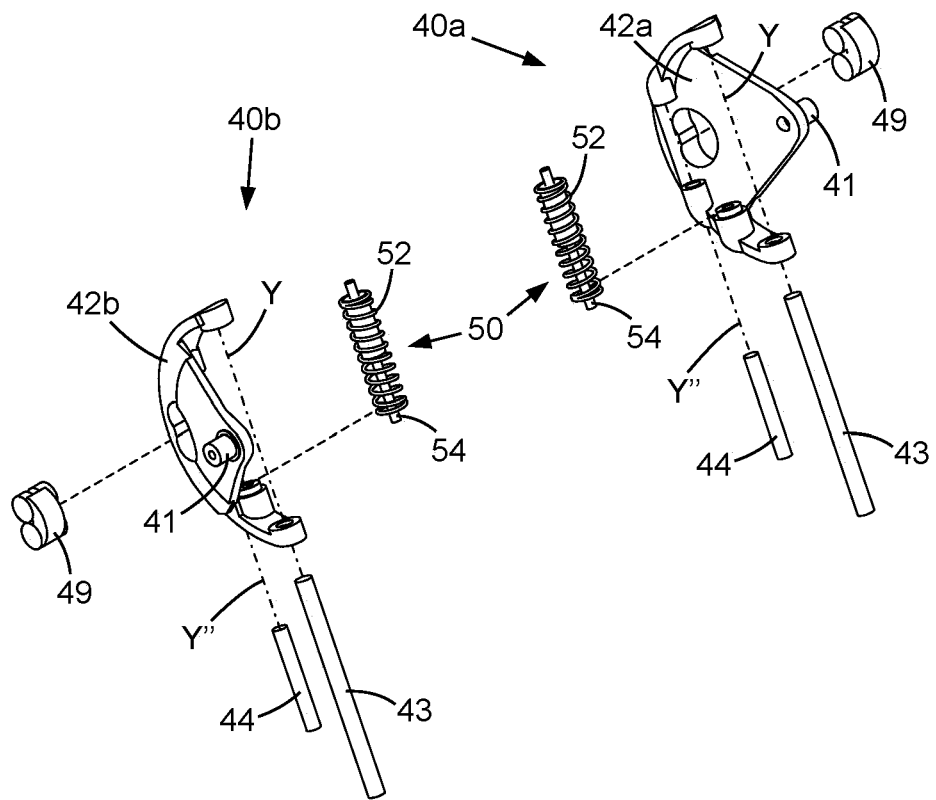
FIG. 8 is an exploded view of hub assemblies used in the motor vehicle shown in FIG. 1.
Figure 9:
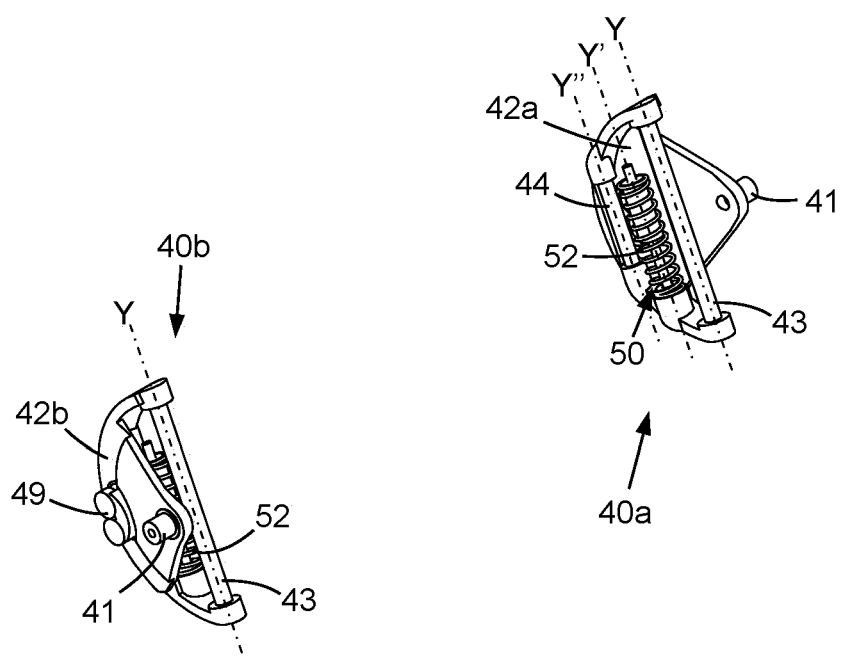
FIG. 9 is a perspective view of the hub assemblies shown in FIG. 8.

As mentioned above, each wheel hub assembly 40 is movable along or across the respective suspension upright 20 such that the wheels 6 are movable relative to the bridges 12 and 14 during suspension action. In particular, the slidable connection of each wheel hub assembly 40 to the respective steering member 30 provides that each wheel hub assembly 40a or 40b is movable relative to the respective steering member 30a or 30b. For example, as shown in FIGS. 8 and 9, the wheel hub assembly 40 can include a hub carrier 42a or 42b (or collectively, hub carrier(s) 42) and two spaced apart guide rods 43, 44. The guide rods 43, 44 are aligned with parallel axes, in this case Y and Y'''. Although preferable, the steering axis Y does not need to be used and the sliding motion does not need to be parallel with the steering axis. As shown in FIGS. 13 to 18, the wheel hub assembly 40 can therefore slide in a linear direction relative to the steering member 30 of the upright 20, but is prevented from rotating relative to the steering member of the upright.

Figure 13:
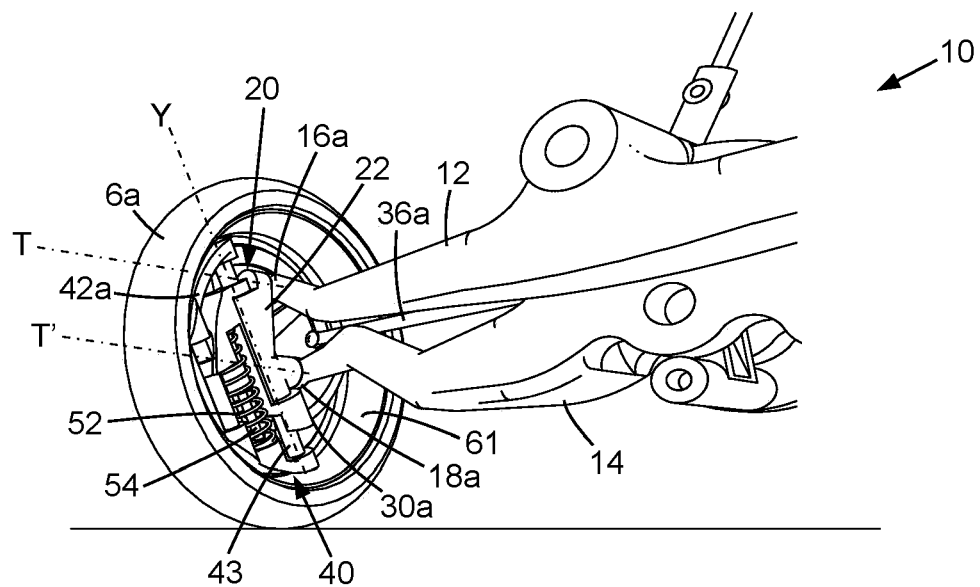
FIG. 13 is a perspective view of components of the motor vehicle shown in FIG. 1 at a ride height.
Figure 14:
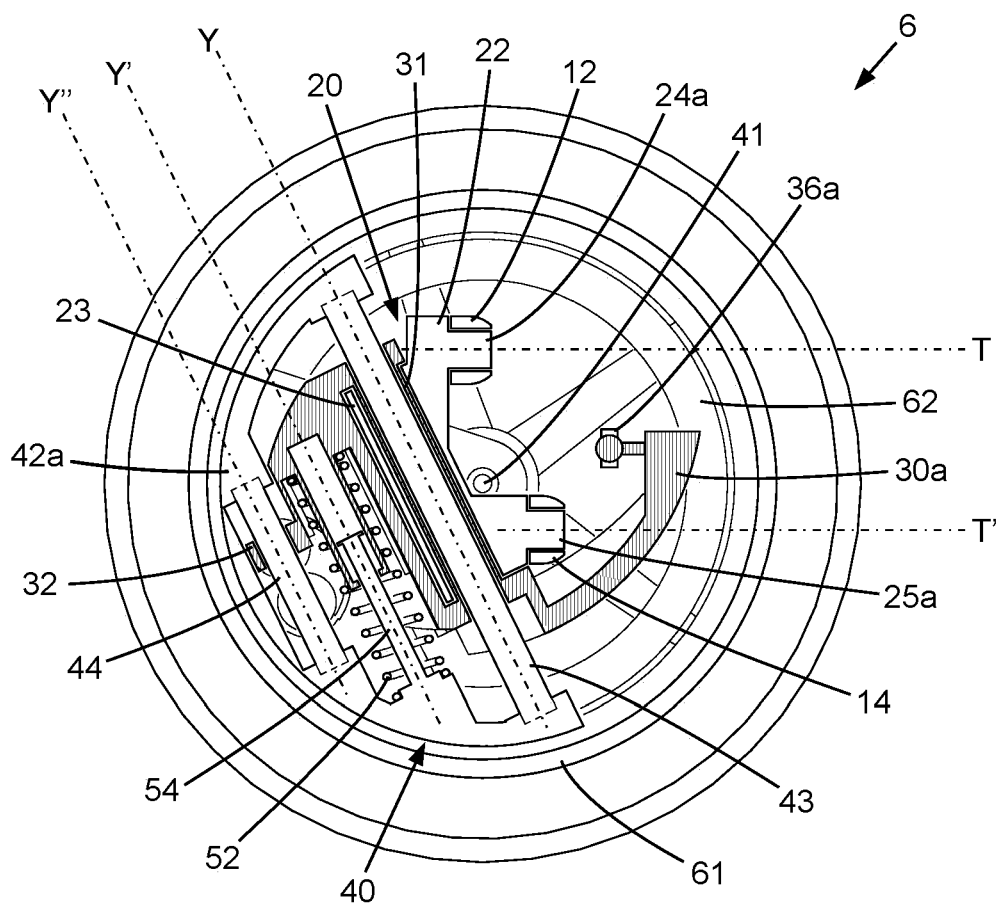
FIG. 14 is a sectional view of components of the motor vehicle shown in FIG. 1, shown at the same height as FIG. 13.
Figure 15:
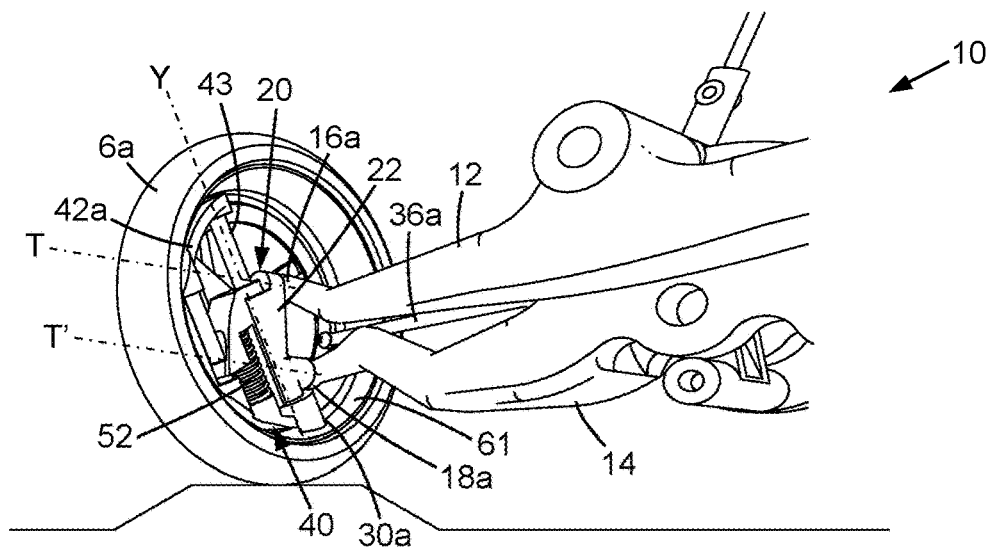
FIG. 15 is a perspective view of components of the motor vehicle shown in FIG. 1 with the suspension compressed over a bump.
Figure 16:
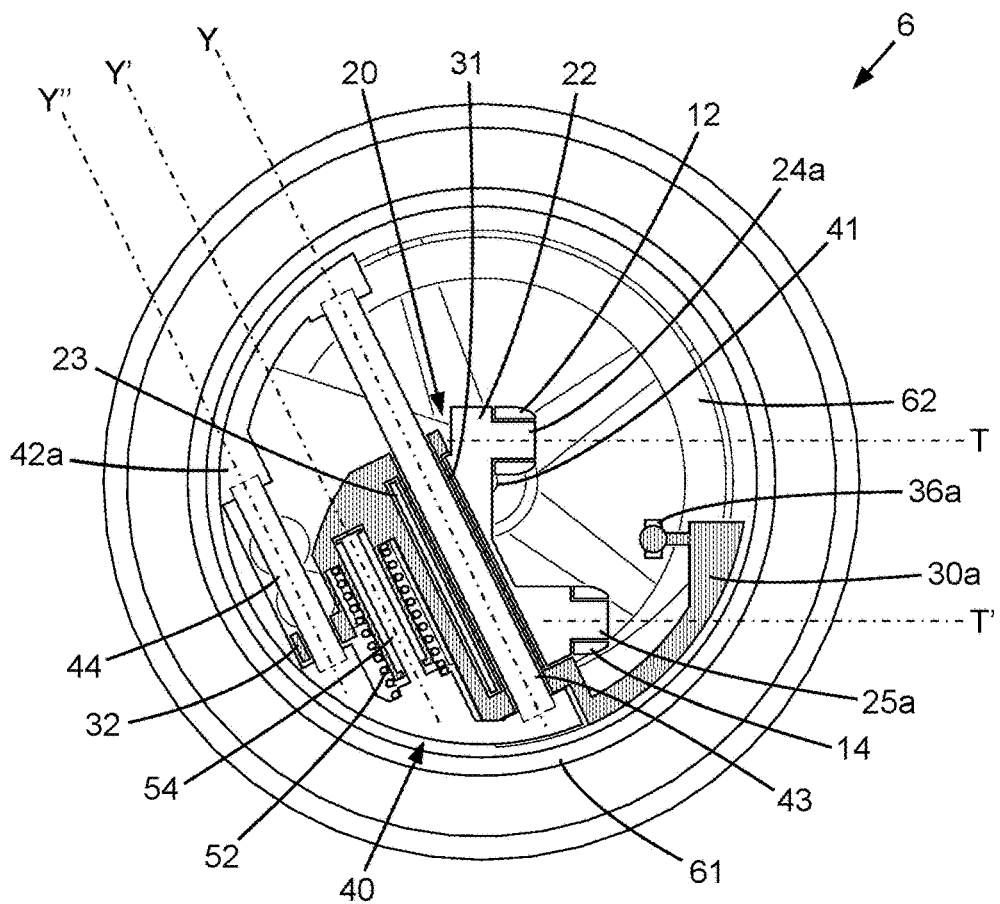
FIG. 16 is a sectional view of components of the motor vehicle shown in FIG. 1, shown at the same height as FIG. 15.
Figure 17:
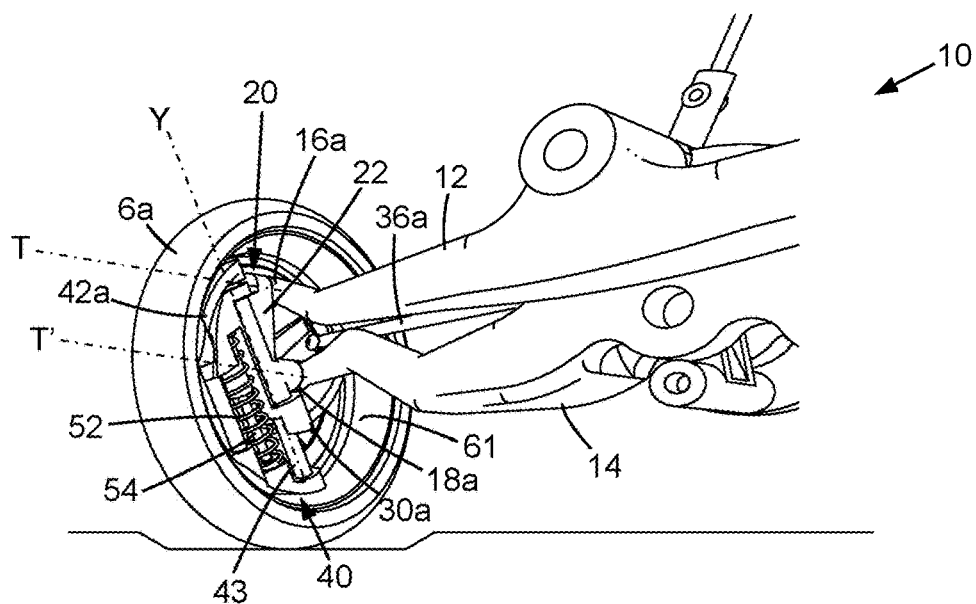
FIG. 17 is a perspective view of components of the motor vehicle shown in FIG. 1 with the suspension rebounded into a pothole.
Figure 18:
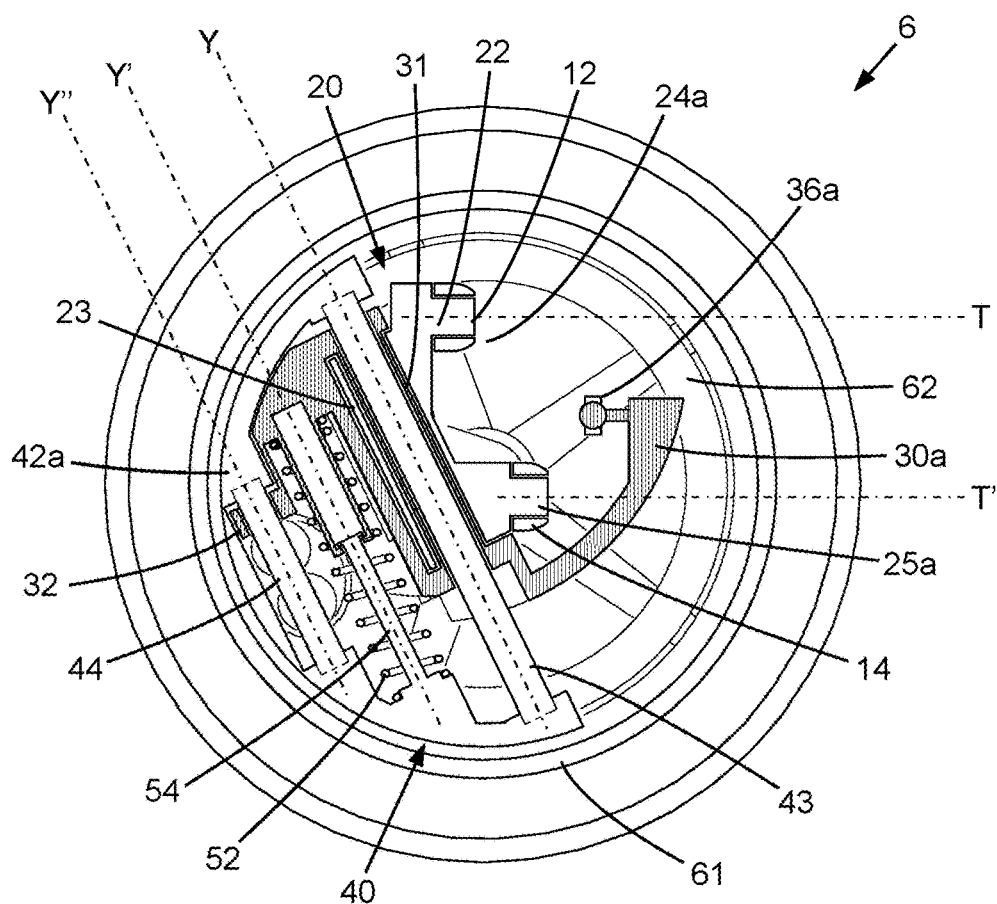
FIG. 18 is a sectional view of components of the motor vehicle shown in FIG. 1, shown at the same height as FIG. 17.

The wheels 6 mounted on the respective hub assemblies 40 are also movable along respective axes Y during suspension compression or rebound action, with a mid-stroke and/or ride height position being shown in FIGS. 13 and 14, a compression position being shown in FIGS. 15 and 16, and a rebound position being shown in FIGS. 17 and 18. The wheels 6 can therefore move upwards and downwards with respect to the body of the vehicle. For the avoidance of confusion, the term "with respect to the body of the vehicle" means that the upwards and downwards directions rotate with tilt of the body rather than being maintained perpendicular to the ground. Accordingly, any suspension compression or rebound motion experienced by one or both wheels 6 may not adversely affect the ability for the steering mechanism (including steering member 30 and steering rods 36a, 36b) to steer the wheels 6. Steering by the steering rods 36a, 36b would be undesirably altered if for example a suspended wheel could cause a variation in angle between the steering rods 36a, 36b and the bridges 12 and 14 when viewed in end view during either suspension compression and rebound motions or during tilting motions of the vehicle. However, because both bridges 12 and 14 and the steering rods 36a, 36b are attached to the suspension uprights 20 (rather than to the wheel hub assemblies 40 which are movable with respect to the uprights 20), the position of the steering rods 36a, 36b can remain unaltered during wheel suspension compression and rebound motions.

It is possible to replace the left and right steering rods 36a, 36b with a single steering rod rotatably connected at either end to the uprights and rotatably connected at the centre to the steering rod shifter. However, a single steering rod requires either some flex when viewed in plan view or a freedom to slide along the steering rod shifter pivot axis in order to accommodate the small fore-aft motion of the steering joints on the uprights 20 as the steering members 30 rotate during steering motion. Due to the inclination of the steering axis and the arcuate motion of the rotatable connection to the steering rod shifter, an even smaller relative vertical displacement can occur during steering motions, again requiring flex of the single steering rod for example.

It will be understood that any features described with respect to one hub assembly 40, suspension upright 20, hub carrier 42, wheel 6, steering member 30 or connecting member 22 will also apply to the other, unless specifically stated otherwise. With particular reference to FIGS. 13 and 14, each wheel 6 (and rim 61 of the wheel 6) is mounted to and rotatable about the hub carrier 42 of the hub assembly 40 via pivotal connection 41 (see also FIG. 2 and FIGS. 8 and 9). Accordingly, the hub carrier 42 does not rotate with the wheel 6, but is capable of maintaining its rotational position as the wheel 6 rotates.

The hub assemblies 40 are linearly movable relative to the respective uprights 20 along respective guides between the hub assemblies 40 and the suspension uprights 20. According to this embodiment, the linear movability is accomplished by implementing the steering member 30 of each upright 20 to include a sleeve 31 (see FIGS. 6 and 7), and each hub assembly 40 to include a guide rod 43 (see FIGS. 8 and 9) extending through the respective sleeve 31. Each rod 43 is disposed within an inner periphery of the rim 61, but is also fixedly attached and remains in position relative to a remainder of the hub assembly 40. Thus, the wheel 6 is also configured to rotate around the hub carrier 42.

The rods 43 are longer than the sleeves 31 to provide clearance for the rods 43 to displace linearly within the sleeves 31. A biasing member 52 is also positioned within a periphery of each wheel 6 in order to bias the hub carriers 42 towards a predetermined position relative to the respective upright 20 after suspension compression or rebound action. In this embodiment, the biasing member is implemented as a coil spring 52. The spring 52 is compressible and expandable along an axis Y' parallel to the axis Y. This can be achieved by introducing another rod or in this example a piston rod assembly 54 such as a damper or "shock absorber" between the hub assembly 40 and the upright 20 and disposed parallel to the guide rod 43. This forms a spring damper assembly 50 comprising the piston rod assembly 54 extending axially through and supporting the spring 52 in a manner commonly referred to as a "coil-over". Accordingly, the wheels 6 can move upwards and/or downwards (i.e. along axis Y) relative to the body 4 of the vehicle 1 during suspension compression and rebound action.

This arrangement of hub assembly 40 as shown in FIG. 9 may be referred to as a "space frame hub". That is, the loads from the wheel are transmitted to the pivotal connection 41 or stub axle located on the hub assembly in the centre of the wheel, then radially outwards through the hub carrier 42 before heading back inwards along the rod 43 of the hub assembly 40. In more detail, from the centrally located pivotal connection 41, the hub assembly transfers the wheel loads radially outwards (in the direction of) the wheel rim. The first and second rods 43, 44 in the hub assembly are held by or fixed to the rest of the hub assembly at locations radially spaced from the centre of the hub assembly. A significant portion of the roll and pitch directions loads (i.e. in the camber direction or in the braking direction) are transmitted from the rod 43 of the hub assembly 40 to the sleeve 31 of the upright at an inward radial position nearer to the central axis of the pivotal connection 40 or stub axle.

With further reference to FIG. 2, in order for axial movement of the steering rods 36a, 36b to translate to steering of the wheels 6, the steering member 30 is coupled to the hub assembly 40 at another location within a periphery of the rim 7. In particular, as shown in FIG. 8, the wheel hub assembly 40 comprises another rod, the second guide rod 44, which is linearly movable within another sleeve 32 of the steering member 30 along an axis Y" (see FIG. 14) parallel to the axes Y, Y'. Operation of the steering rods 36a, 36b (i.e. by turning a steering wheel 60—see FIGS. 1 and 12—and steering rod shifter 38—see FIG. 7) thus pushes/pulls the ball joint 39 towards or away from the body 4 of the vehicle 1, causing the front wheels 6 to pivot about the steering axis Y.

Functionally, in this embodiment the hub assembly 40 does not freely rotate relative to the upright 20. This is beneficial as it may ensure that steering rotations of the upright (or of the steering member portion of the upright, where provided) are transmitted to the hub assembly. The use of the second guide rod 44 in parallel with the first guide rod 43 as illustrated is only one possible way of accomplishing this functionality. One possible alternative to the use of two cylindrical rods (operating in tubular sleeves) in parallel would be to use a single square section guide rod as is known in the front suspension of some motorcycles and bicycles. Such a square section guide rod typically runs in or on spaced apart sets of needle roller bearings, each set of needle roller bearings typically comprising two orthogonally positioned pairs of needle roller bearings, although other supporting bearing arrangements are possible. Similarly other sliding arrangements are possible between the hub assembly and the upright to provide sliding with rotational stability or a rotational constraint.

FIG. 3 shows the suspension uprights 20 of the front suspension, being a left suspension upright or first suspension upright 20a and a right suspension upright or second suspension upright 20b. Each suspension upright comprises two main parts: the connector 22 that connects between the upper and lower bridges at each end; and the steering member 30(a, b) that can rotate relative to the connector 22 but not slide, i.e. the uprights do not provide the suspension compliance or resilience, but they do provide tilt location and steering orientation.

With particular reference to FIG. 2, the bridges 12 and 14 are rigid bridge structures, each spanning one wheel 6a to another 6b. As shown in FIGS. 4 and 5, the upper and lower bridges 12 and 14 are each connected to the uprights 20 via respective joints 28 or 29 to allow for tilting of the vehicle 1. If the joints 28 and 29 are ball joints then the uprights 20 can each be a single piece comprising the connecting member 22 and the steering member 30 as the steering rotation can be accommodated by the ball joints, so no relative rotation is then required between the connecting member and steering member. However in this embodiment as shown in FIG. 4 for example, the joints 28 and 29 are pivots and the uprights 20 each comprise a connecting member 22 pivotally connected to the sleeve 31 portion of the steering member 30 as shown in FIG. 14. More specifically, the connecting members 22 comprise a tubular portion 23 mounted to the sleeve 31 in a manner that at least partially surrounds the sleeve 31.

Further, as shown in FIG. 4, the connecting members 22 also comprise at least two bosses 24(a, b) and 25(a, b) configured to extend through respective apertures 17(a, b) and 19(a, b) provided at each bridge end 16(a, b) and 18(a, b) to form pivotal connections. The bosses 24(a, b) and 25(a, b) are spaced apart substantially along a length of the tubular portion 23. Specifically, regarding bridge 12, the aperture 17a of end 16a is connected to boss 24a of connecting member 22 of the first suspension upright 20a, and the aperture 17b of opposite end 16b is connected to boss 24b of connecting member 22 of the second suspension upright 20b. Similarly, regarding bridge 14, the aperture 19a at end 18a is connected to boss 25a of connecting member 22 of the first suspension upright 20a, and the aperture 19b at opposite end 18b is connected to boss 25b of connecting member 22 of the second suspension upright 20b. Accordingly, when connected to the connecting members 22, the bridge 14 is generally positioned lower and forward of the bridge 12 with respect to the body 4 of the vehicle 1, as shown particularly in FIGS. 1 and 12.

Figure 19:
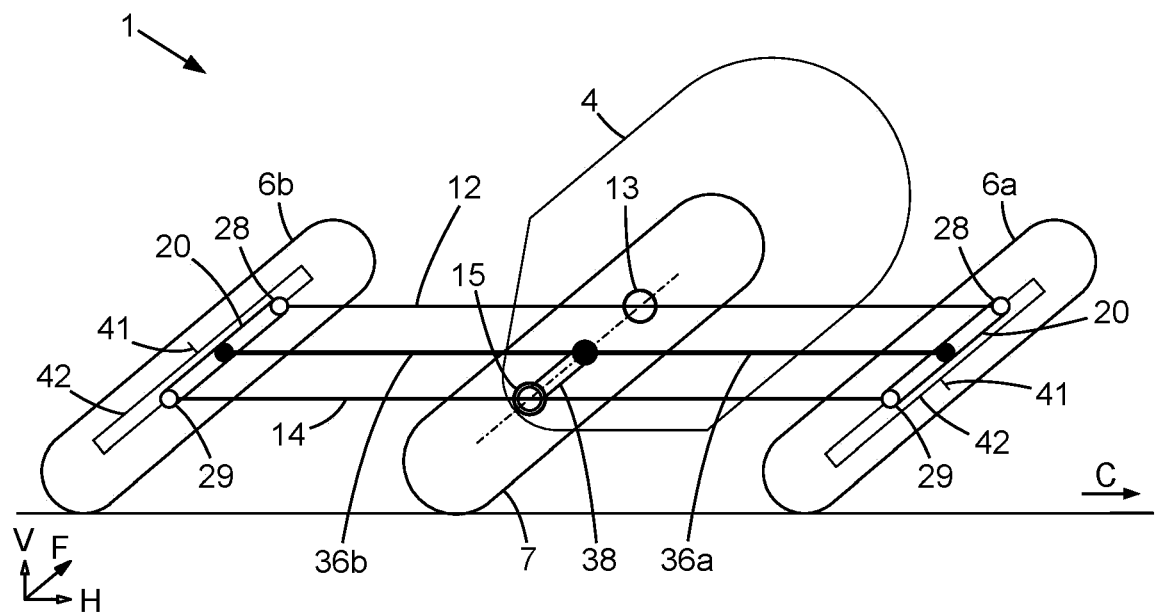
FIG. 19 is a schematic front view of a motor vehicle according to an embodiment of the present invention, leaning into a left-hand turn.

Tilting of the vehicle 1 (e.g. as the body 4 of the vehicle 1 leans to one side) can thus be achieved by tilting of the wheels 6 with respect to the bridges 12 and 14, as illustrated in the schematic diagram shown in FIG. 19. In that event, the upper bridge 12 will shift generally in a horizontal direction relative to the lower bridge 14; however the bridges 12 and 14 will generally remain parallel even during full tilt. The bridges 12 and 14 rotate relative to the body 4 of the vehicle 1 at the respective upper bridge body mount 13 or lower bridge body mount 15.

Figure 20:
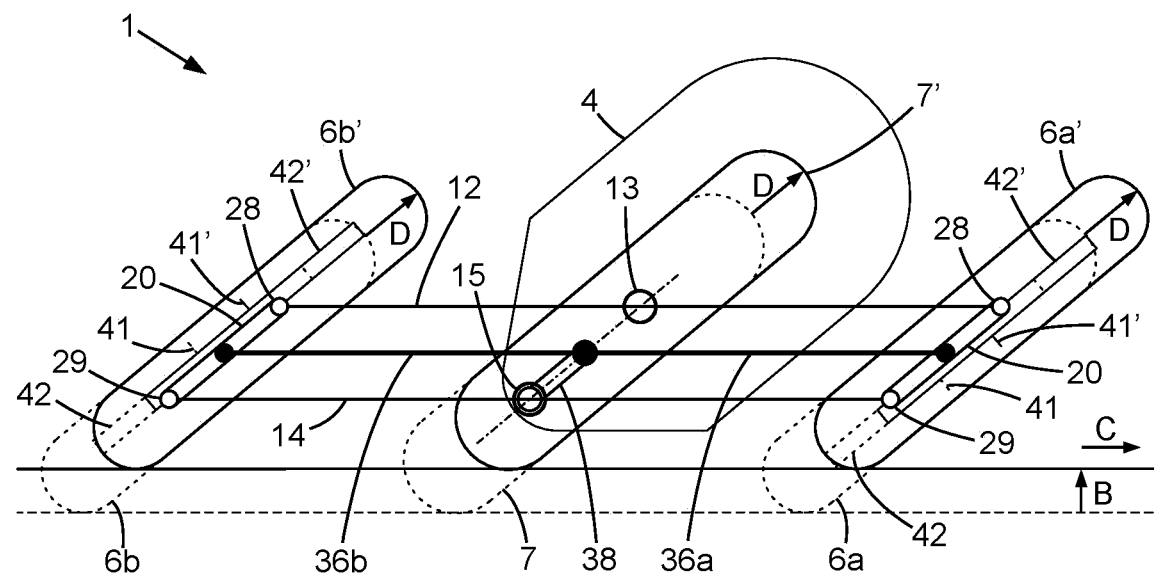
FIG. 20 is a schematic front view illustrating how the motor vehicle of FIG. 19 may react when encountering a step change in ground height whilst turning.

It will be appreciated that because the steering rods 36a, 36b are also rotatably connected to the steering members 30 which are part of the suspension uprights 20, the rods 36a, 36b may also remain generally parallel to the bridges 12 and 14 during tilting of the vehicle 1. Accordingly, operation of the steering rods 36a, 36b may be independent of tiling of the vehicle 1. Furthermore, because as shown in FIGS. 13 and 14 the suspension uprights 20 and hub carriers 42 are disposed substantially within a periphery of the respective rim 61 of the wheels 6, the uprights 20 and hub carriers 42 may also tilt with the wheels 6. Thus, as shown in FIG. 20, any suspension compression and rebound action experienced by the wheels 6 may also be independent of tilting of the vehicle 1. In other words, embodiments of the invention may provide a vehicle 1 that has independent suspension compression and rebound, steering and tilting responses.

Figure 21:
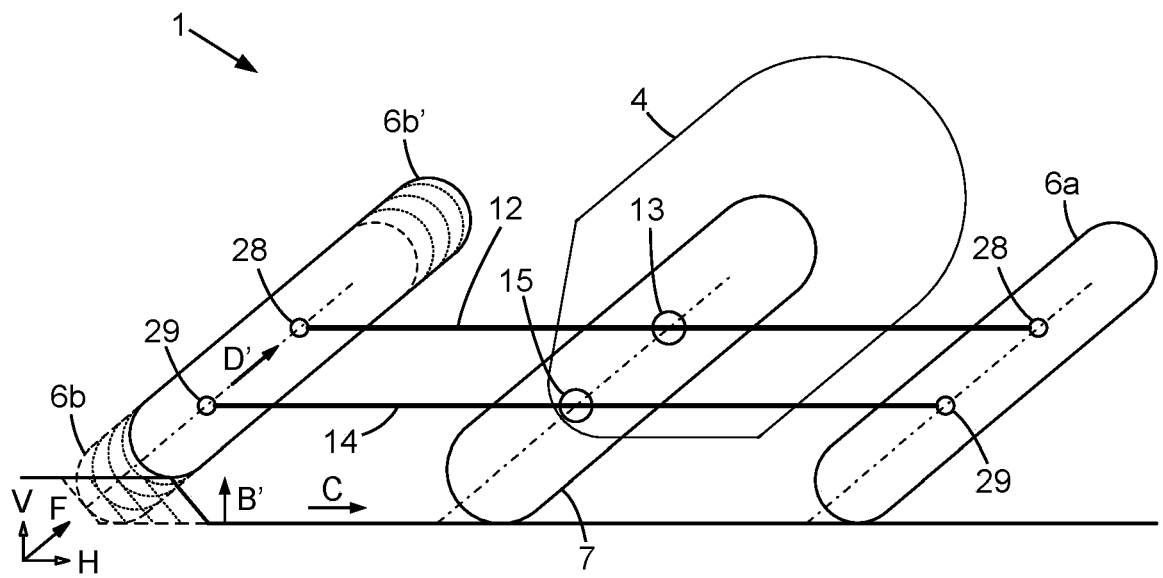
FIG. 21 is a schematic front view illustrating how the motor vehicle of FIG. 19 may react when encountering a single wheel input.

Tilting motions of the vehicle can be controlled or damped using, for example, components shown in FIGS. 10 and 11. To assist in absorption of an impact force in suspension of the wheel 6 while tilting, as shown in FIG. 21 and described below, the vehicle 1 according to a further embodiment incorporates a tilt damper 55 as shown in FIGS. 2, 10 and 11. The tilt damper may be a single rotary damper or at least one, optionally two linear dampers. For example, the tilt damper 55 according to the specific embodiment shown in FIGS. 10 and 11 comprises a piston/cylinder assembly including a piston rod 56 slidable within a cylinder 57. A damper assembly may comprise a ram of the through-rod type, i.e. the piston rod 56 comprises a rod extending from either side of the piston inside the cylinder 57 and extending out of both ends of the cylinder 57. One end of the assembly (i.e. an end of the piston rod 56 that is not connected to the cylinder 57, but instead protrudes out of the cylinder) is a mount point 58a pivotally connected to a boss or ball 59 extending from the (lower) bridge 12 (see also FIGS. 2 and 5). The body of the cylinder 57 is pivotally connected to an underside (not shown) of the vehicle 1 by the mount point 58b on the cylinder 57.

The tilt damper 55 is arranged such that when the wheels 6 are in an upright position, the tilt damper 55 is disposed at an incline. In this position, the damper 55 is generally between an uncompressed position and a compression position. This allows for tilt (i.e. rotation of the body relative to the bridges) in both directions. The geometry of the tilt damper arrangement, such as the locations of the mounts of the tilt damper assembly affecting the characteristic of the variation in the tilt damper assembly length versus tilt angle, can be chosen to provide a desirable non-linear characteristic from a linear tilt damper assembly.

It will be appreciated that preferably, a second damper (not shown) can be arranged to incline in an opposite direction to the damper 55 in order to prevent asymmetries in the damping forces (i.e. when tilting to the left as compared to when tilting to the right).

A tilt brake arrangement 70 and/or a tilt adjustment arrangement 75 are preferably provided as shown in FIGS. 2, 10 and 11. The tilt brake arrangement 70 includes a curved element or tilt brake disc portion 71 connected to the lower bridge 14 and a clamping or locking element 72 connected to the body of the vehicle. The tilt brake arrangement 70 enables the tilt motion of the body relative to the front suspension to be selectively braked or locked. The curved element or tilt brake disc portion 71 can be a portion of an annular brake disc i.e. a ring brake portion. The clamping or locking element 72 can be a brake calliper.

The tilt adjustment arrangement 75 includes a curved element such as a partial gear element 76 connected to the lower bridge 14. The partial gear element can be driven by a motor 77 connected to the body of the vehicle to enable the tilt attitude of the body relative to the front suspension to be adjusted, either to right the body if it is leaning inappropriately, or to drive a tilt of the body into a corner at a faster rate or earlier time than would happen passively. Alternatively, the motor 77 can be a motor generator and can in addition to the tilt adjustment, also be used to damp tilt motions of the body relative to the front suspension, either in place of or in addition to the tilt damper 55. Preferably, the tilt of the vehicle body 4 is passive like a motorcycle and similar to a motorcycle the tilt into a corner can, for example, be initialised by a counter-steer. However, the use of the tilt adjustment arrangement can be used to ensure that the vehicle tilts appropriately at all times even when driven without initial counter-steer.

With reference to FIGS. 2 and 14, each wheel 6 of the vehicle according to this embodiment comprises a brake rotor 62 that instead of a conventional brake disc is a ring brake. The ring brake type brake rotor 62 is rigidly attached in a concentric manner to the rim 61 of the wheel 6. Preferably, an outer circumferential edge of the brake rotor 62 is attached to an inner surface of the rim 61, and braking callipers 49 (also shown in FIGS. 8 and 9) are arranged over the inboard and outboard surfaces of the brake rotor 62 to selectively grip the ring brake. Also preferably, the brake rotor 62, when in the form of a ring brake, is attached to a portion 64 of the rim 61 in proximity to an outer side 63 of the wheels 6, the outer side facing in a direction away from the body (not shown) of the vehicle. In this manner, the brake rotor 62 may provide space for components of the suspension uprights 20 (including the steering members 30 and the connecting members 22) and wheel hub assemblies 40 (including the hub carriers 42 and the pivotal connections 41 (such as stub axles) to be situated within a periphery of the rim 61 of a respective wheel 6.

Additional steering components of a further embodiment can be seen for example in FIG. 12 which shows a longitudinal section through the vehicle 1. The position of the driver 2 is visible, seated within the body 4. At the driver end of the steering column 81 is the steering wheel 8 and at the other end of the steering column is a set of gears 82 or partial gears to transfer rotations of the steering column 81 and hence the steering wheel 8 to the steering rod shifter 38 in a ratio determined by the set of gears 82 of the steering mechanism 80. The axis of rotation of the steering rod shifter is shown at S, with the upper and lower bridge body pivot axes being shown at U and L respectively. The set of gears 82 comprises a steering column gear 83, an intermediate gear 84 and a steering rod shifter partial gear 85. However, a person skilled in the art will appreciate that other arrangements to transfer the rotational motion from the steering column to the steering rod shifter may be configured. Although not shown, a steering damper may also be configured to damp steering motions.

The front nose cone 90 of the vehicle 1 can provide at least some of the front crumple zone of the vehicle 1 and the bodywork 91 to either side of the back wheel can provide a back crumple zone. The power source 92 such as a battery pack or fuel tank is preferably located substantially under the driver 2 as shown, away from front and back crumple zones of the body. The power source 92 provides energy for the propulsion motor, such as electric motor 93 although combustion engine and hybrid drive-trains are also envisaged. The electric motor 93 drives the back wheel 7 which is located by a swing arm 94. A luggage compartment 96 is shown between the driver 2, electric motor 93 and back wheel-arch 95. A cover 97 is provided for the luggage compartment 96.

With reference to FIGS. 19 to 22, various advantages of the vehicle 1 according to one or more embodiments described above will now be discussed.

FIG. 19 is a schematic diagram illustrating the vehicle leaning into a left-hand turn when viewed from the front. The direction of the left-hand turn is indicated by the arrow C showing the cornering direction. As previously described, the upper joints 28 provide a pivotal connection between the upper bridge 12 and the connectors of the uprights 20. Similarly, the lower joints 29 provide a pivotal connection between the lower bridge 14 and the connectors of the uprights 20. However, if each upright optionally combines the respective connector and the steering member together in one substantially rigid body, then the upper joints 28 and the lower joints 29 provide rotation, effectively in all three mutually perpendicular axes, in order to provide rotations required for combined tilting and steering.

The upper joints 28 and the lower joints 29 together define the vertices of a virtual parallelogram. As the upper bridge 12 and the lower bridge 14 are both shown schematically as single lines, the upper bridge body mount 13 and the lower bridge body mount 15 are shown located at the same height as the upper or lower joints 28 or 29, i.e. on side of the virtual parallelogram. However, it should be understood that the upper bridge body mount 13 and the lower bridge body mount 15 are not necessarily located at the same height as the upper or lower joints 28 or 29, so do not need to be located on the (substantially horizontal) sides of the virtual parallelogram.

The steering rods 36a, 36b are preferably oriented such that they are parallel to the upper and lower lines of the virtual parallelogram between the upper and lower joints when viewed in an end view such as the front view of FIG. 19. Preferably the steering rods are pivoted or rotatably jointed to the steering rod shifter at a common axis at their inner ends 37c, 37d. Preferably the outer ends 37a, 37b lie on the sides of the virtual parallelogram between the upper and lower joints of the bridges, i.e. ideally the length between the outer ends of the steering rods is the same as the length between the upper joints 28 and between the lower joints 29.

A significant advantage that may be provided by keeping the suspension uprights 20 parallel to the body 4 as the vehicle leans or tilts, is that the hub carriers 42 and therefore the front wheels 6a, 6b are maintained parallel to the body. This may provide at least two benefits.

Firstly, relative motion of the wheels 6a or 6b is parallel to the body regardless of the tilt of the vehicle 1, so as the tilt of the body is generally determined by the relationship between the horizontal force H due to cornering and the vertical force V due to gravity, the relative motion between a wheel and the body is preferably aligned with the direction of the resultant force F of the horizontal component H and the vertical component V.

Secondly, as compression and rebound motions of the single rear wheel 7 of the illustrated embodiment are also typically maintained parallel to the body by the use of a rear swing arm 94 (see FIG. 12), then as shown in FIG. 20, the compression motions of the front and rear wheels are all parallel to the body and each other, even when the vehicle is tilted. This means for example that pitch motions due to accelerating or braking do not generate yaw motions felt by the driver because the front wheels and the rear wheel all move parallel to the body regardless of the tilt of the vehicle. In comparison, a vehicle having a double-wishbone front suspension and a swing axle rear suspension would have the front wheel motions substantially vertical relative to the ground and the rear wheel motions parallel to the tilt of the vehicle, which combination would generate a yaw from pitch due to accelerating or braking whilst cornering in such vehicles.

FIG. 20 shows the vehicle 1 still cornering in the direction C, but now also encountering a sudden bump B with the front wheels (and very shortly afterwards the rear wheel) moving upwards compressing the suspension before the body 4 moves upwards a corresponding amount. The position of the ground and of the wheels 6a, 6b and 7 before the bump are shown in dashed lines. The positions of the ground and of the wheels 6a', 6b' and 7' immediately after the bump are shown in solid lines. The wheels 6a' and 6b' along with their corresponding pivotal connections (or stub axles) 41' on the hub carriers 42' have all displaced in the direction D, parallel to the angle of the body 4, the wheels 6a, 6b and uprights 20. Due to the inertia of the body 4, it has not moved significantly yet, so the bridges 12, 14, the steering rods 36a, 36b and the uprights 20 have also not moved significantly. No steering is necessary to maintain the forwards trajectory of the vehicle in the arc of the corner C due to geometrical bump steer as the steering components have not moved.

Another benefit that may be provided by the suspension arrangement illustrated is that, due to the compression motions of the front and rear wheels all being parallel to the body and each other, even when the vehicle is tilted, yaw motions of the body due to bumps in corners are prevented or at least minimised. In a vehicle with motorcycle-like performance, the ability of the driver to feel yaw motions of the body due to loss of grip of the rear wheel for example, without experiencing unnecessary yaw motions from bumps in corners is a significant advantage.

FIG. 21 again shown the vehicle 1 cornering in the direction C, but in this example, is encountering a bump B' with only one of the front wheels 6b. The position of the wheel 6b and the ground before the bump B' is shown in dashed lines, the position of the wheel 6b' immediately after the bump B' is shown in solid lines. Dotted lines are used to show the position of the wheel and the ground at three intermediate points as the bump is progressively encountered. The direction of the force at the wheel is indicated at F, being the resultant of the horizontal force H acting on the wheel due to centrifugal force from cornering and the vertical force V due to gravity. The direction D' of the displacement of the wheel 6b relative to the body is generally aligned with the orientation of the resultant force F, varying with compression of the resilient biasing member 52 such as a coil spring between the hub assembly 40 and the upright 20 shown in FIGS. 13 to 18. The suspension arrangement may therefore be less susceptible to "tripping" or "high-siding" events compared to a conventional vehicle having for example double wishbone suspension, where a lateral load from a bump encountered whilst sliding laterally generates a large rolling moment on the vehicle. Additionally, the tilt damper and/or the tilt brake can be used to limit rotation of the body of the vehicle in such tripping events.

The tilt damper and/or the tilt brake or tilt rise can also be used to adjust the vehicle response to single wheel input events such as the bump in a corner shown in FIG. 21. For example, adjusting the characteristics of the wheel damper (between the hub assembly and the upright) and/or adjusting the characteristics of the tilt damper (between one of the bridges and the body) adjusts the balance between forces and displacements of the wheel relative to the bridges versus the forces and displacements of the bridges relative to the body. In this way, the transmission of the single wheel bump into the body can be adjusted. For example, higher wheel compression damping than tilt damping and wheel rebound damping may result in a greater rotation of the bridges and a low or primarily vertical force into the body for a given input. Conversely, higher tilt damping than wheel compression and rebound damping may result in a lesser rotation of the bridges and an increased rotational force into the body for the same given input. Finally, high tilt damping with high wheel compression and rebound damping may result in the lowest rotation of the bridges and the highest vertical force into the body.

Figure 22:
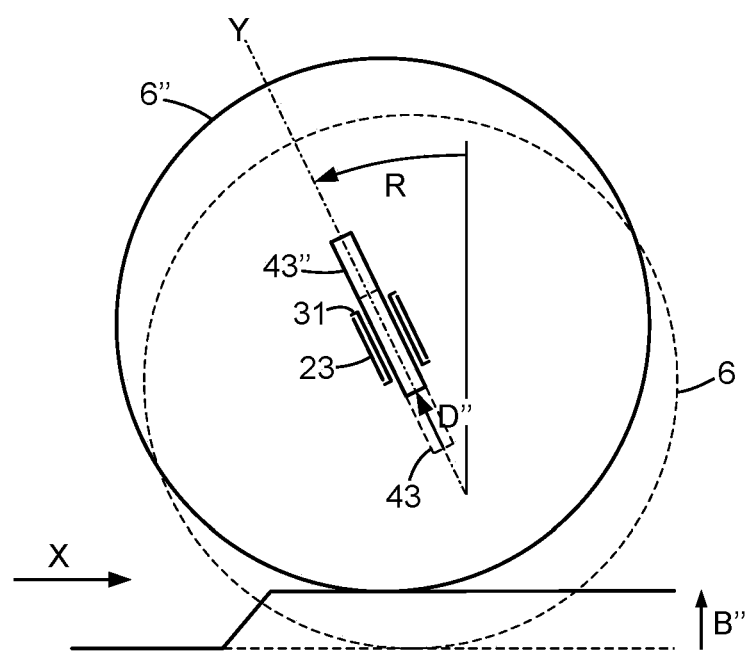
FIG. 22 is a schematic side view illustrating the direction of wheel motion in a compression input.

FIG. 22 shows the direction D" of displacement of the wheel relative to the body (not shown) in side view with the direction of travel of the vehicle being indicated by the arrow X. Dashed lines are used to show the continuation of the original ground level and the corresponding relative position of the wheel 6 and the guide rod 42 of the wheel hub assembly before the bump B". The position of the wheel 6", the guide rod 43", the sleeve 31 of the steering member and the tubular portion 23 of the connector in the upright immediately after the bump, before significant vertical displacement of the body are shown in solid lines. As can be seen, the direction D" of the displacement of the wheel 6" relative to the body (not shown) is rearwards as well as upwards due to the rake R of the steering axis Y. This rearward component of the motion in direction D" may be beneficial in reducing longitudinal impact forces into the vehicle when hitting bumps as displacement in the direction D" is compliant due to the resilience of the biasing member between the hub assembly and the upright.

The rake angle may be similar to that of a motorbike, preferably at least ten degrees, more preferably between 15 and 30 degrees and ideally between 19 and 26 degrees. As with a motorcycle, a lower rake angle R will make the vehicle more sensitive to steering inputs so more responsive to drive and a larger rake angle will make the vehicle less sensitive to steering inputs so more relaxing to drive.

FIG. 23 is a view along the steering axis Y of at least one embodiment. The ball joints 39 of the steering, the lower joints 29 of the lower bridge 14, the upper joints 28 of the upper bridge 12, the tubular portions 23 of the connectors, the sleeves 31 of the steering members and the guide rods 43 of the hub assemblies all lie on the central plane of the wheel 6a or 6b indicated by centre-line W. In many respects, the front wheels of the front suspension functionally replicate the front wheel of a motorcycle. For example, the steering axis Y is on the centreline W of the wheel. The biasing member 52 such as a coil spring and the second guide rod 44 are offset inboard rather than being centred on the wheel centre-line W for packaging reasons.

As the steering axis Y is vertical when viewed from the front, when the body 4 of the vehicle 1 is upright if two solid bridges are used (i.e. where the substantially lateral lines between the upper joints 28 and the lower joints 29 form two sides of a virtual parallelogram and the substantially vertical lines between the upper and lower joints form the other two side and are aligned with the steering axis in front view) any deviation of the steering axis from the centre-line of the tyre or wheel 6 generates a scrub radius. A small scrub radius (of up to 100 mm for example) can be useful in some applications, but larger scrub radii are typically undesirable.

If a relatively large tilt angle (of around fifty degrees for example) is desired for a sports vehicle, any significant offset (of for example 100 mm) of the upper and lower joints 28, 29 from the wheel centre-line W generates a significant increase in the angle of motion of the bridges 12, 14 during tilt, to such an extent that ground clearance of the lower joints can be seriously compromised.

Figure 50:
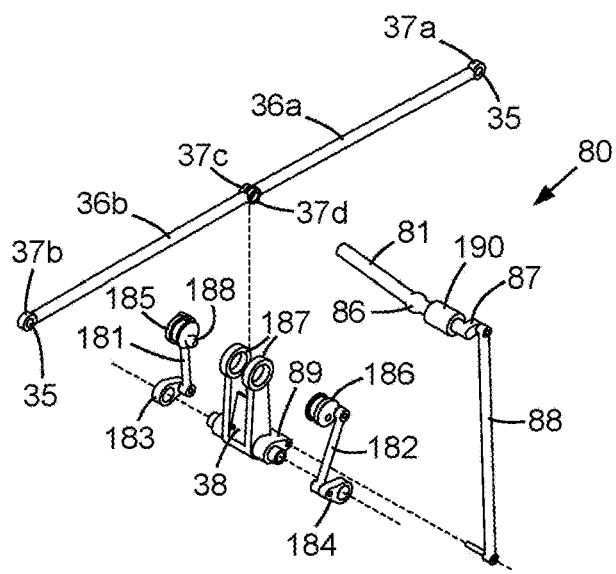
FIG. 50 is a partially exploded view of the steering components of a front suspension such as that shown in FIG. 43.
Figure 51:
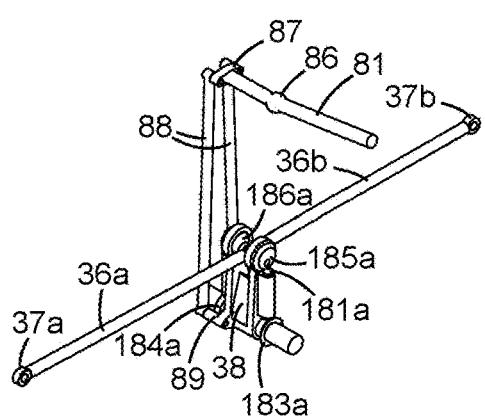
FIG. 51 is a perspective view of an alternative steering arrangement to FIG. 50.

A lateral offset of the steering ball joint 39 from the steering axis Y will provide different steered angles of the left and right wheels as the steering is moved away from centre. In non-tilting vehicles, this can be used to give some degree of what is commonly referred to as "Ackermann effect" where for true Ackermann steering geometry, each wheel is perpendicular to a line drawn from the centre of that wheel to the centre of the turning circle. However, with a tilting vehicle, offsetting the steering ball joint 39 laterally from the upper and lower pivot axes T and T' can give an incorrect steering rod length which causes steer with tilt, the steer of the left and right wheels being different, effectively giving a toe angle change with tilt. Optionally, the steering rod(s) may be variable in length, able to provide an Ackermann angle and Ackermann effect at very low speeds, but returning to zero angle or zero offset above a few kilometres per hour for example. Alternatively, the joints of the inner ends 37c, 37d of the left and right steering rods may be separately moved on the steering rod shifter, for example as shown in FIGS. 50 and 51 to achieve the Ackermann effect or an approximation or degree of Ackermann effect in the steering angle of the left and right front wheels.

For the above reasons, it is desirable to limit any offset of the ball joints 39 of the steering, the upper and lower joints 28 and 29 of the bridges 12 and 14, and the steering axis Y from the centre-line W of the wheel. This also requires the second guide rod 44 and the spring-damper assembly for the wheel including for example the coil spring 52 to be packaged at least partially within the rim of the wheel.

However, as noted above, it can be desirable to provide small lateral offsets of some of the components of the suspension from the wheel centre-line W. to this end, FIG. 24 is a view along the steering axis Y of an alternative embodiment in which the ball joints 39 of the steering, the lower joints 29 of the lower bridge 14, the upper joints 28 of the upper arms 12*a* and 12*b*, the tubular portions 23 of the connectors, the sleeves 31 of the steering members and the guide rods 43 of the hub assemblies are all slightly offset from the central plane of the wheel 6*a* or 6*b* indicated by centre-line W. The amount and direction of the offsets varies, and although any offset does detract from the ideal operation of the suspension arrangement, some offsets are possible with acceptable functionality, the degree of possible offset being generally reduced as the potential performance of the application vehicle increases.

In FIG. 24 the upper bridge is replaced by two upper arms, the left upper arm 12*a* and the right upper arm 12*b* as also shown for example in FIG. 25. Both upper arms pivot about a common upper mount 13 as does the single bridge 12 in previous FIGS. FIG. 25*a* illustrates a "piano hinge" arrangement where each arm 12*a* or 12*b* has multiple bushings spaced apart longitudinally. Having different distances between the upper joints 28 and the lower joints 29 as shown in FIG. 24 requires one of the bridges to be replaced with two arms as shown because using two single-piece bridges of different lengths would not form a parallelogram, and so would not be free to rotate as the body tilts. Either the upper or the lower bridge could be replaced with two such arms. Utilising such an arrangement having different offsets of the upper and lower joints, the camber of each wheel can vary relative to the body as the vehicle tilts. Again, while this can be desirable, it can also generate a steer of the wheels with tilt of the vehicle, although this can be largely negated with correct lateral offset or placement of the steering ball joints. It should be noted that the specific combination and direction of offsets shown in FIG. 24 are shown as an example only and are not intended to show a beneficial combination.

Figure 25B:
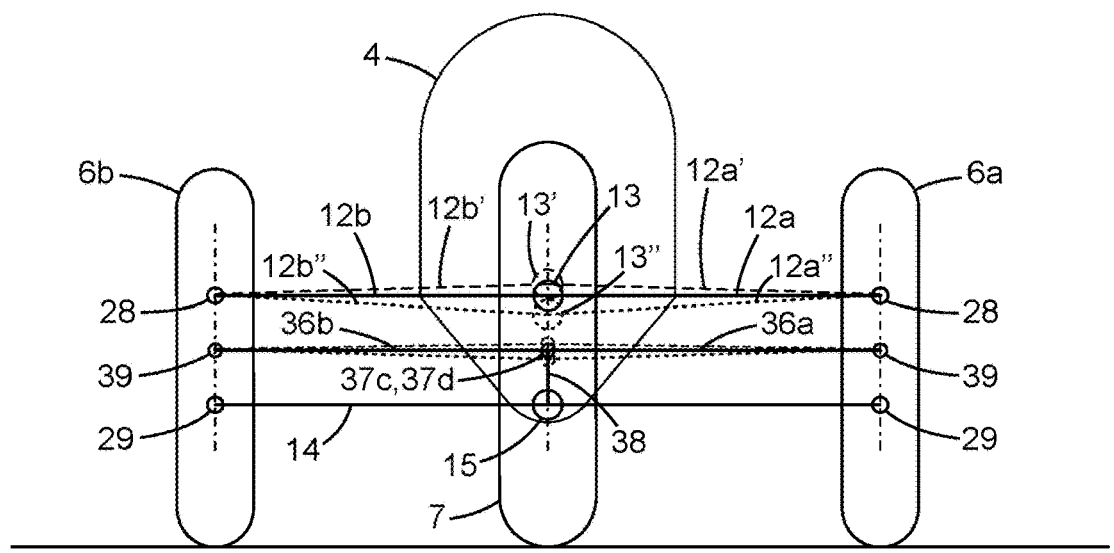
FIG. 25b is a schematic view of the vehicle incorporating the two-arm feature of FIG. 25a and showing two alternative modifications.
Figure 25C:
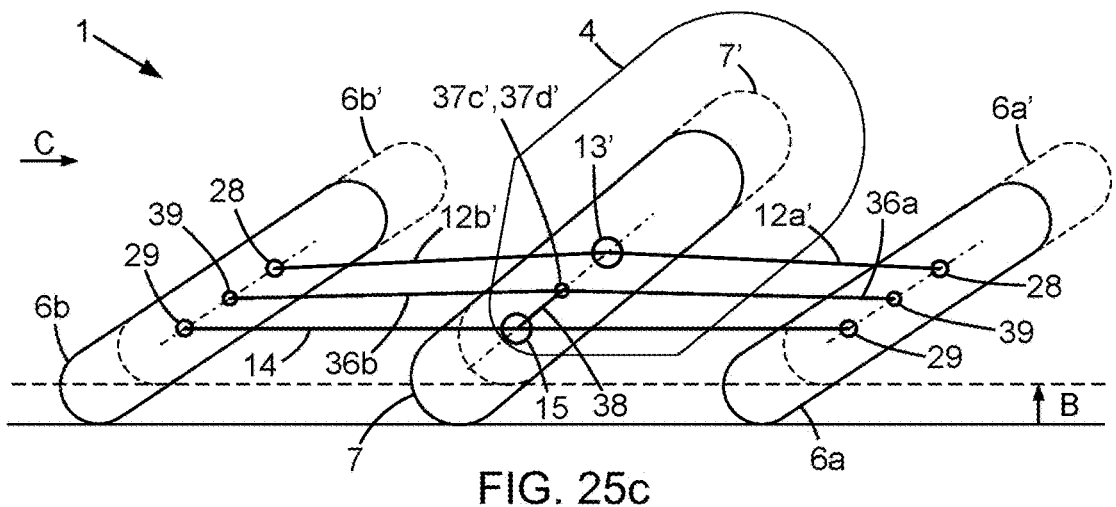
FIGS. 25c and 25d are schematic views of the vehicle of FIG. 25b showing the tilt operation of the two modifications.

FIG. 25*b* shows a schematic front view of the vehicle utilising the two upper arms 12*a*, 12*b* of FIG. 25*a*, the vehicle being in the upright position. The upper body mounts 13 are at the same height as the respective upper joint 28 to the respective upright. In this configuration with the upper joints 28 being at the same width as the lower joints 29, the two upper arms 12*a*, 12*b* remain in line when the vehicle tilts and the left and right wheels remain parallel to the body. However, if the upper mount 13' of each upper arm 12*a'*, 12*b'* to the body 4. is positioned higher than the upper joints 28 to the uprights, then as shown in FIG. 25*c*, the front wheels 6*a*, 6*b* tilt to a greater angle than the body, as the body and wheels tilt. So, increasing the height of the upper body mount 13 increases the front wheel tilt angle relative to the tilt angle of the body.

Figure 25D:
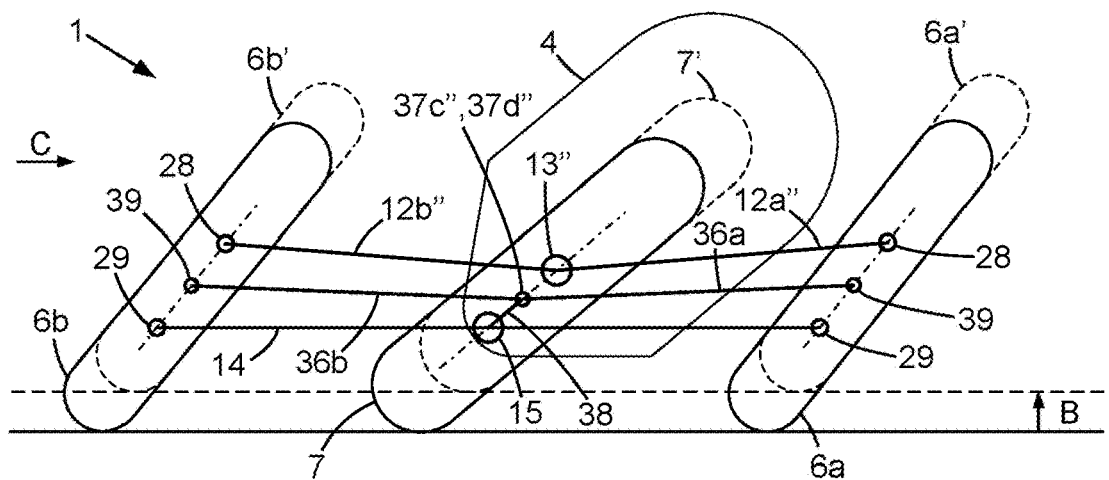

Conversely, if the upper mount 13" of each upper arm 12*a"*, 12*b"* to the body 4. is positioned lower than the upper joints 28 to the uprights, then as shown in FIG. 25*d*, the front wheels 6*a*, 6*b* tilt less than the body, as the body and wheels tilt. So, reducing the height of the upper body mount 13 reduces the tilt angle of the front wheels relative to the tilt angle of the body.

Whether the upper mount 13 is at the same height, above or below the upper joints 28 to the uprights, the steering joints between the inner ends 37*c*, 37*d* (or 37*c'*, 37*d'* in FIG. 25*c* or 37*c"*, 37*d"* in FIG. 25*d*) of the steering rods 36*a*, 36*b* and the steering rod shifter 38 are preferably at a height that is the same proportion between the upper and lower body mounts 13 (or 13' in FIG. 25*c* or 13" in FIG. 25*d*) and 15 as the steering joint 39 is between the upper and lower joints 28 and 29 at the uprights, when the vehicle is upright or not tilted.

Figure 25E:
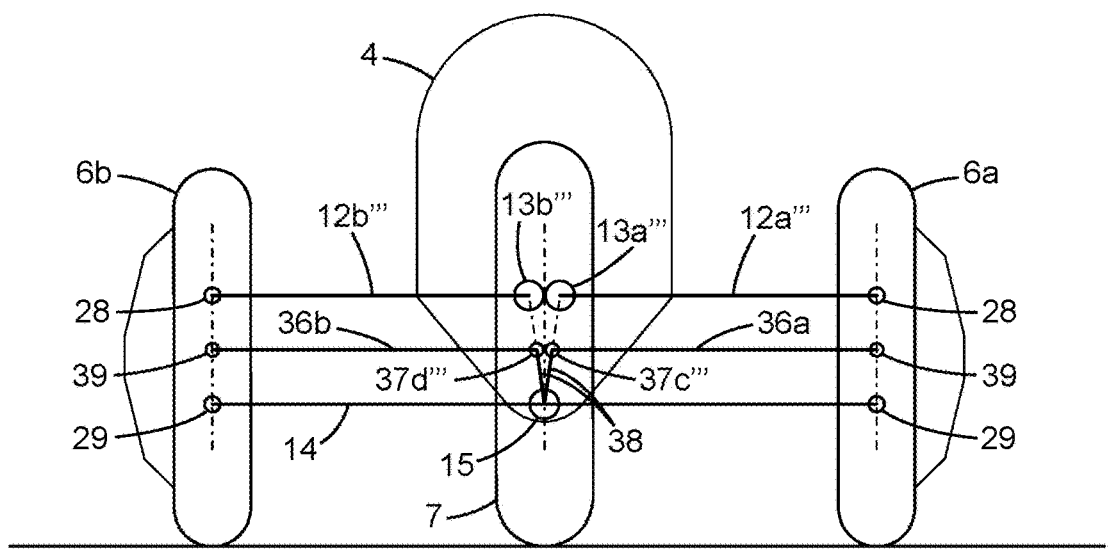
FIG. 25e is a schematic view of the vehicle incorporating a further alternative modification of the two arms.
Figure 25F:
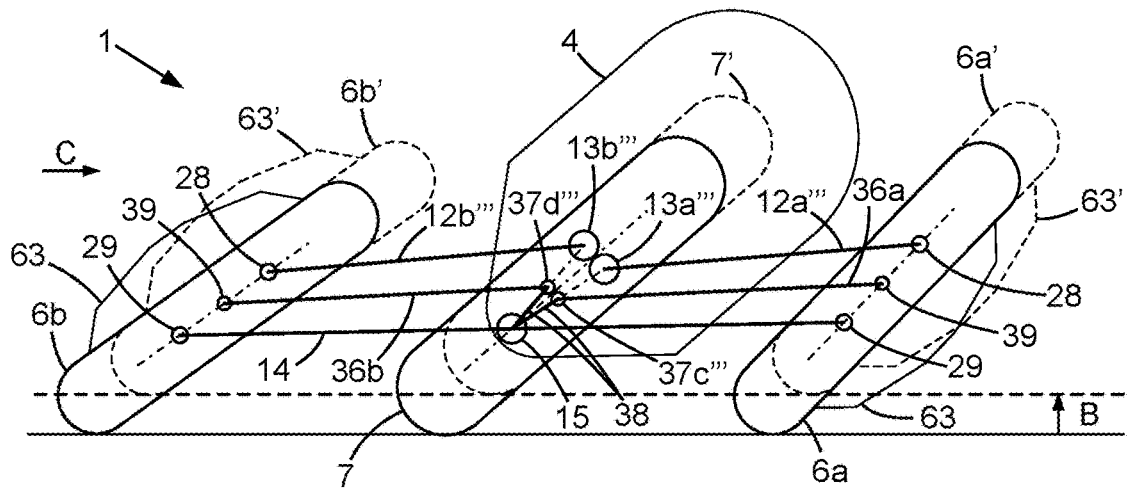
FIG. 25f is a schematic view of a vehicle incorporating the modification of the two arms of FIG. 25e, in a tilted position.
Figure 25G:
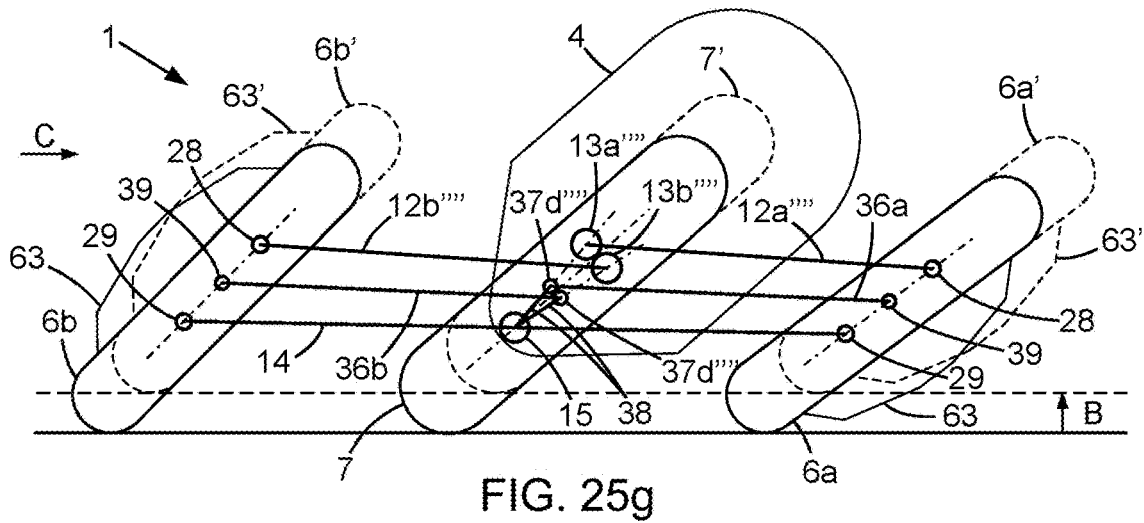
FIG. 25g is a schematic view of a vehicle incorporating a further modification of the two arms, the vehicle shown in a tilted position.

FIG. 25*e* shows a schematic front view of the vehicle utilising two upper arms 12*a'''*, 12*b'''* with laterally separated upper body mounts 13*a'''* and 13*b'''*, so the upper arms 12*a'''*, 12*b'''* could look similar to the lower arms 14*a*, 14*b* shown in FIG. 26. Reducing the distance between the upper body mount 13*a'''* and the upper joint 28 at the upright of wheel 6*a* reduces the length of upper arm 12*a'''*. Similarly, reducing the distance between the upper body mount 13*b'''* and the upper joint 28 at the upright of wheel 6*b* reduces the length of upper arm 12*b'''*. As shown in FIG. 25*f*, this induces the front wheels 6*a*, 6*b* to tilt inwardly at the top relative to the body 4, as the body and wheels tilt. Such a positioning of the upper body mounts 13*a'''*, 13*b'''* outwardly gives a reduction of the camber of the front wheels relative to the body with tilt. Conversely, increasing the distance between the upper body mount 13*a''''* and the upper joint 28 at the upright of wheel 6*a* increases the length of upper arm 12*a''''* and increasing the distance between the upper body mount 13*b''''* and the upper joint 28 at the upright of wheel 6*b* increases the length of upper arm 12*b''''*. As shown in FIG. 25*g*, this induces the front wheels 6*a*, 6*b* to tilt outwardly at the top relative to the body 4, as the body and wheels tilt. Such an overlapping position of the upper body mounts 13*a''''*, 13*b''''* increases the camber of the front wheels relative to the body with tilt.

The left and right steering rods have the steering joints 37*c*, 37*d* at the ends of the steering rod shifter 38, but each steering joint 37*c'''*, 37*d'''* or 37*c''''*, 37*d''''* lies on a virtual line between the lower bridge body mount 15 and the upper arm body mount 13*a'''*, 13*b'''* or 13*a''''*, 13*b''''* of the respective upper arm 12*a'''*, 12*b'''* or 12*a''''*, 12*b''''*. The distance between the upper arm body mount 13*a'''*, 13*b'''* or 13*a''''*, 13*b''''* and the steering joint 37*c'''*, 37*d'''* or 37*c''''*, 37*d''''* relative to the distance between the steering joint 37*c'''*, 37*d'''* or 37*c''''*, 37*d''''* and the lower body mount 15 is preferably in the same proportion as the distance between the steering joint 39 and the upper joint 28 on the upright relative to the distance between the steering joint 39 and the lower joint 29 on the upright.

Reducing the camber of the front wheels with tilt increases the lean angle of the wheel on the outside of a turn as shown in FIG. 25*f*. This can be advantageous as, for example, the track width of the front wheels with the ground is increased, providing a stability benefit. Also, if the vehicle fails to turn tightly enough to avoid a curb, then encountering the curb with the more inclined wheel allows the compression compliance between the upright and hub carrier of that wheel to provide more lateral absorption of the curb impact than if the outer wheel was more vertical. Additionally, if the outer side 63 of the rim of the wheel protrudes outwardly as shown in FIG. 25*f*, reducing the camber with tilt reduces the lean angle of the wheel on the inside of a turn, providing increased clearance between the protruding portion of the wheel rim and the ground.

Combinations of increasing or decreasing the height of the upper body mounts with increasing or reducing the distance between the upper body mounts can be used. For example, if the upper front body mounts are lowered in a manner similar to FIG. 25*d* to allow the driver's feet to be lowered, the tilt angle of each wheel is reduced compared to the tilt angle of the body, so to minimise, negate or even reverse this reduction in the tilt angle of the outer wheel during a turn, the body mounts can also be moved outwards to reduce the length of each upper arm in a manner similar to FIG. 25*f*. This will further reduce the lean angle of the inside wheel during a turn.

FIG. 26 illustrates a further alternative where the two arms 14*a*, 14*b* are shown to replace the lower bridge, the upper bridge being substantially rigid between the upper joints in this case. Where two lower arms are used in place of one of the bridges, the arms can have individual lower body mounts 15 which can be laterally separated as shown in FIG. 26. As described for the upper body mounts in FIGS. 25*a-g*, the lower body mounts can also be moved either upwards or downwards, and/or either outwards or overlapping to provide the desired tilt angle characteristic of the front wheels with tilt of the body.

Figure 27:
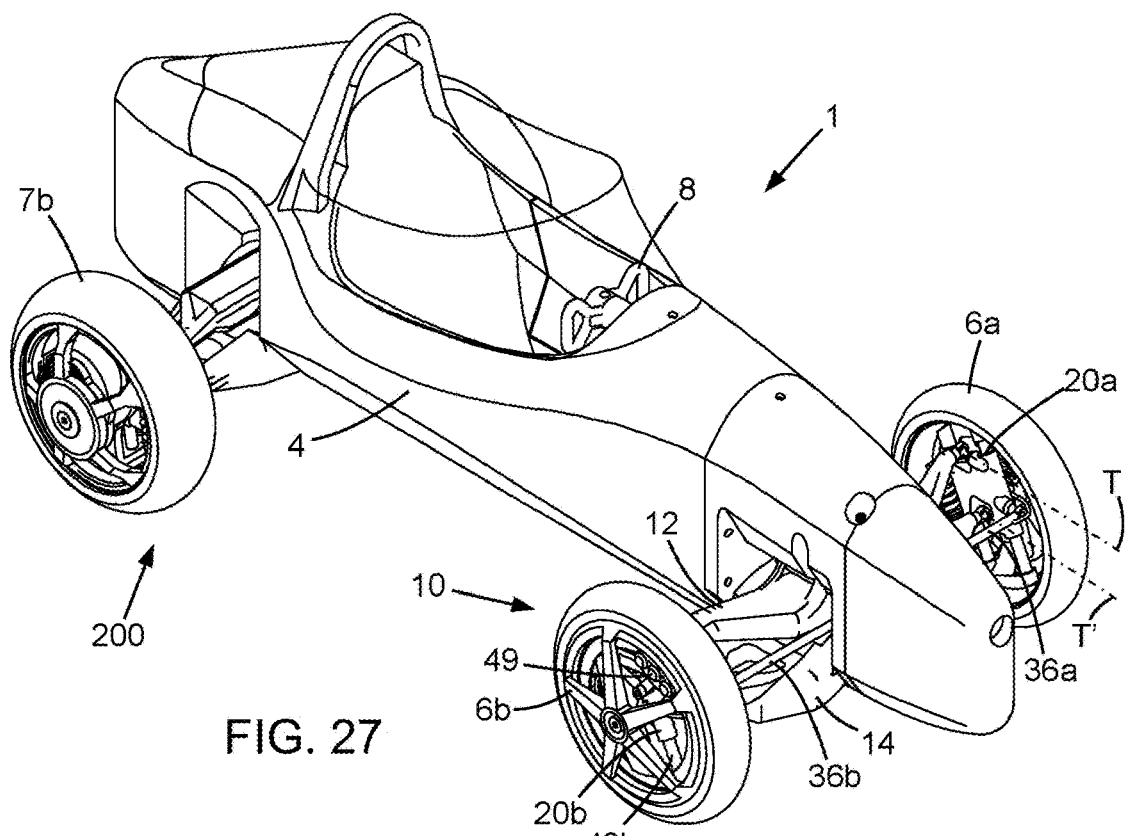
FIG. 27 is a perspective view of a motor vehicle according to at least one embodiment of the present invention.

FIG. 27 shows an alternative vehicle according to the present invention incorporating an alternative embodiment of front suspension 10, back suspension 200 and body 4. The body 4 incorporates a windshield 110 and various adaptations to accommodate the alternative front and back suspensions and different positions of steering and power storage components as shown in more detail in later FIGS. The back suspension 200 includes a back left wheel (not visible) and a back right wheel 7*b*.

Figure 28:
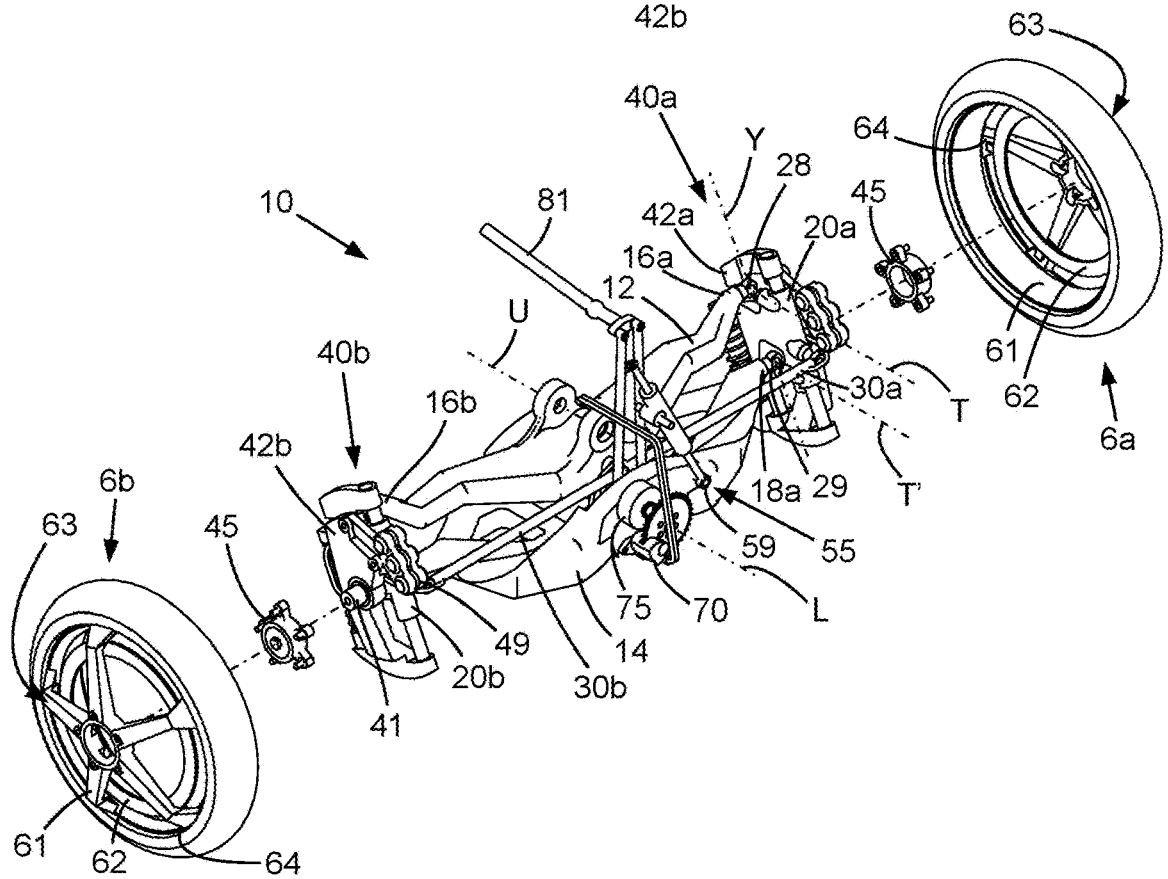
FIG. 28 is a partially exploded view of various components used in the motor vehicle shown in FIG. 27.

The front suspension of FIG. 27 is shown in more detail in FIG. 28. There are many similarities to the front suspension shown in FIG. 2, with equivalent parts in FIG. 28 being allocated like reference numerals from FIG. 2. The most significant differences are: that the first and second hub assemblies 40*a*, 40*b* include one-piece uprights 20*a*, 20*b* as shown in more detail in FIGS. 29 to 31; the steering mechanism 80 utilises levers and rods instead of gears as shown in more detail in FIGS. 40 to 42; the tilt brake arrangement 70 and tilt rise arrangement 75 are integrated, becoming more compact as shown in more detail in FIG. 33; the brake callipers 49 are movable and a hub part 45 is included. The routing of the brake lines 121 are shown in more detail in FIGS. 33, 36 to 39 and 42

As shown in FIG. 28, the hub part 45 for each front wheel 6*a*, 6*b* is mounted on the stub axle 41 of the hub carrier 42*a* or 42*b* by wheel bearings and allows the wheel to be bolted onto the hub part in a conventional car wheel fixing manner.

The joint 28 between the upper bridge 12 and the first upright 20*a* is a ball joint to enable rotation in tilt motions and steering motions and similarly the joint 29 between the lower bridge 14 and the first upright 20*a* is a ball joint. The steering axis Y therefore now passes through the centres of the balls of joints 28 and 29. As can also be seen in FIG. 29, the upper tilt joint axis T passes through the centre of the ball 111 and socket 113 of joint 28 and the lower tilt joint axis T' passes through the centre of the ball 112 and socket 114 of joint 29. The two tilt axes T and T' are both parallel to the upper bridge body pivot axis U and the lower ridge body pivot axis L.

Figure 29:
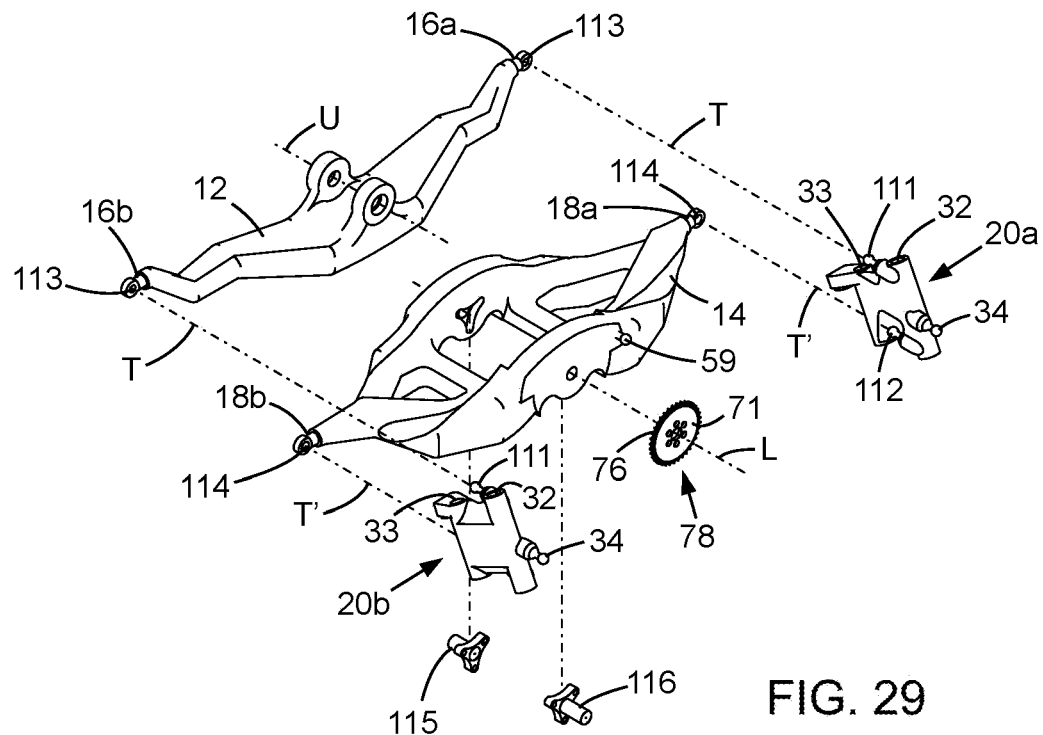
FIG. 29 is an exploded view of various components including the bridges and uprights of FIG. 28.

As shown in the exploded view of FIG. 29, the lower bridge back and front pivot shafts 115, 116 are assembled from the inside of the lower bridge 14. The pivot shafts 115, 116 once assembled then protrude into bearings in the body, such as in lower bridge pivot holes 122 in subframe 120 shown in FIG. 32 which can be fixed to or form part of the body. In FIG. 29, the tilt brake disc portion 71 is combined with the partial gear element 76 of the tilt rise, in this example in a single tilt control disc 78 with teeth around the outside. The tilt control disc can be located inside the subframe adjacent the bridges, or behind the subframe, but in this example is located in front of the lower bridge 14 and the front subframe 120 as shown in FIG. 33 and is connected to the lower bridge by the front pivot shafts 112 being essentially rigidly connected to and driven together with the lower bridge 14. For example, the end of the pivot shaft 116 and the centre of the tilt control disc 78 can be splined or square drive. Other methods of pivoting the lower bridge to the body can be used, such as splitting the base of the subframe through the holes 122 of the lower bridge body mounts 15. The bridge mount 59 for the tilt damper is visible on the front of the lower bridge 14 in FIG. 29.

Figure 30:
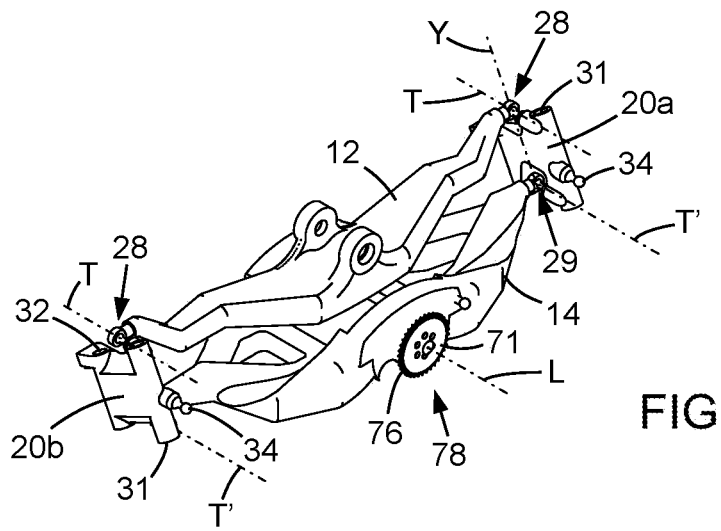
FIG. 30 is a perspective view of the components of FIG. 29 when upright.
Figure 31:
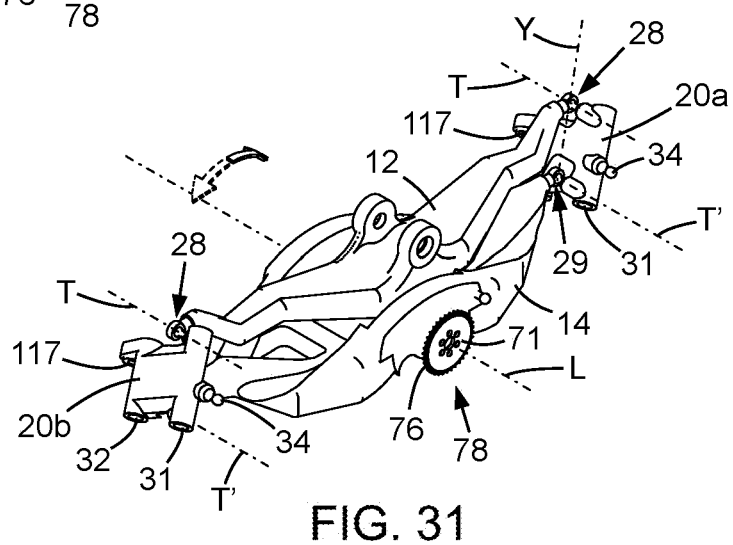
FIG. 31 is a perspective view of the components of FIG. 29 when tilted.

FIG. 30 shows the components of FIG. 29 assembled in an upright position with the upper and lower tilt joint axes T, T' and the steering axis Y of the first upright 20*a* shown. In this example the upper bridge 12 is nested inside lower bridge 14, as opposed to being behind it as in the embodiment shown previously in FIG. 5. FIG. 31 shows the assembly of FIG. 30 in a tilted position, where the upper bridge 12 has moved laterally and downwards around the pivot axis L of the lower bridge 14. As can be seen, as the uprights 20*a*, 20*b* have tilted, the steering axis Y through the upper and lower joints 28, 29 has similarly inclined. The upper seats 117 of the spring damper assembly are visible on the tilted uprights 20*a*, 20*b* in FIG. 31. The first and second sleeves 31, 32 in the uprights are also visible in the second upright 20*b* of FIG. 31.

Figure 32:
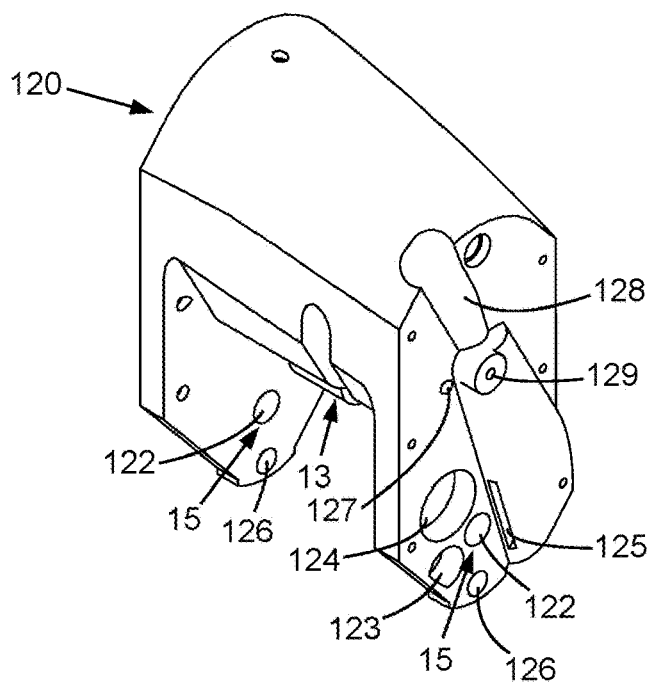
FIG. 32 is a perspective view of a subframe for the vehicle of FIG. 27.
Figure 33:
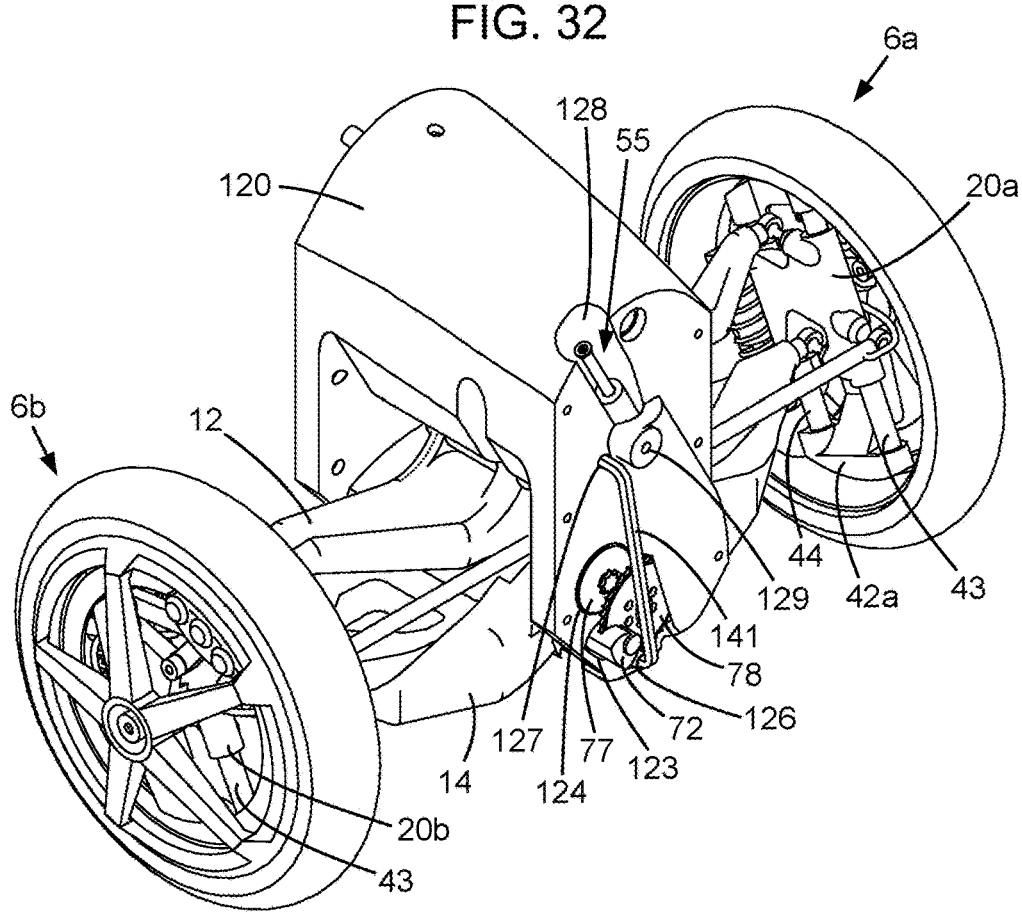
FIG. 33 is a perspective view of a subframe and front suspension for the vehicle of FIG. 27.

FIG. 32 shows a front subframe 120 including several features to mount components of the front suspension. The upper bridge body mount 13 is just visible and lower bridge body mounts 15 include the holes 122, both in the subframe 120 in this example. The clamping or locking element 72 of the tilt brake arrangement shown in FIG. 33 can be bolted to the subframe, or partially received within the tilt brake recess 123 shown in FIG. 32. Similarly the motor or motor-generator element 77 of the tilt rise arrangement can be bolted to the subframe or partially received with the tilt rise motor recess 124. The tilt control disc 78 may interfere with the body or subframe, so a recess is provided to accommodate it unhindered. Also in the front and back lower regions of the front subframe 120 are the steering lever arm pivot mount holes 126. As can be seen in FIG. 33, the brake lines 141 which pass through the subframe at hole 127 then pass up the inside of the steering lever arm pivot in hole 126.

The tilt damper 55 is also shown in FIG. 33, the top of which is visible in the recess 128. If the tilt damper is of the linear type as shown, but moved to behind the bridges of the front suspension or behind the front subframe, it is likely to conflict with the driver's footwell. Using a rotary type damper can permit a wider range of possible placements of the tilt damper.

Figure 34:
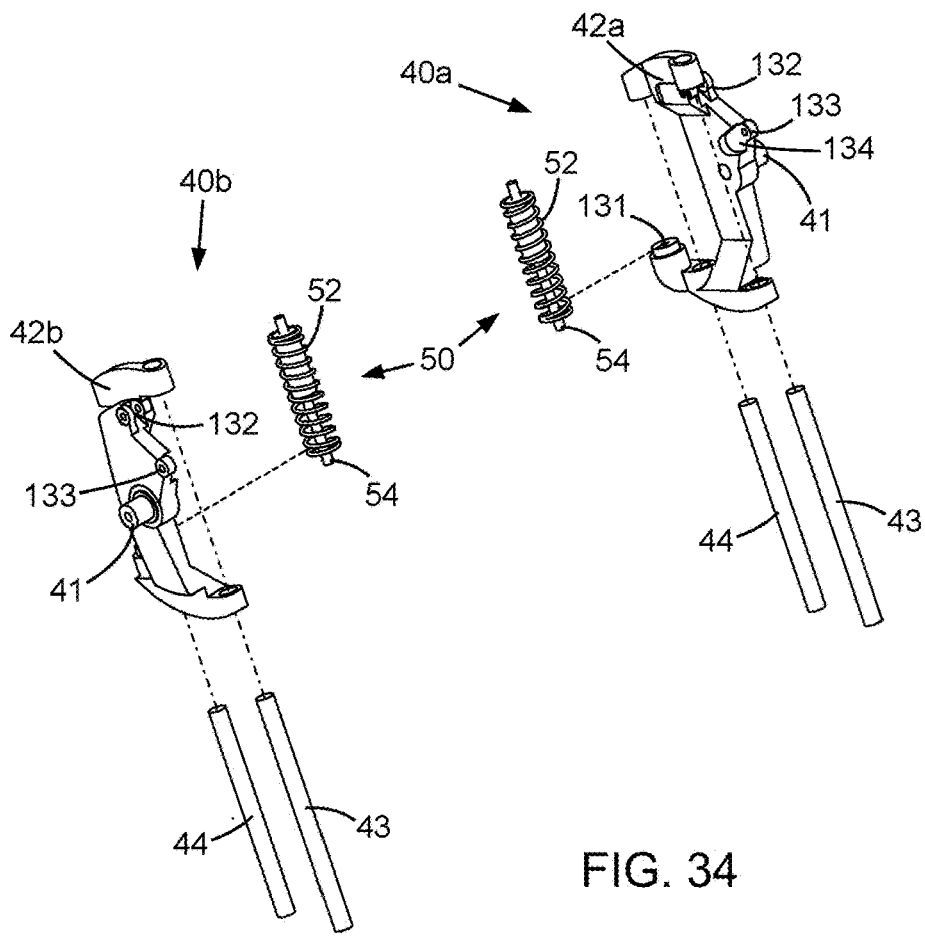
FIG. 34 is an exploded view of hub assemblies used in the motor vehicle shown in FIG. 27.
Figure 35:
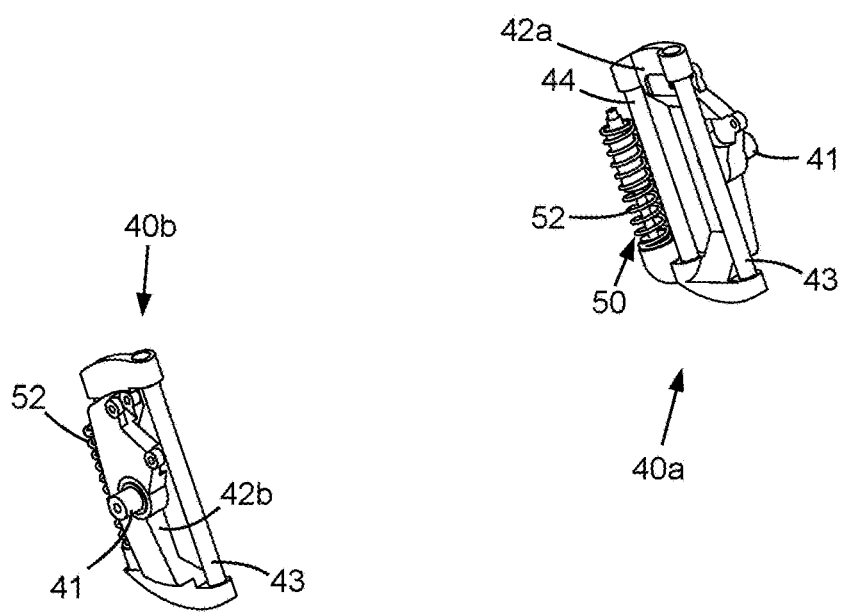
FIG. 35 is a perspective view of the hub assemblies shown in FIG. 34.

FIG. 34 shows the first and second wheel hub assemblies 40*a*, 40*b* in exploded form and FIG. 35 shows those wheel hub assemblies assembled. The first and second guide rods 43, 44 of each wheel hub assembly are fixed to the respective hub carriers 42*a*, 42*b*. When in use, each first guide rod 43 passes through the respective first sleeve 31 in the respective upright visible in the exploded view of FIG. 29. Similarly, each second guide rod 44 of FIGS. 34 and 35, when in use, passes through the respective second sleeve 32 in the respective upright visible in FIG. 29. This allows each wheel hub assembly 40*a*, 40*b* to displace with suspension compression and rebound motions relative to the respective upright, while transmitting steering orientation from the upright to the wheel hub assembly. The spring damper assembly mount 131 on the wheel hub assembly is visible on the hub carrier 42*a* in FIG. 34.

The mounts for the moveable brake callipers (not shown) are also visible on the hub carriers 42a, 42b in FIG. 34. An upper pivot mount 132 is provided for the brake calliper on the hub carrier 42a, 42b as is a lower locking pin mount 133. Adjacent the lower locking pin mount 133 is a recess 134 to allow a mounting arm on the calliper to move into a wheel changing position as detailed in FIGS. 36 and 37.

Figure 36:
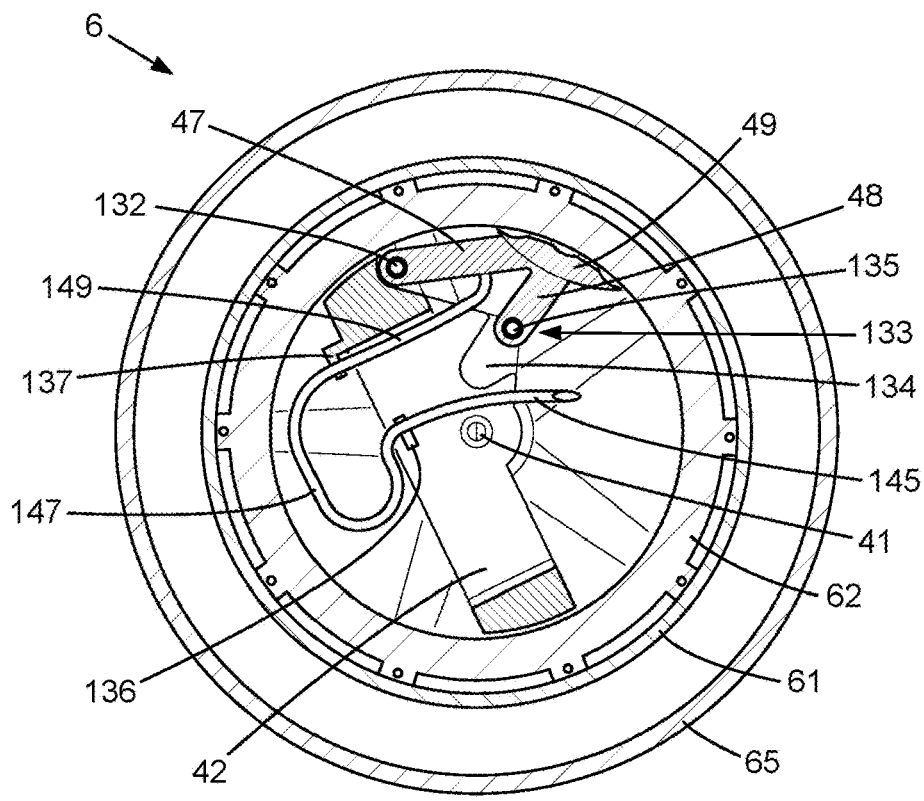
FIG. 36 is a sectional view of components of the motor vehicle shown in FIG. 27, with the brake calliper in an operational position.
Figure 37:
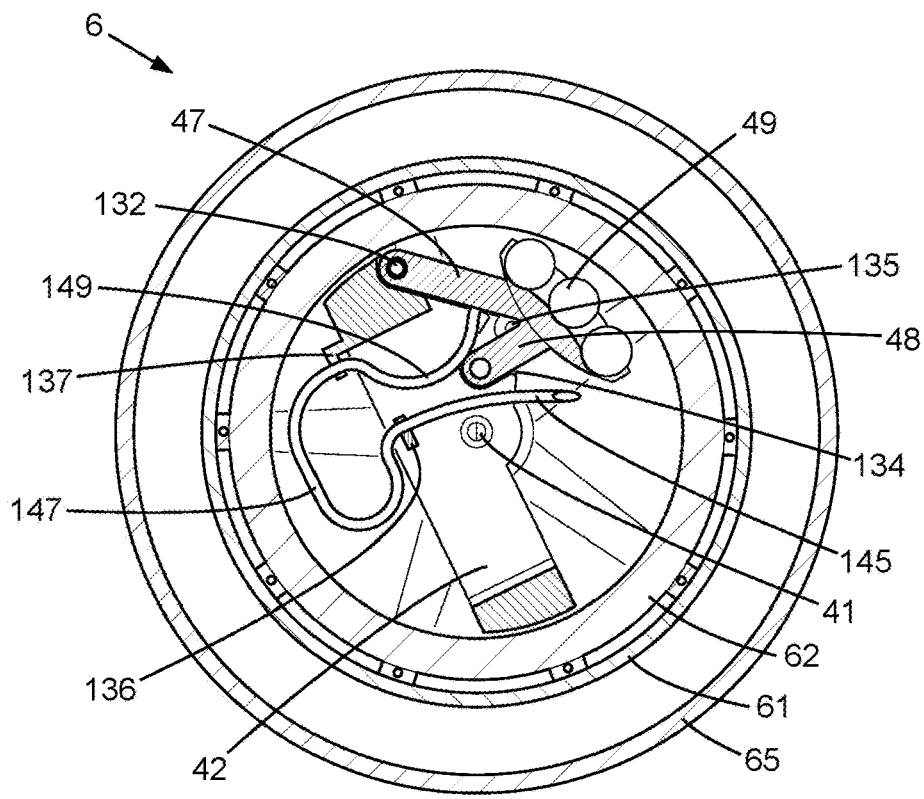
FIG. 37 is a sectional view of the components shown in FIG. 36, with the brake calliper in a service position.

FIGS. 36 and 37 show a section through a wheel 6 of the front suspension. At the outside is the tread of the tyre 65 on wheel rim 61. Mounted inside the wheel rim is the ring brake type brake rotor 62. The wheel rim is rotatably mounted to the hub carrier 42 at the pivotal connection 41. The section is through the annular brake disc or ring brake type brake rotor 62 so the brake calliper 49 that engages the brake rotor is also sectioned. The brake calliper includes an upper arm 47 which is pivotally connected to the hub carrier 42 at the upper pivot mount 132. The brake calliper further includes a lower arm 48 which is pinned to the hub carrier 42 by pin 135 at lower locking pin mount 133. In FIG. 36 the brake calliper is shown in the operational position.

Several portions of the brake line can be seen in FIGS. 36 and 37. Brake line portion 145 comes from the body via the steering mechanism and deforms during tilting and steering motions. Brackets 136, 137 restrain the brake line relative to the hub carrier. Brake line portion 147 deforms during compression and rebound motions of the wheel hub assembly relative to the upright and brake line portion 149 deforms to allow the calliper to move relative to the hub assembly.

When the locking pin 135 is removed, the brake calliper can rotate inwards towards the wheel centre to dis-engage the brake rotor and allow the wheel 6, to which the brake ring type brake rotor 62 is fixed, to be easily removed. An interlock to the powertrain of the vehicle can be provided to prevent the vehicle being driven when a calliper is in the service position of FIG. 37 rather than the required operational position of FIG. 36. As can be seen in FIG. 37, the brake line portion 149 deflects to allow the calliper 49 to rotate into the service position shown.

Alternatively, the calliper may be slid inwardly to disengage a brake ring type brake rotor, rather than rotated as shown. The brake lines would then need to accommodate the linear motion.

Figure 38:
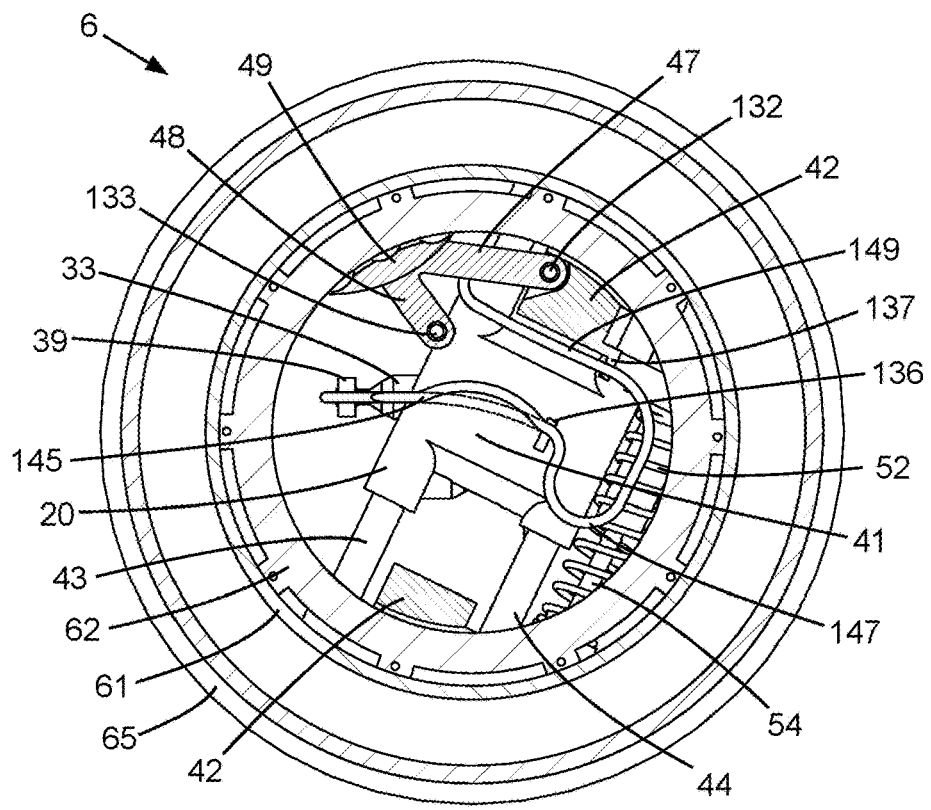
FIG. 38 is a sectional view of components of the motor vehicle shown in FIG. 27, shown at a rebound height.
Figure 39:
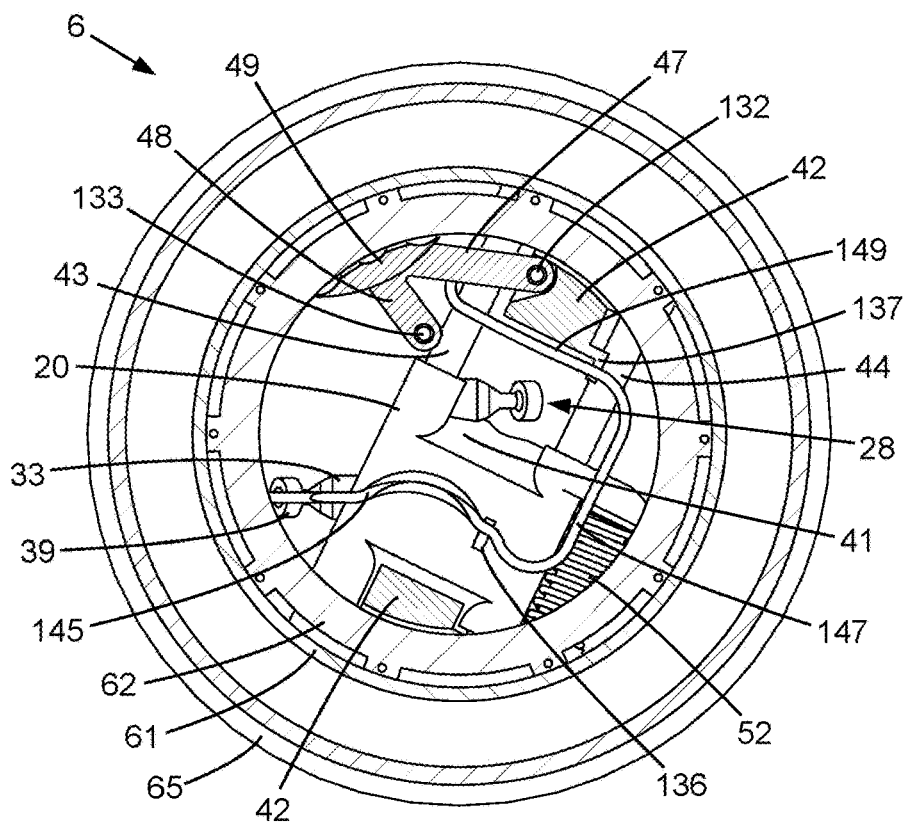
FIG. 39 is a sectional view of the shown in FIG. 38, shown at a compression height.

FIGS. 38 and 39 show sections through the wheel assembly at the brake ring type brake rotor 62 again, but looking inwards towards the centre of the vehicle, so the other half of the calliper 49 is now shown, engaged around the brake rotor in the operating position. Only small sections of the upper and lower portions of the hub carrier 42 are visible. In FIG. 38 the wheel 6 is in a rebound position, extended downwards relative to the upright 20. The brake line portion 147 is more curved than in the compression position shown in FIG. 39. The brake line portion 145 in FIG. 38 is shown in the straight-ahead steering position, but the phantom lines show the position the brake line portion 145 would move to when the wheel is steered to the left. The steering joint 39 is connected to the steering rod and to the rigid arm 33 the connects the steering joint to the main body of the upright.

In FIG. 39, the wheel 6 is in a compressed position, displaced upwards relative to the upright 20. The brake line portion 146 is straightened to allow for the relative motion between the upright 20 and the hub carrier 42. The wheel is also shown steered to the right, with the brake line portion 145 being curved upwards due to the steering. The phantom lines show the position the brake line portion 145 would move to in the straight-ahead position.

Figure 40:
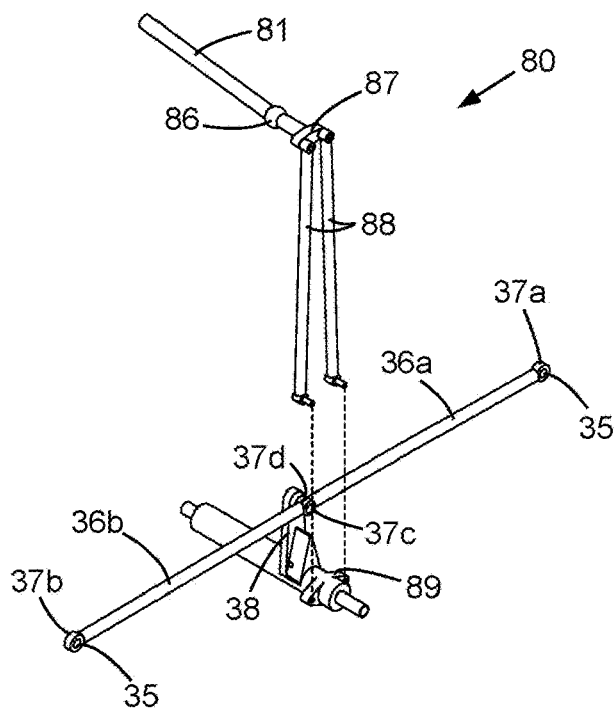
FIG. 40 is a partially exploded perspective view of a portion of the steering mechanism of the vehicle of FIG. 27.

FIG. 40 shows the steering mechanism 80 partially exploded. The steering column 81 has a universal or Cardan joint or similar to enable a change in inclination of the steering column. Lever 87 at the end of the steering column drives to downwardly extending rods or drop links 88 which connect to lever 89 which pivots about the steering lever arm pivot axis. The connections between the levers 87 and 89 and the drop links 88 are typically ball joints, but in this example can be pin type joints as the axes of rotation of the levers are parallel. The lever 89 is rigidly connected to the steering rod shifter 38, which functions, as in the previous embodiment, driving the left and right steering rods 36a, 36b. The lengths of the levers can be adjusted to change the steering ratio. In the example illustrated the top lever 87 is half of the effective length of the bottom lever 89, giving a 2:1 steering ratio. The steering ratio is preferably around 1.8:1 or 2:1, but can be less at 1:1 or greater at 3:1 or 4:1 for example, i.e. within a wide range from 1:1 to 2:1, or 3:1 or at least 4:1. Steering assistance can be provided to manage steering input forces required, for example using a servo mechanism. The amount as assistance can vary with many parameters such as speed, steering angle, tilt angle and/or steering input force. For example, the greatest amount of assistance could be provided at low speed, with less or even zero assistance being provided at high vehicle speeds.

Figure 41:
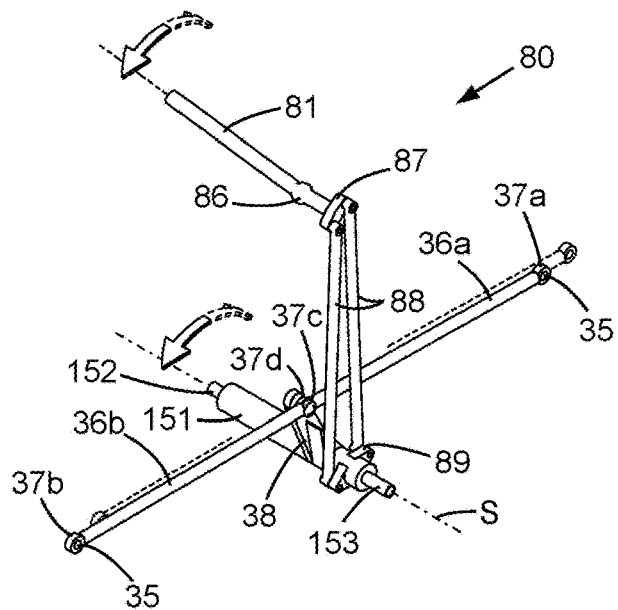
FIG. 41 is a perspective view of the components of FIG. 40, rotated to a steered position.

The steering mechanism 80 is assembled in FIG. 41 and steered to the right. Dashed lines indicate the position the steering rods 36a, 36b would be in when the steering is in the straight-ahead position. The steering column rotation causes a rotation of the lever 87, which drives the lever 89 by the drop links 88. The steering rod shifter 38 is fixed to the lever 89 by cylindrical member 151, so is driven to rotate about the steering axis S providing a similar result the steering mechanism shown in FIG. 12. However, the use of the levers 87, 89 and drop links 88 can permit those parts to be moved rearwards, for example behind the front subframe between the driver's legs. which can allow the power source such as a battery pack to be at least partially located above the driver's legs, raising the centre of mass of the body.

The cylindrical member has a rearward projecting shaft 152 and a forward projecting tube 153 which run in the steering lever arm pivot in holes 126 shown in the subframe in FIG. 32.

Figure 42:
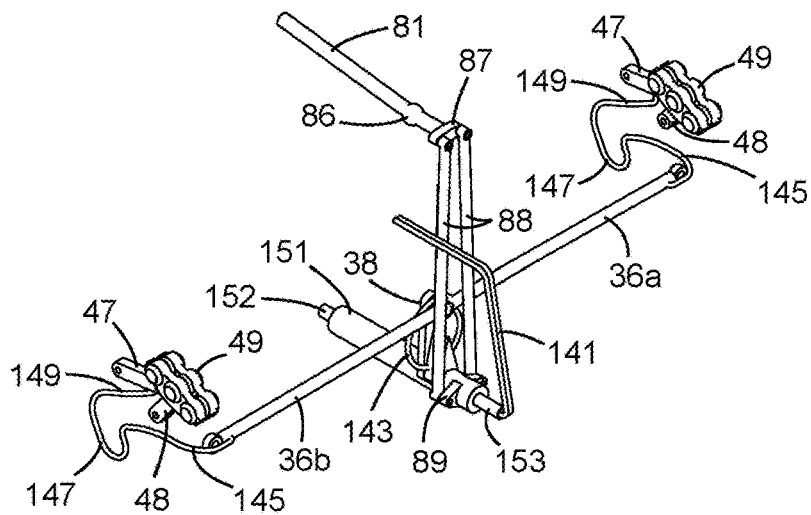
FIG. 42 is a perspective view of the components of FIG. 40 further including portions of brake lines.

FIG. 42 shows the path of the brake lines from the body to the callipers. Brake line portion 141 exits the body or subframe as shown in FIG. 33 and enters the forward projecting tube 153 connected to the steering rod shifter 38. The brake lines pass a short distance up inside the steering rod shifter 38, the brake line loop portions 143 exit the steering rod shifter 38 and curve around into the left and right steering rods 36a, 36b near their inner ends. these brake line loop portions 143 deflect to allow steering and tilt motions. The brake lines can be tethered to the steering rods externally as an alternative. At the outer ends of the steering rods the brake line portions 145 curve around to enable deformation to accommodate tilting and steering motions as discussed above. Brake line portion 147 deforms during compression and rebound motions of the wheel hub assembly relative to the upright and brake line portion 149 deforms to allow the calliper 49 to move relative to the hub assembly. The callipers 49 are shown in their operating positions in FIG. 42.

The brake lines have been shown passing through members but can be tethered to them instead. Similarly, where brackets have been shown clamping the brake lines in place, such brackets be designed to allow axial sliding of the brake line in the bracket, or the bracket may be designed to swivel or provide a combination of possible degrees of freedom. Alternatively, a clip can be used to hold the brake line from deflecting into a suspension component or the wheel rim or tyre for example, such a clip may permit axial motion and rotation of the brake line and even radial motion in a direction perpendicular the direction restrained by the clip. The components that the brake lines are tethered to in some way can also vary as different brake line routings are possible and can require different loops to accommodate the various relative motion between components during tilting, steering, compression and rebound.

Modified brake line routings and tetherings are shown in FIG. 43. For example, the brake line again runs inside a portion of the steering rod 36*a*, 36*b* but exits the steering rod and then passes through a retaining bracket 146 which can be connected to the steering rod by a spacer that spaces the bracket from the steering rod and can include a rotational outer portion or roller to reduce friction against the brake line in some situations. The portion 145 of the brake line that passes behind the bracket 144 can form and larger or smaller amplitude wave shape in front view as the uprights 20*a*, 20*b*, steering members 30*a*, 30*b* and hub carriers 40*a*, 40*b* tilt relative to the bridges and during steering motions, with the bracket 146 allowing sliding and rotations of the brake line while constraining the brake line from significant forward motion away from the steering rod 36*a*, 36*b*. The brake line in this example is also constrained by a clip 146 on the end of the steering ball, so that the clip and the portion of brake line within clip 146 move with the wheel in tilt, being connected to the steering member 30*a*, 30*b*. Also a retaining loop 148 is shown to guide the brake line portion 147 which primarily accommodates compression and rebound motions of the wheel hub assembly 40*a*, 40*b* relative to the suspension upright 20*a*, 20*b* including the steering member 30*a*, 30*b*. In this example the retaining loop is connected to the brake calliper 49.

As the various brake line routings and tetherings shown in FIGS. 36 to 39, 42 and 43 demonstrate, many variations to brake line routing are possible and the number and type of tetherings can be varied also.

FIG. 43 shows a front suspension 10 incorporating many other features according to the present invention. For example, as shown in more detail in FIG. 45, the brake rotor 62 is a more conventional brake disc located inside the hub carrier 42*b* and connected to the hub part 45 on the outside of the hub carrier, allowing the wheel (not shown) to be removed without needing the brake calliper 49 to be moved. So the calliper, hub part and brake disc can all be part of the hub assembly 40*a* with the hub part.

Figure 46:
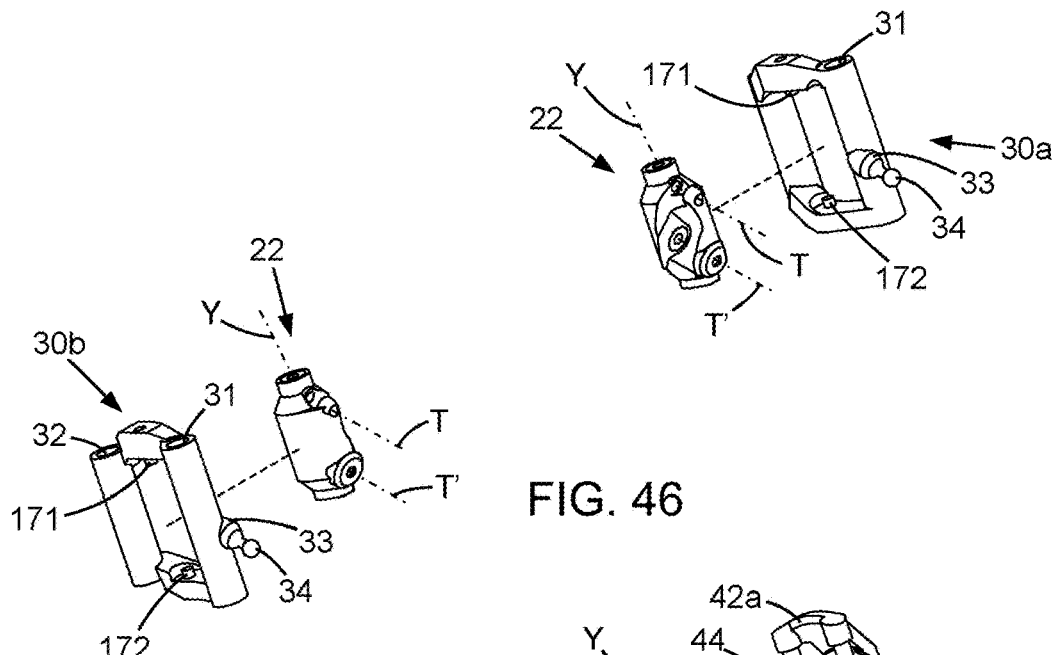
FIG. 46 is an exploded view of the suspension uprights of FIG. 43.
Figure 47:
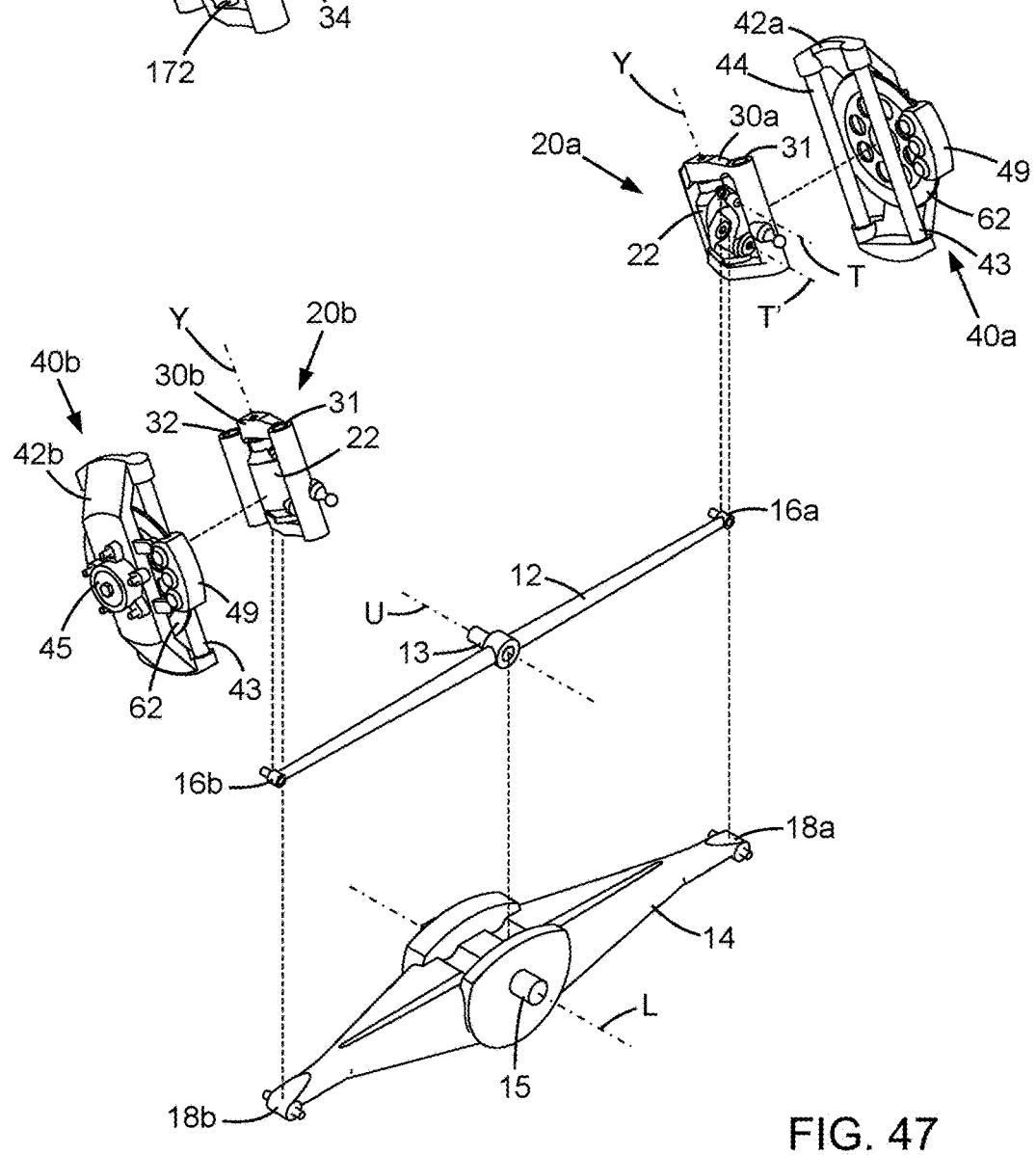
FIG. 47 is a partially exploded view of the bridges, uprights and hub assemblies of FIG. 43.

The suspension uprights 20*a*, 20*b* are two piece and are shown in more detail in FIGS. 46 and 47. Each suspension upright 20*a*, 20*b* comprises a steering member 30*a*, 30*b* pivotally mounted to a connector 22, preferably using upper and lower spigots 171, 172 which can be screwed into position when the parts are assembled. The pivots such as spigots 171, 172 define the steering axis Y.

As indicated in FIG. 47, the connectors 22 of the uprights 20*a*, 20*b* are pivotally connected to the ends 16*a*, 16 of the upper bridge 12 and the ends 18*a*, 18*b* of the lower bridge 14. In this example, the lower bridge 14 is significantly more substantial in section than the upper bridge 12 to allow the lower bridge to resolve a significant portion of the vertical and longitudinal forces due to support, impacts and braking loads and the rotational moments from braking, transferring such resolved forces and moments from the outer ends 18*a*, 18*b* of the lower bridge at the connectors to the lower body mount 15. This permits a smaller upper bridge 12 to be used which can have weight and packaging benefits. The upper bridge 12 can be replaced by two upper arms as shown in FIGS. 24 to 26.

The hub part 45 and disc type brake rotor 62 are connected to each other and together are able to rotate relative to the hub carriers 42*a*, 42*b* and brake calliper 49. The hub assembly 40*a*, 40*b* comprises hub part 45, brake rotor 62, hub carrier 42*a*, 42*b* and brake calliper 49. The guide rods 43, 44 of the hub carrier slide within the sleeves 31, 32 of the steering member 30*a*, 30*b*.

As shown in FIG. 44, the spring damper functions for the motion of the hub assembly 40*a* relative to the upright, i.e. providing suspension heave compliance and wheel damping, can be integrated with the guide rods 43, 44 of the hub carrier 42*a* and the sleeves 31, 32 of the steering member 30*a*. A piston or spring seat 162 is provided on the guide rod 43 and a spring seat 161 is provided at end of the sleeve 31 with the spring 52 between. The sleeve 31 is formed into cylinder 163 to house the spring 52. The other guide rod 44 is used as the piston rod 54 of the damper or "shock absorber" that provides wheel damping with the wheel damper piston 167 on the piston rod 54 being housed within the wheel damper cylinder 165 formed within the sleeve 32. Damping can be provided by valving in the piston and/or by external valving such as valving in a bypass conduit connecting the compression and rebound chambers of the damper. The rods 43, 44 can be split at the pistons 162, 167 and an end of each sleeve can be capped during assembly along with an end of each rod into the hub carrier 42*a*. The rods 43, 44 with the pistons 162, 167 are shown in the version of the wheel hub assembly 40*a* shown in FIG. 45.

In the sectional view of FIG. 44, the joints 28 and 29 between the upper bridge, lower bridge and the connector 22 are aligned with the upper and lower tilt axes T, T'. The spigots 171, 172 providing the steering axis Y are also visible.

Figure 48:
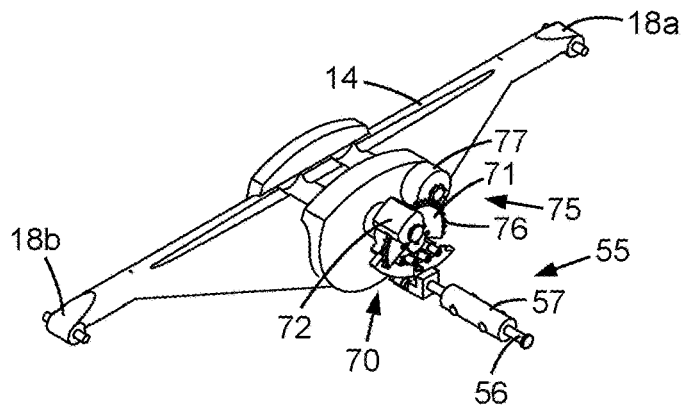
FIG. 48 is a perspective view of the lower bridge and various tilt acting components from FIG. 43.
Figure 49:
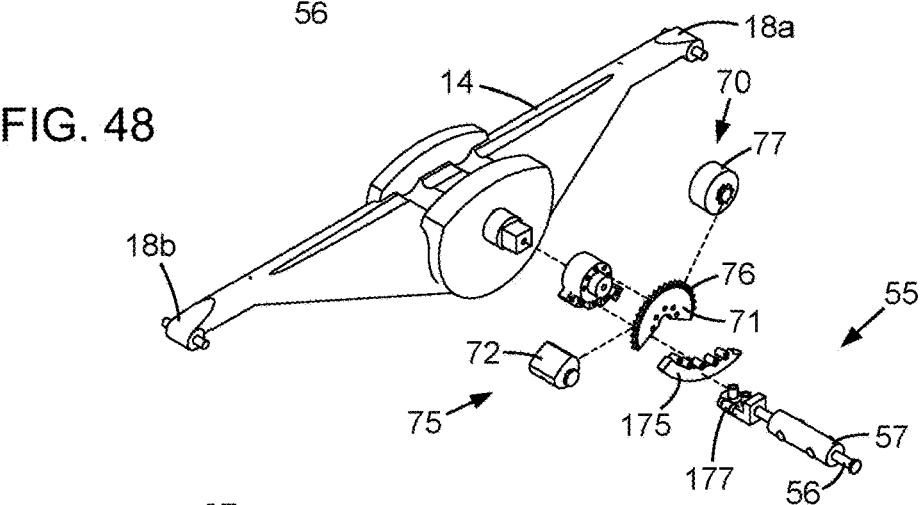
FIG. 49 is an exploded view of the components of FIG. 48.

The lower bridge 14 and the tilt damper 55, tilt brake arrangement 70 and tilt rise arrangement 75 are shown assembled in FIG. 48 and in exploded view in FIG. 49. The tilt brake disc 71 and tilt rise gear element 76 are combined in a similar manner to in the example in FIG. 28. However, as shown in FIG. 49, the arrangement of the tilt damper 55 utilises a curved member 175 and follower arrangement 177 to enable a linear piston rod 56 and cylinder 57 to damp the rotations of the lower bridge relative to the body in tilt. The curved member 175 is preferably bolted to the bridge 14 and can for example be a portion of a spiral or any other shape that assists in converting a rotary motion to a linear motion. The follower 177 is fixed to the piston rod 56 and preferably uses rollers to engage with the surfaces of the curved member to drive the piston rod relative to the cylinder 57 as the bridge rotates relative to the body as the vehicle tilts. There is preferably at least one roller for tilt to the left and compression of the tilt damper 55 and one for tilt to the right and extension of the tilt damper. Two rollers are also shown oriented longitudinally to engage the lower face of the curved member 175 and improve stability. The rollers can be replaced by other means such as low friction material blocks.

The front suspension arrangement 10 shown in FIG. 43 also shows an alternative arrangement to provide Ackermann or similar steering geometry. The steering components are shown exploded in FIG. 50. Using a conventional Ackermann steering geometry, the ends 37*a*, 37*b* of the left and right steering rods are spaced closer together than the steering axis if the steering rods are behind the steering axes or spaced wider apart than the steering axes if the steering rods are in-front of the steering axes, but this can generate unwanted tilt steer of each wheel. Also position of the bridges, the wheel rim and the hub assembly rods passing through the upright can limit the possible locations of the steering ball on the upright. So, it can be preferable to provide the mechanism for the desired toe adjustment with steering at or near the steering rod shifter.

As shown in FIG. 50, additional steering modifier arms 181, 182, are pivotally connected to steering modifier arm brackets 183, 184 that are fixed to the body and move with the body in tilt. The other ends of the steering modifier arms 181, 182 are connected to steering modifier wheels 185, 186 which rotate in respective rings 187 in the steering rod shifter 38. As the steering wheel turns the steering column 81, the top lever 87 is rotated and the drop link 88 moves the bottom steering lever 89 connected to the steering rod shifter 38. As the steering rod shifter 38 is rotated relative to the body and relative to the two steering modifier arm brackets 183, 184, the steering modifier wheels 185, 186 are driven to rotate in opposite directions by the steering modifier arms 181, 182. As a steering ball 188 is provided on each steering modifier wheel 185, 186, the rotation of the wheels in opposite directions causes the distance between the steering rod ends 37a, 37b to be slightly increased or reduced.

Also shown in the steering column 81 after the Cardan joint 86 is a power steering arrangement 190. The provision of power assistance for the steering allows the steering ratio to be in a range that requires some power assistance to limit the maximum steering forces required of the driver. Between the steering column and the body can be a preferable location for a steering damper if one is provided, although other locations are also possible such as between a portion of the steering mechanism such as the drop link 88 or steering rod shifter 38 and the body (not shown).

FIG. 51 shows a gear version of the steering modifier arrangement from FIG. 50. The steering modifier bevel gear brackets 183a, 184a are bevel gears fixed to the body. Steering modifier bevel gear shafts such as 181a have bevel gears at both ends and rotate within sleeves on the steering rod shifter 38, so as the steer rod shifter is turned, the steering modifier bevel gear shafts are turned and drive the steering modifier bevel gear wheels 185a, 186a. As with the steering modifier gear wheels 185, 186 in FIG. 50, as the steering wheel is turned, the steering column 81 is rotated which drives rotation of the steering rod shifter 38 and within rings on the steering rod shifter the steering modifier bevel gear wheels 185a 186a rotate which moves steering balls on the wheels 185a, 186a to adjust the steering rod positions to provide toe angle adjustment.

Figure 52:
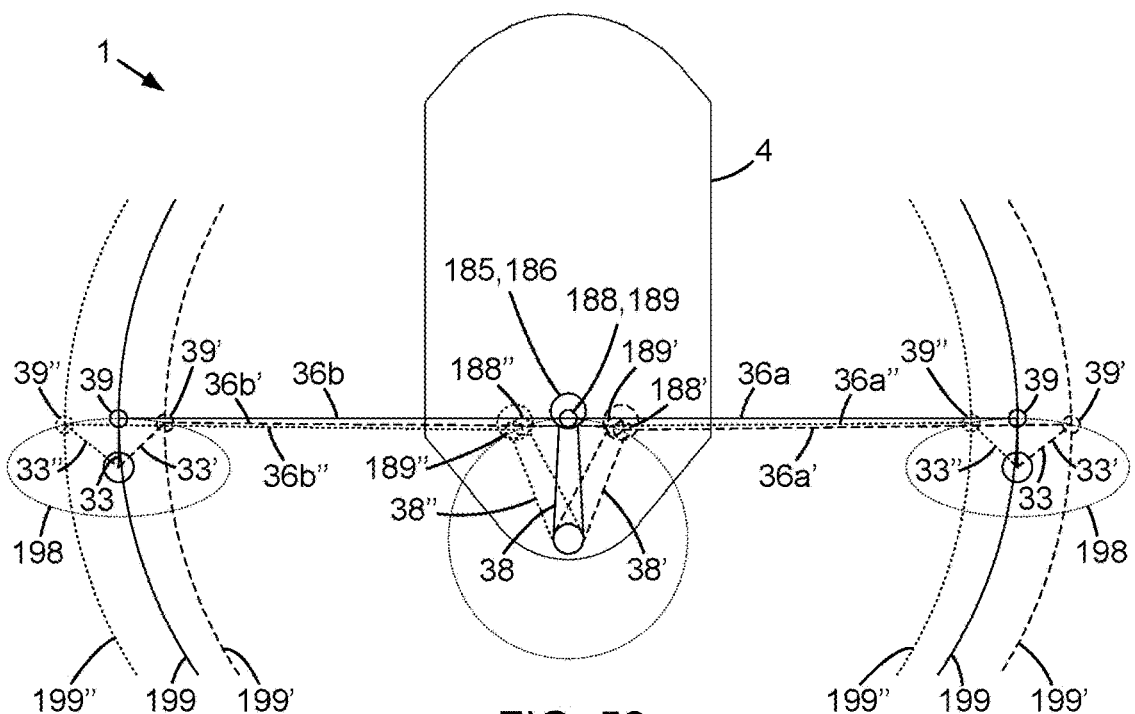
FIG. 52 is a schematic front view of elements of a steering geometry of the types shown in FIGS. 50 and 51 with no tilt angle.

FIG. 52 shows the geometry of the steering modifier arrangements from FIGS. 50 and 51 when the body 4 of vehicle 1 is upright (i.e. not tilted, nor leaning into a turn). The steering rod shifter 38 is shown in solid lines in the straight-ahead position, as are the left and right steering rods 36a, 36b, the arms 33 of the uprights and the ball joints 39 therebetween. The steering modifier wheels 185, 186 at the end of the steering rod shifter each carry a respective steering ball 188, 189 such as the steering ball 188 shown in FIG. 50. As can been seen in FIG. 52, when the steering rod shifter 38' is turned to the left as indicated in dashed lines, the steering balls 188', 189' are no longer aligned. This is due to the operation of the steering modifier rotating levers, such as the steering modifier wheels 185, 186 of FIG. 50 or steering modifier bevel gear wheels 185a, 186a of FIG. 51, as the steering is turned to the side. Similarly, when the steering rod shifter 38" in FIG. 52 is turned to the right as indicated in dotted lines, the steering balls 188", 189" are no longer aligned. The effect of this is to produce a change in toe angle of the front wheels with steering as discussed above.

The end of each steering member arm 33 lies on a locus 198 which, due to the inclination or rake of the steering axis is elliptical in front view. So, when the steering is turned to the left (towards the right-hand side of the page in this front view) the steering ball joint 39' lies at the point where the arc 199' determined by the length of the steering rod 36a' or 36b' intersects the respective elliptical locus 198 of the steering arm 33'. Similarly, when the steering is turned to the right (towards the left-hand side of the page in this front view) the steering ball joint 39" lies at the point where the arc 199" determined by the length of the steering rod 36a" or 36b" intersects the respective elliptical locus 198 of the steering arm 33".

Figure 53:
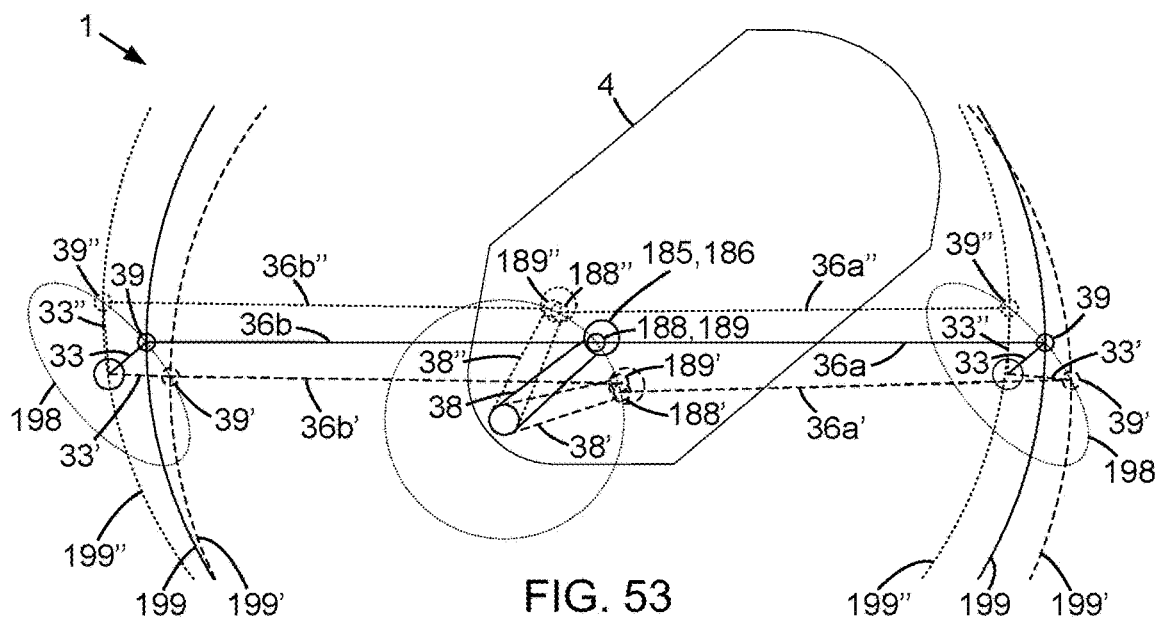
FIG. 53 is a schematic front view showing the steering geometry elements of FIG. 52 when the vehicle is leaning.

FIG. 53 shows the same steering component locations when the body 4 of vehicle 1 is tilted or leaned into a corner. Because the wheels (not shown) tilt as the body tilts, the locus 198 of each steering arm 33 is rotated.

As wheel compression and rebound motions are relative to the upright, the steering arm 33 which is part of the upright, is unaffected by bump and rebound motions as explained in relation to FIG. 20. So there are no toe angle changes and no steering changes due to bumps, i.e. no bump steer. Also as demonstrated in FIGS. 52 and 53, the steering angle of each wheel can be adjusted to change the toe with steering motion in a desirable way without undesirable steering or toe changes with steering motions.

Figure 54:
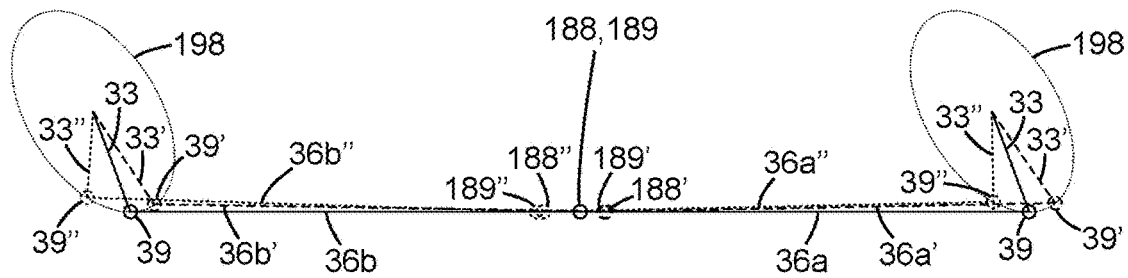
FIG. 54 is a schematic top view of the steering geometry elements of FIG. 53.

FIG. 54 is a top view of the steering rods 36a, 36b, the steering arms 33, the steering ball joints 188, 189 and 39 in the straight-ahead position in solid lines. As the steering is turned to the left, the locus 198 of the end of the steering arm 33' is again an ellipse due to the rake of the steering axis and the ellipse is rotated due to the lean of the steering axis with tilt.

Figure 55:
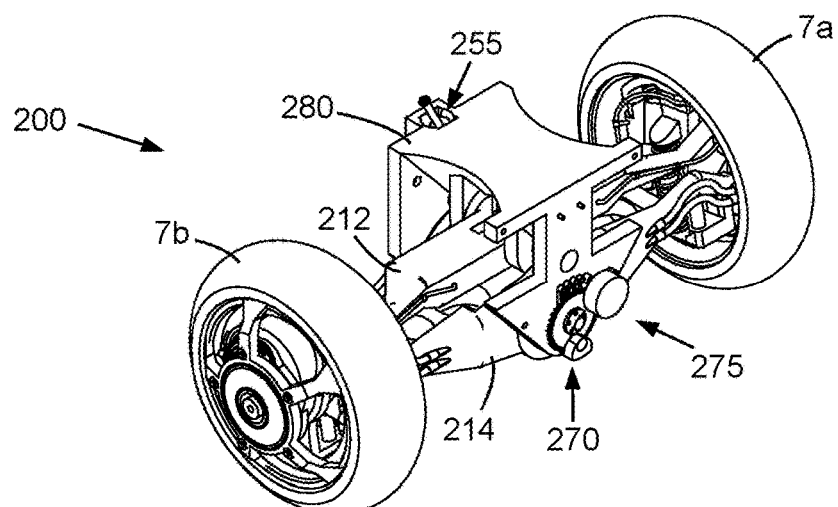
FIG. 55 is a perspective view of various components of a back[[ ]]-suspension arrangement of the present invention.

FIG. 55 shows the back suspension 200 of FIG. 27. The back suspension when it has two wheels 7a, 7b, will preferably have similar tilting functionality to the front suspension when the front suspension is of an arrangement that can tilt, so many of the components are similar. In this example of a two wheel tilting back suspension 200, the upper and lower back bridges 212, 214 are carried by a back subframe 280. A tilt brake arrangement 270 and a tilt rise arrangement are shown although either of these can be optional if the same functionality is provided at the front suspension. A tilt damper 255 is provided as the rotation of the back bridges 212, 214 relative to the body or to back subframe 280 is preferably controlled due to the bridge oscillation modes possible with tyre resilience and wheel spring resilience.

Figure 56:
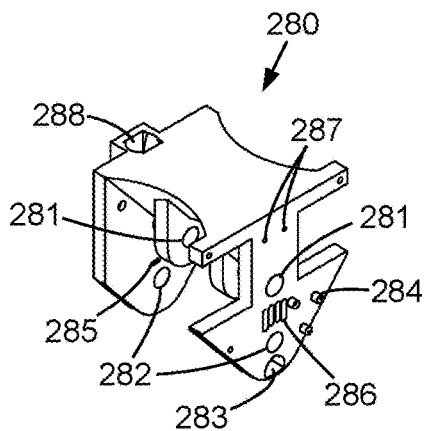
FIG. 56 is a perspective view of a subframe for the back suspension of FIG. 55.

FIG. 56 shows the back subframe 280, having holes 281 for the upper bridge pivots and holes 282 for the lower bridge pivots. A recess 283 is also shown to locate the tilt brake and three upstands are provided to form mounts 284 for the tilt rise motor. Three adjacent holes 285 are visible for the three power cables for the back right wheel motor and four slots 286 are shown to accommodate the two left and two right cooling hoses typically for water cooling the electric motors located in the wheel hubs. While the number of power cables or the necessity for wheel motor water cooling can vary, they are typically required for high performance electric motors that can provide exhilarating vehicle performance to accompany the driver enjoyment of a tilting drive experience. Holes 287 are provided for the brake lines and the recess 288 is provided for the tilt damper.

Figure 57:
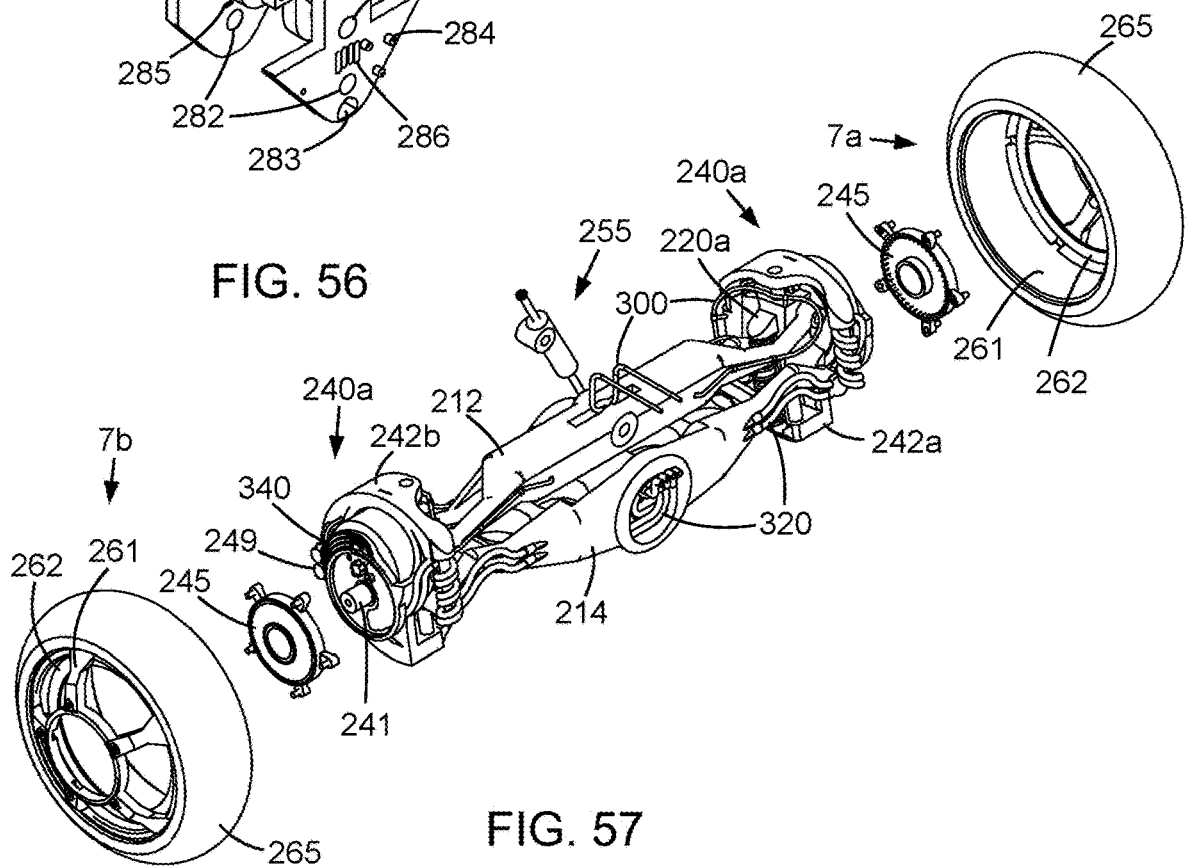
FIG. 57 is a partially exploded view of various components of the back suspension of FIG. 55.

FIG. 57 shows the back suspension without the subframe and additionally the wheels 7a, 7b and wheel hub parts 245 are shown in exploded positions. The wheels 7a, 7b include brake rotors 262 of the ring type connected to the wheel rim 261 carrying tyre 265. The hub parts 245 are mounted on a pivotal connection 241 such as a stub axle and include a ring gear inside the outer edge of each hub part, the ring gear being driven by a pinion gear from the motor in the hub carrier 242a, 242b of the first or second wheel hub assemblies 240a, 240b. The hub part is preferably mounted to the hub carrier 242a, 242b in a manner to limit or prevent dirt ingress into the cavity around the pivotal connection 241 to protect and improve the wear characteristics of the pinion gear and ring gear within.

The motor power cables 340 pass around and are tethered, clamped or otherwise located such as in channels in the hub carrier 242b. The brake calliper 249 is also visible attached to hub carrier 242b of the second wheel hub assembly 240b.

The cooling hoses 320 pass through the lower bridge 214 but can be otherwise mounted to the lower or upper bridge.

Figure 58:
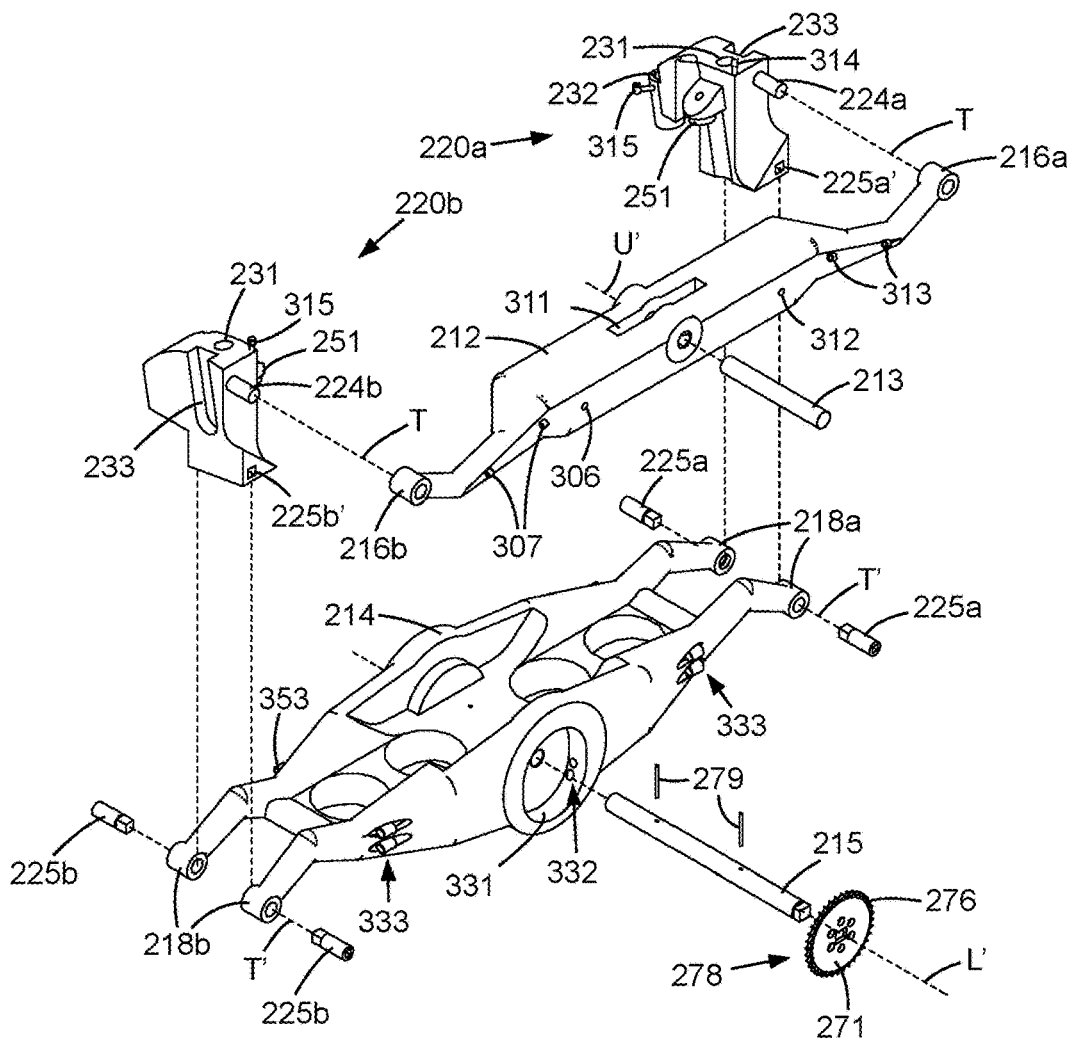
FIG. 58 is an exploded view of various components of the back suspension of FIG. 55.
Figure 59:
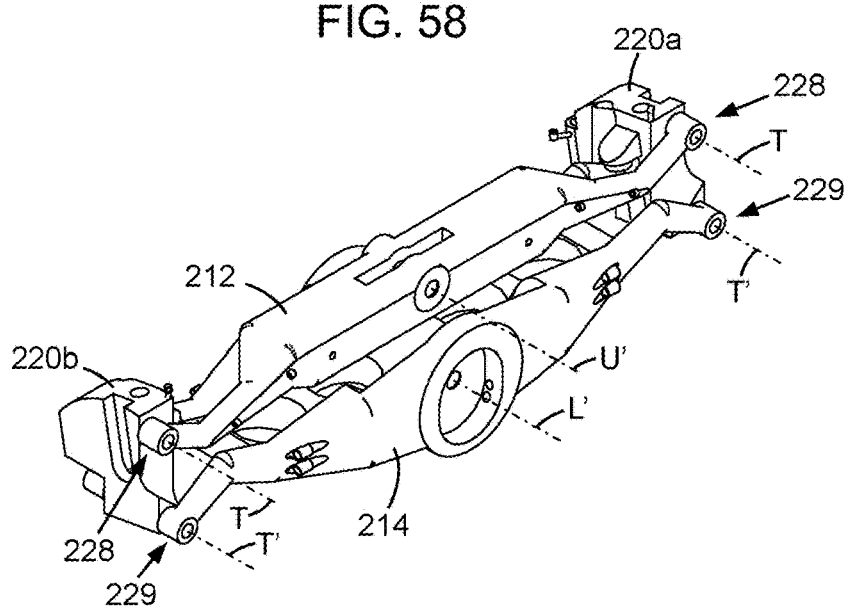
FIG. 59 is an assembled view of the components of FIG. 58.

The assembly of the upper and lower bridges 212, 214 and the first and second back suspension uprights 220a, 220b is shown in exploded form in FIG. 58 and in assembled form in FIG. 59. The upper bridge 212 is pivotally connected to the subframe or body by the back upper bridge pivot shaft 213, having pivot axis U'. Similarly, the lower bridge 214 is pivotally connected to the subframe or body by the back lower bridge pivot shaft 215 having pivot axis L'. The tilt control disc 278 is connected to one end of the back lower bridge pivot shaft 215 in a manner to prevent relative rotation therebetween, such as the square drive shown. The lower bridge pivot shaft 215 is also connected to the lower bridge 214 in a manner to prevent relative rotation, such as using the pins 279 between the shaft 215 and the lower bridge 214. As with the front arrangements, the tilt control arrangement is optional and the tilt control disc 278 can be a partial disc so that the back tilt brake disc 271 is a partial disc or actuate plate and the back tilt rise gear element 276 is at least a partial gear.

When assembled, the motor cooling hoses are located in the recess 331 in the lower bridge, then the bridge is pivotally connected to the subframe or body, with the hoses then between the bridge and the subframe. Then the tilt control disc 278 (if used) is fastened to the end of the pivot shaft 215. From the recess 331 the cooling hoses pass into the bridge 214 through holes 332 in the periphery of the recess. The hoses exit the bridge through fixings 333. Similar recesses, holes and fixings are provided for the power cables at the rear of the back lower bridge, but other than fixing 353, these are not visible in FIG. 58.

The first and second back suspension upright 220a, 220b include upper bosses 224a, 224b which form part of the upper pivotal connection between the uprights 220a, 220b and the ends 216a 216b of the upper bridge 212. Similarly, lower bosses 225a, 225b are provided to form part of the lower pivotal connection between the uprights 220a, 220b and the ends 218a 218b of the lower bridge 214. However, the lower pivotal connections are at two points on each end 218a, or 218b of the lower bridge, so the lower bosses 225a, 225b are each shown as two pins which are received in recesses 225a', 225b' in the uprights. Preferably the pins do not rotate relative to the uprights, so the ends of the pins and the recesses 225a', 225b' can be shaped such as with the square drive shape illustrated.

Spring damper mount 251 is provided on the upright to receive the top of a spring and damper or shock absorber assembly. Hole 231 is to receive the forward of the two guide rods and hole 232 is to receive the rearward of the two guide rods of the wheel hub assembly of FIGS. 60 and 61. The groove 233 is provided on each upright 220a, 220b to accommodate the motion of a sensor connected to the motor in the wheel hub assembly (not shown).

Fixings such as brackets 314, 315 are provided on the uprights 220a, 220b to locate brake lines (not shown). Similarly, fixings 313 are provided on the upper bridge 212 and a hole 312 permits a brake line to be passed into the upper bridge. The slot or aperture 311 in the top of the bridge allows a loop of brake line to be accommodated.

As shown in the assembly in FIG. 59 the upper pivotal connections at joints 228 and the lower pivotal connections at joints 229 provide respective upper tilt axes T or lower tilt axes T'.

Figure 60:
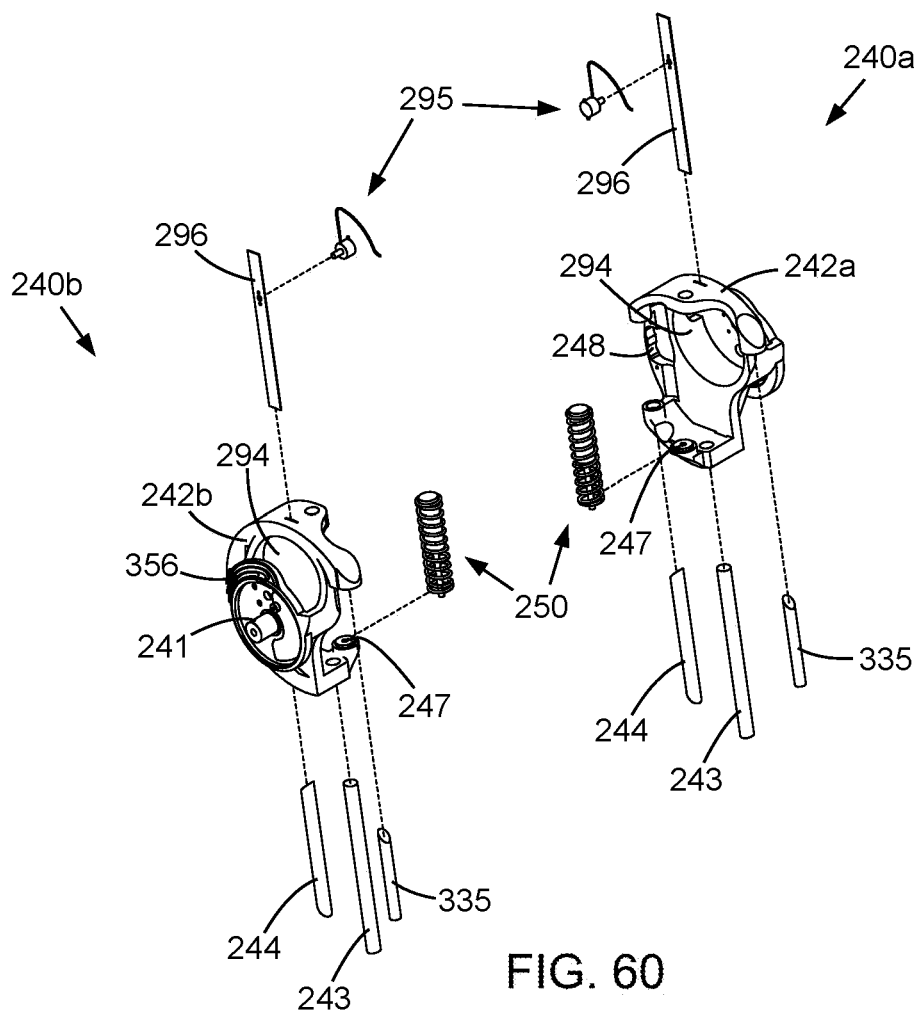
FIG. 60 is an exploded view of the back-suspension wheel assemblies of FIG. 55.
Figure 61:
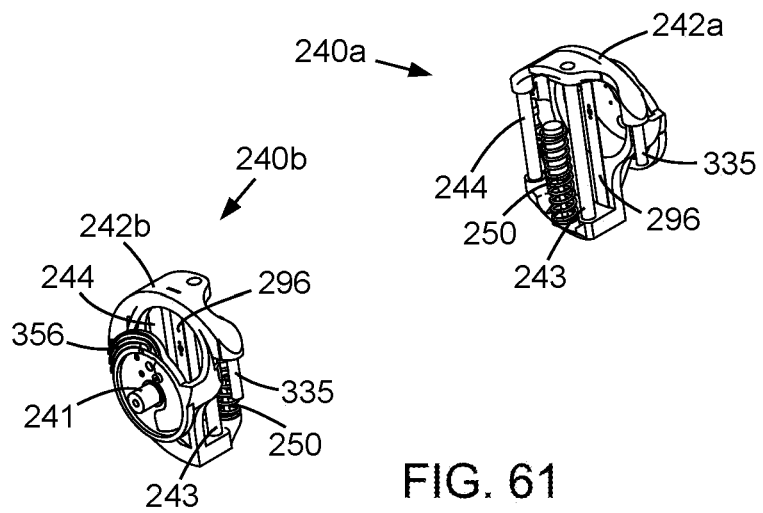
FIG. 61 is an assembled view of the wheel assemblies of FIG. 60.

FIGS. 60 and 61 show the wheel hub assemblies 240a, 240b of the back-suspension arrangement of FIGS. 55 and 57. Each wheel hub assembly includes a respective first or second hub carrier 242a, 242b and a first guide rod 243 and a second guide rod 244. The first and second guide rods slide inside the sleeves or holes 231, 232 in the upright shown in FIG. 58. Spring damper assemblies 250 are positioned between the lower spring damper mount 247 on the hub carrier 242a, 242b and the upper spring damper mount 251 on the upright of FIG. 58.

Brake calliper recess 248 preferably allows the brake calliper to be slid or moved inwardly towards the centre of the wheel to allow the annular brake disc to be removed with the wheel to which it is fixed.

Figure 63:
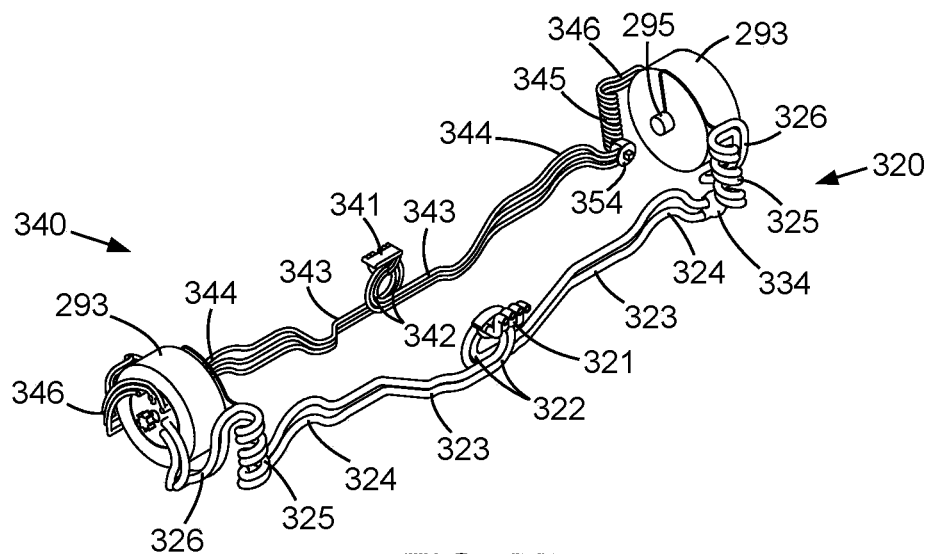
FIG. 63 is a perspective view of the wheel motors, power cables and cooling pipes of the back suspension of FIG. 55.

The hub carriers 242a, 242b each include a motor recess 294 to accommodate an electric motor such as the electric motor 293 shown in FIG. 63. Referring again to FIG. 60, a sensor 295 such as a resolver can be required for motor control input, so a bracket 296 is provided to retain the sensor in the required position relative to the motor (not shown). As the hub assembly moves in compression and rebound relative to the upright, the sensor 295 of FIG. 60 moves along the groove 233 in the upright shown in FIG. 58.

The hub carrier 242b also shows retaining grooves 356 to locate power cables for the motor carried in the hub assembly. The rods 335 at the front of each hub assembly are provided to help constrain a coil in the cooling hoses detailed in FIG. 63.

Figure 62:
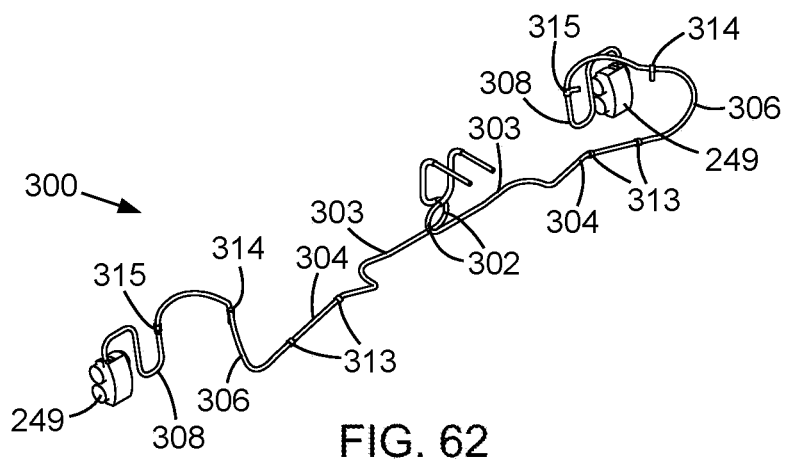
FIG. 62 is a perspective view of the brake lines of the back suspension of FIG. 55.

FIG. 62 shows the brake lines 300 to the brake callipers 249. The brake lines from the body go into a loop 302 to accommodate tilt motions of the upper bridge relative to the body. The loops 302 are accommodated in the slot or aperture 311 in the top of the upper bridge as shown in FIGS. 57 and 58. Portions 303 pass through the upper bridge and emerge as portions 304 which are fixed or loosely tethered to the upper bridge at fixings 313. Beyond that, loop 306 accommodates tilt motions of the upright relative to the bridge with fixing 314 and 315 locating the brake line relative to the upright. After fixing 315, loop 308 accommodates compression and rebound motion of the hub assembly relative to the upright.

FIG. 63 shows the cooling hoses 320 and the power cables 340. The cooling hoses from the body are connected at 321. The loop 322 is formed within the recess of the lower bridge to accommodate tilt of the lower bridge relative to the body. Portion 323 is within the lower bridge, entering through the holes 332 in the recess 331 shown in FIG. 58 and exiting into the fixings 333. Returning to FIG. 63, the portion 324 accommodates tilt motions of the upright and hub assembly relative to the bridges. The connector 334 is fixed to the end of the boss 225a, 225b shown in FIG. 58, so that the connector rotates with the upright to ensure that the portion 324 flexes to avoid contact with the wheel rim as described in FIG. 64. Returning again to FIG. 63, the coil portion 325 of the hoses accommodates compression and rebound motions of the hub assembly relative to the upright and is located around the rod 335 on the hub carrier shown in FIG. 60. The portion 326 runs around the hub carrier and into the cooling arrangement in or around the motor 293. The sensor 295 for the motor is also shown in FIG. 63.

The power cables in the present example are located primarily behind the lower bridge. The power cables from the body are connected at 341. The loop 342 to accommodate tilt motions between the bridge and the body is formed within a recess in the lower bridge similar to that forth cooling hoses and portion 323 passes through the lower bridge, emerging to allow relative motion between the upright and the bridge in tilt through portion 324. The connector 354 is fixed to the end of the boss 225a, 225b shown in FIG. 58, so that the connector rotates with the upright to ensure that the portion 344 flexes to avoid contact with the wheel rim with tilt motions of the upright relative to the bridge as described in FIG. 64 The connector 354 is shown with a square drive to engage with the square recess illustrated in the end of the boss 225a, 225b in FIG. 58. The coil 345 is intended to accommodate compression and rebound motions of the hub assembly relative to the upright. The portion 346 passes around the hub assembly and through the grooves in the hub carrier shown in FIG. 60, then the cables are connected to the motor 293.

Figure 64:
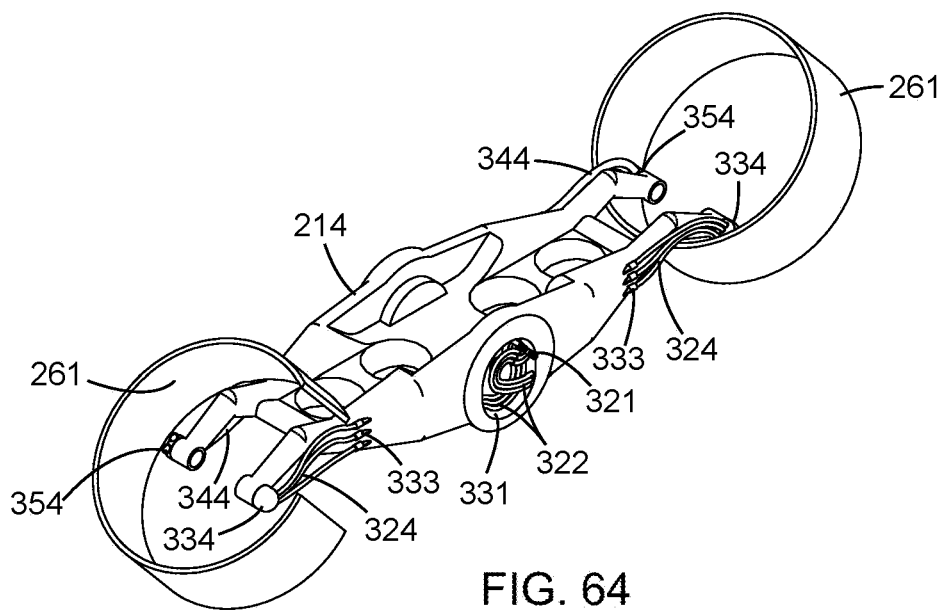
FIG. 64 is a perspective view of various components of the back suspension of FIG. 55 at tilt.

FIG. 64 shows the lower bridge 214 with the cooling hoses 320 and the power cables 340 from the body to the connectors with cylinders representing the inner diameter of the wheel rims 261. The wheel rims are tilted to the left, as are the cooling hose connectors 321. The effect of the rotation of the connectors 334 and 354 driven by the tilt of the uprights (not shown) can clearly be seen, directing the hoses 324 and the power cables 344 upwards on the left side and downwards on the right side to avoid contact with the wheel rims 261.

Figure 65:
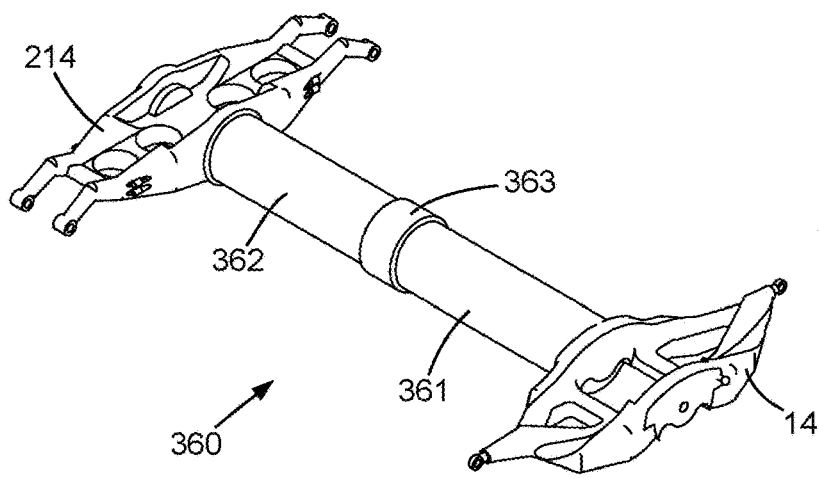
FIG. 65 is a perspective view of a bridge interconnection according to an aspect of the present invention.

FIG. 65 shows a possible interconnection 360 between the front and rear bridges, in this case the lower front and lower back bridges 14 and 214. The interconnection can comprise a tube or other interconnection member that rigidly or resiliently connects the front bridge to the back bridge and is pivotally connected to the body either directly or by way of the pivotal connections between the front and back bridges and the body. The tilt damper(s), tilt brake(s) and tilt rise arrangement(s) can be connected between the interconnection member and the body. Preferably however, if such an interconnection 360 is provided, the interconnection comprises a front portion 361, a back portion 362 and a central device 363 interconnecting the front portion to the back portion. The central device 363 can be the point at which the tilt damper(s), tilt brake(s) and tilt rise arrangement(s) are connected between the interconnection 360 and the body. The central device 363 can include a rotation reversal arrangement such as a lever or gear arrangement for example to permit rotations of the front and back bridges in opposite directions as can be desirable when travelling over uneven or warped surfaces and the rotation reversal arrangement can be damped to provide warp damping.

Figure 66:
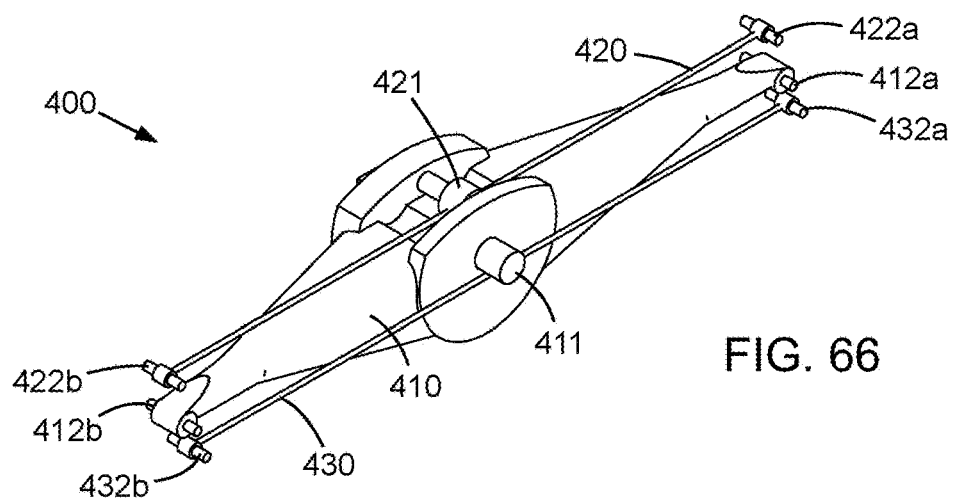
FIG. 66 is a perspective view of an alternative bridge arrangement of a two-wheel suspension.

FIG. 66 shows an alternative arrangement of bridges and links. Although the arrangement is most suited to the front suspension, it can be applied to a rear suspension. A main bridge 410 is pivotally mounted to the body at body mount 411 and joints 412a, 412b are provided at the ends of the main bridge to pivotally connect it to the respective upright. Two smaller lateral links 420, 430 which can be a pair of tension cables or rods, provide the tilt angle control of the wheels. At least one of the lateral links also have a respective body mount. In this example, only upper lateral link 420 is pivotally mounted to the body at upper body mount 421. At the ends of the upper lateral link 420 are joints 422a, 422b to provide a pivotal connection to the respective upright. The lower lateral link can optionally be pivotally mounted to the body, but that provides over constraint, so preferably joints 432a, 432b at the ends of the lower lateral link provide pivotal connection to the respective upright. The lower lateral link 430 can optionally be positioned inside a groove or recess under the main bridge, but in this example is shown in front of the main bridge 410.

Figure 67:
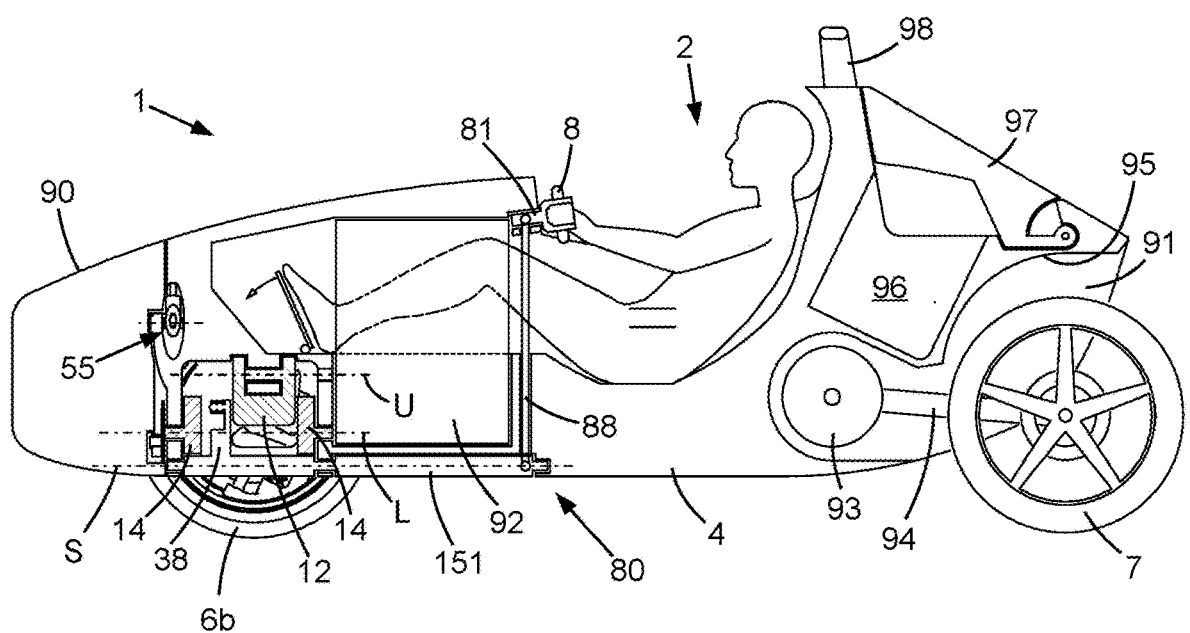
FIG. 67 is a longitudinal section view through a vehicle according to the present invention.

FIG. 67 shows a section through a vehicle of the present invention having a steering mechanism 80 that is modified to allow a battery pack or other power source 92 to be placed between legs of the driver 2 and removed or replaced by lifting out through the top of the body 4. The steering column is short and the drop links 88 are behind the battery pack driving a cylindrical member 151 or other such torsional member to in turn drive the steering rod shifter 38. This allows some of the mass of the battery or other power source to be raised, which can improve the handling and response of the vehicle. In this embodiment the motor vehicle is a three-wheeled vehicle and comprises an electric motor 93. In this example the electric motor 93 is not positioned within a wheel hub, but at a location in front of the rear wheel as shown in FIG. 67. Also relatively heavy or dense parts such as the cooling radiators for the motor cooling (if provided) can be located high in the vehicle body, such as in the roll over protection hoop 98 which is particularly good for radiators having good air flow.

It will be understood to persons skilled in the art of the invention that many modifications may be made without departing from the spirit and scope of the invention.

For example, to change the response of the vehicle the centre of mass of the body may be moved, by moving the location of components and/or adding a roof to the body for example. Generally, the lower the centre of mass the more stability at very high speeds, but a high centre of mass helps provide response for cornering. If a higher centre of mass can provide acceptable stability, the driver could be seated more upright which could free up some packaging length, so can even allow for a passenger behind the driver with only a small increase in wheelbase.

If the centre of mass is lower for high speed stability, the tilt brake may be controlled to lock at full tilt when the lateral acceleration exceeds the lateral acceleration at which the body naturally reaches full tilt, or the tilt damper may be used to prevent a sudden change in roll rate by increasing tilt damping near the full tilt position. Then the driver starts to feel a component of the lateral acceleration rather than having the resultant of vertical and lateral (centrifugal) accelerations remain vertical with respect to the driver (through the seat base).

The tilt rise can be automatically controlled and/or use 2 pedals to drive the tilt where hand throttle and brake lever are used as on a motorcycle. Alternatively, steering wheel paddles can be used to drive the tilt rise when using car-like foot operated throttle and brake pedals. The tilt rise can be used to accelerate lean into corners or to simulate the weight shift of a rider of a conventional two-wheeled motorcycle in preparation for a corner. Tilt rise may be most strongly driven about centre or might vary with speed, tilt angle, steering angle, yaw rate, etc. The tilt rise can even be controlled to initiate tilt into corners, for example if the driver does not, or would prefer not to counter-steer into a turn (i.e. for people who only want to use the direct steering method of car drivers).

Any driving of the tilt rise or use of tilt brake can prevent the tilt damper from controlling bridges moving to balance loads over bumps in corners, but the impact can be managed with sophisticated control. An anti-lock braking system can be integrated with or communicate with the tilt rise or tilt brake to prevent over-braking on the un-loaded wheel when tilt rise/brake is actuated. Similarly a stability control program (ESP) can be integrated into the braking system and/or a controllable tilt damper, the tilt rise arrangement or the tilt brake arrangement. While with a three-wheeled vehicle the ESP is not necessarily able to cooperate beneficially with the motor controller, in four-wheeled embodiments of the vehicle, the ESP can utilise motor and brake systems to improve the stability of the vehicle. Preferably the tilt control (for tilt rise) should be a torque control. The tilt rise function can be used not only as a motorcyclist's body weight shift replacement but also as a safety override of tilt angle contributing to an electronic stability control program. Preferably for maximised driver enjoyment, use of such artificial aids is minimised, so the tilt rise may primarily be used to start the tilt into corner, then let natural free effects work for the most natural feel and the tilt brake may be used primarily to prevent "high-sider" events where the body rolls outwards at dangerously high roll rates due to lateral trip events for example.

A significant advantage of the arrangements of the present invention is that tilt angles of at least 40 degrees are easily achievable with tilt angles of 50 degrees typically being shown in the embodiments in the drawings and greater than 50 degrees being possible, such as 52 degrees or more.

Instead of two steering rods 36a, 36b, the vehicle 1 according to another embodiment may incorporate one steering rod connected directly between the uprights of the first wheel and the second wheel. Additionally or alternatively, the steering rod(s) may not resemble rods and may be any other form of substantially rigid link. If one steering rod is used between the uprights of the first and second wheel, the steering rod may be sufficiently flexible to accommodate the differences in lateral and vertical displacements of the steering joints on the uprights relative to the steering joint on the steering rod shifter, without buckling in normal operation. The steering joints between the one steering rod and the respective uprights of the first and second wheels can each include a two-axes joint, the first axis being substantially parallel to the steering axis and the second axis being substantially parallel to the tilt axes. The centres of the two joints can be laterally separated to provide desired steering characteristics such as Ackermann effect and minimal tilt steer. Preferably the two axes are a tilt oriented (steering joint) axis and a steering oriented (steering joint) axis. The tilt-oriented axis of the left and right wheel assemblies is preferably at the same lateral spacing as the upper and lower joints, i.e. in plan view the tilt axes and the tilt-oriented axis on each upright will all be aligned. The steering oriented axis is preferably parallel to the steering axis of the upright and can be at a slightly wider or narrower spacing than the steering axes of the uprights to provide an Ackermann type toe effect if desired.

As another example, the vehicle 1 according to another embodiment may incorporate a tilt damper 55 that is in the form of a rotary damper. Any of the possible tilt dampers may be variable dampers and they may be controlled using variable valving or electromagnetically controlled including the use of magnetorheological fluid.

Further, the first and second wheel may be two back wheels instead of two front wheels. The vehicle 1 according to a different embodiment may also be a four-wheeled vehicle instead of a three-wheeled vehicle.

Furthermore, although a seat of the vehicle 1 is shown to be within the body of the vehicle, according to a different embodiment, the seat may be arranged such that a driver straddles the body of the vehicle. Alternatively, the cockpit may be enclosed rather than open as shown.

Rather than being a single-seater as shown, the vehicle may be a two-seater, preferably with the passenger seated behind the driver.

The front and back subframes are optional with the suspension components such as the bridges, tilt damper and tilt control arrangements (such as the tilt brake clamping element and tilt rise motor) being connected to the body without a complete subframe being used.

The spring damper assembly 50, instead of being a coil-over type, may comprise an in-rod or in-cylinder spring in an arrangement similar to that used on motorcycles.

If the inclination of the virtual kingpin of the steering axis is zero, i.e. if the steering axis is vertical in front view when the body tilt is zero, then the suspension compression-rebound action is always parallel to the tilt angle of the vehicle if the bridge mount and joint positions maintain the camber of the uprights parallel to the body. This is the same characteristic as a motorcycle and results in some compression of the spring damper assembly due to centrifugal forces increasing the total or resultant wheel load during cornering.

The use of the guide rod and sleeve arrangement between the wheel hub assembly and the upright permits the rake angle to be independent of the angle of the steering axis, allowing each to be positioned optimally. It also allows the tilt axes to vary from being perpendicular to the steering axes to provide the benefits that come with having the tilt axes within ten degrees of horizontal, or preferably with the tilt axes substantially horizontal. The rake angle of the steering axis is one of the three primary features at the wheel that influence handling, the other two features being offset and trail, so being able to adjust the rake of the steering axis independently of the tilt axis inclination is extremely beneficial. The tilt axis inclination affects tilt freedom, with tilt motions being hindered as the tilt axis inclination is increased from the preferred horizontal orientation.

In yet another variation, instead of each steering member or upright comprising a sleeve and each wheel hub assembly comprising a rod extending through the respective sleeve, the vehicle may be arranged such that each wheel hub assembly comprises a sleeve, and each suspension guide (i.e. the steering member of the upright) or each upright comprises a rod extending through the respective sleeve.

In a preferred embodiment at least one guide rod is part of the hub assembly and a corresponding at least one sleeve is part of the upright. As discussed above, it is preferable that joints between respective ends of the bridges and respective ends of the uprights are within a plane perpendicular the axis of rotation of the wheel and through which the steering axis extends. This enables motor-bike like steering and titling. If in this case a respective guide rod is part of the hub assembly and a corresponding sleeve (guided by the guide rod) is part of the upright, it is then possible to position the bridges relatively close together, which enables relatively large tilt angles. Further relatively large suspension travel can be realized. For example, the tilt axes extending through the upper and lower joints can be spaced apart by as little as 40 mm and whilst preferably being 60 mm to 90 mm spaced apart for commonly used motorcycle sized wheel rims, can be up to 150 mm, 200 mm, or 250 mm spaced apart if the wheel rims are narrow and large diameter. The suspension travel is preferably 100 mm compression and 35 mm rebound, but the total suspension compression and rebound travel is preferably greater than 100 mm, or 120 mm or more preferably greater than 130 mm, especially when motorcycle sized wheel rims are used. However, if larger diameter wheel rims are used, the total suspension compression and rebound travel can be greater than 140 mm, or greater than 160 mm but no more than 180 mm.

In the alternative, if the guide rod is part of the upright and the corresponding sleeve part of the hub assembly (and the joints between respective ends of the bridges and respective ends of the uprights are positioned as described above), the bridge joints limit the achievable suspension travel. Consequently, if the bridges joints are further apart and (and consequently the bridges are further apart), relatively large suspension travel is possible, but achievable tilt angles are limited (as the rim of the wheel would collide with the bridges). If the bridges joints are close together, relatively large tilt angles are possible, but suspension travel is limited. In summary, the combination of (i) the joints between respective ends of the bridges and respective uprights being within a plane perpendicular the axis of rotation of the wheel and through which the steering axis extends, (ii) each upright comprising guide rod, and (iii) each hub assembly comprising corresponding sleeve has the disadvantage that either large suspension travel can be enabled or large tilt angles, but not large suspension travel and large tilt angles.

In contrast the above described preferred embodiment of the present invention enables motor bike-like steering and tilting, relatively large suspension travel and at the same time relatively large tilt angles. For example, the tilt axes can be closer together providing more clearance between the bridges and the wheel rims during tilting, in turn allowing greater tilt angles with larger wheel travel whilst maintaining the tilt and steering axes close to the wheel centre-line. As explained above, the benefits of maintaining the tilt axes, steering axis and in many cases the spring damper forces and the steering joints at or very close to the wheel centre-line contribute to a similarly high and undistorted or faithful feel to that of a motorcycle. That purity of driver feel without unnecessary feedback, combined with the ability to lean to large tilt angles of typically between 40 to 55 degrees provides an unparalleled safe and enjoyable driver experience.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A motor vehicle including:
a body; and
a steering and suspension assembly coupled to the body, the steering and suspension assembly comprising:
a left suspension upright and a right suspension upright, each suspension upright including a respective sleeve, a respective upper joint and a respective lower joint;
a bridge having opposite left and right ends that are rotatably connected to the respective left and right suspension uprights, the bridge being pivotally connected to a body of the vehicle by a bridge body mount between the left and right ends;
at least one connecting link extending primarily in a lateral direction and providing a connecting link left end connected to the left suspension upright and a connecting link right end connected to the right suspension upright, the or each connecting link being rotatably connected to the body at a, or a respective, connecting link body mount;
the respective upper joints of the left and right suspension uprights rotatably connecting the left and right suspension uprights to the respective ends of one of the bridge or the at least one connecting link;
the respective lower joints of the left and right suspension uprights rotatably connecting the left and right suspension uprights to the respective ends of the other one of the bridge or the at least one connecting link;
left and right wheel hub assemblies associated with the respective left and right suspension uprights, the left and right wheel hub assemblies each including a respective rod extending through the sleeve of the respective one of the left and right suspension uprights, the respective rods being each fixed at both ends to a remaining portion of the wheel hub assembly at locations radially spaced from a centre of the wheel hub assembly;
left and right wheels mounted on the left and right wheel hub assemblies, respectively, each respective left or right wheel hub assembly being movable relative to the respective left or right suspension upright such that the wheels are linearly movable relative to the bridge during suspension rebound and compression action; and
at least one steering element connected to each, or a respective, suspension upright at a respective steering upright joint to cause the suspension upright to pivot about a respective steering axis upon movement of the steering element to steer the motor vehicle;
wherein the motor vehicle is arranged such that movement of the wheels and the wheel hub assemblies associated with the suspension rebound and compression action and rotation of the bridge relative to the body associated with tilting action are both substantially independent of movement of the steering element.

2. The motor vehicle of claim 1, wherein each upper joint and each lower joint on the left and right suspension uprights is a multi-axis joint or spherical joint.

3. The motor vehicle of claim 1 wherein the upper and lower joints on each suspension upright are substantially within a plane perpendicular to an axis of rotation a respective wheel, the plane including the respective steering axis.

4. The motor vehicle of claim 1, wherein the upper and lower joints of a respective suspension upright are spaced apart by at least 40 mm and no more than 250 mm.

5. The motor vehicle of claim 1, wherein the left suspension upright and the right suspension upright each include:
a respective connecting member pivotally connected between the respective end of the bridge and the at least one respective connecting link; and
a respective steering member pivotally connected to the connecting member about the respective steering axis, wherein each wheel hub assembly is linearly movable relative to the respective steering member.

6. The motor vehicle of claim 1, further comprising a biasing member associated with each wheel and arranged to bias the respective wheel hub assembly towards a predetermined position relative to a respective one of the left and right suspension uprights.

7. The motor vehicle of claim 6, wherein each biasing member comprises a spring positioned to impose a biasing force along a spring axis parallel to an axis of the respective rod, and
  wherein each of the respective rods are directly fixed at both ends to the remaining portion of the hub assembly.

8. The motor vehicle of claim 1, wherein the upper joint, the lower joint and the steering joint of the suspension uprights are all located within a lateral offset distance from a centreline of the respective wheel,
  the distance between the left and right ends of the bridge being a lateral bridge length,
  the lateral offset distance being less than ten percent of the lateral bridge length.

9. The motor vehicle of claim 7, wherein the upper joint, the lower joint and the steering joint of the suspension uprights and the respective spring axis and the respective sleeve and the rod of the respective wheel hub assembly are all located within a lateral offset distance from a centreline of the respective wheel;
  wherein the distance between the left and right ends of the bridge is a lateral bridge length, and
  wherein the lateral offset distance is less than ten percent of the lateral bridge length.

10. The motor vehicle of claim 1, wherein when the vehicle is at a zero-tilt angle;
  the left upper joint of the left suspension upright is at substantially at the same height as the right upper joint of the right suspension upright; and
  the left lower joint of the left suspension upright is at substantially the same height as the right lower joint of the right suspension upright.

11. The motor vehicle of claim 1, wherein the at least one connecting link is a single connecting link including the connecting link left end and the connecting link right end and is connected to the body at the connecting link body mount, and
  wherein a centre of the bridge body mount is at least vertically spaced from a centre of the connecting link body mount by a vertical body mount spacing distance, the upper and lower joints of each suspension upright being vertically spaced by the vertical body mount spacing distance.

12. The motor vehicle of claim 1 wherein the bridge is a first bridge and the connecting link is a second bridge.

13. The motor vehicle of claim 1, wherein the at least one connecting link comprises a left connecting link including the connecting link left end and a body mount end, and a right connecting link including the connecting link right end and a body mount end, and
  wherein the body mount ends of the respective left and right connecting links being connected to the respective connecting link body mounts.

14. The motor vehicle of claim 13, wherein the left and right connecting links are connected to the respective body mounts by pivots, each having a respective pivot axis, and
  wherein the left and right connecting link body mount pivot axes are coincident or wherein the left and right connecting link body mount pivot axes are laterally separated.

15. The motor vehicle of claim 1 wherein each suspension upright is arranged such that the respective steering axis passes through the respective wheel at an offset from, and parallel to, a centrally disposed radial axis of the respective wheel, the offset being within a plane that is perpendicular to an axis of rotation of the wheel.

16. The motor vehicle of claim 1 wherein the steering and suspension assembly is a front steering and suspension assembly and wherein the motor vehicle further comprises a rear suspension assembly comprising a single wheel.

17. The motor vehicle of claim 1, wherein the steering and suspension assembly is a front steering and suspension assembly and wherein the motor vehicle further comprises:
  a rear suspension assembly comprising a pair of wheels,
  the rear suspension assembly comprises first and second bridges and first and second uprights, each bridge extending transversally relative to a longitudinal axis of the motor vehicle and being pivotably mounted such that the first and second bridges can pivot about an axis that is substantially parallel to the longitudinal axis of the motor vehicle, adjacent ends of the first and second bridges being pivotably coupled to a respective one of the first and second uprights, the rear suspension assembly further comprising a pair of wheel hubs and suspension elements, respective wheel hubs carrying respective wheels and being coupled to respective uprights and guided such that, biased by respective suspension elements, the wheel hubs can move along a radial axis of the respective wheel,
  wherein the rear suspension assembly is arranged such that the wheels of the rear suspension are tiltable in a manner similar or analogous to that of the wheels of the front suspension assembly.

18. The motor vehicle of claim 1, further including at least one of:
  at least one tilt damper connected directly or indirectly between the bridge and the body or between the at least one connecting link and the body;
  a tilt brake between the bridge or the at least one connecting link and the body to selectively permit or restrict tilt motions of the body relative to the bridge; and/or
  a tilt motor between the bridge or the at least one connecting link and the body to enable a tilt attitude of the body to be adjusted relative to the bridge.

19. The motor vehicle of claim 1 wherein the body is rotatable relative to the bridge by an angle of at least 40 degrees.

20. The motor vehicle of claim 1 wherein the respective or each respective steering axis has a rake angle of at least ten degrees.

21. A motor vehicle comprising:
  a body; and
  a steering and suspension assembly coupled to the body, the steering and suspension assembly comprising:
    at least one bridge having opposite first and second ends;
    first and second wheel hub assemblies disposed at the opposite first and second ends of the at least one bridge, respectively, each first and second wheel hub assembly comprising a respective rod, wherein each respective rod is fixed at both ends to the remaining portion of each of the first and second wheel hub assemblies;
    first and second wheels mounted on the first and second wheel hub assemblies, respectively;
    first and second suspension guides associated with the first and second wheel hub assemblies, respectively, each suspension guide being attached to a respective end of the at least one bridge such that the suspension guide is rotatable about at least a tilt axis relative to the at least one bridge, the first and second suspension guides each comprising a respective sleeve through which the rod of the respective wheel hub assembly extends, each respective wheel hub assembly being movable along or across the respective suspension guide such that the wheels are movable relative to the at least one bridge during suspension action; and a steering element rotatably connected to each or a respective suspension guide to cause the suspension guide to pivot about a steering axis upon movement of the steering element to steer the motor vehicle;

wherein the motor vehicle is arranged such that movement of the wheels and the wheel hub assemblies associated with the suspension action is independent of movement of the steering element.

* * * * *